US012690061B2

(12) United States Patent
Ajami et al.

(10) Patent No.: US 12,690,061 B2
(45) Date of Patent: Jul. 21, 2026

(54) CHANNEL ACCESS TECHNIQUES IN A MULTI-HOP FRAMEWORK FOR ULTRA-HIGH RELIABILITY

(71) Applicant: QUALCOMM Incorporated, San Diego, CA (US)

(72) Inventors: Abdel Karim Ajami, San Diego, CA (US); Abhishek Pramod Patil, San Diego, CA (US); Sai Yiu Duncan Ho, San Diego, CA (US); Yanjun Sun, San Diego, CA (US); George Cherian, San Diego, CA (US); Alfred Asterjadhi, San Diego, CA (US); Gaurang Naik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 286 days.

(21) Appl. No.: 18/295,805

(22) Filed: Apr. 4, 2023

(65) Prior Publication Data

US 2024/0340952 A1     Oct. 10, 2024

(51) Int. Cl.
*H04W 74/08*          (2024.01)
*H04W 72/21*          (2023.01)
(Continued)

(52) U.S. Cl.
CPC ......... *H04W 74/002* (2013.01); *H04W 72/21* (2023.01); *H04W 74/0816* (2013.01); *H04W 74/0866* (2013.01); *H04W 74/0875* (2013.01)

(58) Field of Classification Search
CPC .................................................. H04W 74/002
See application file for complete search history.

(56) References Cited

U.S. PATENT DOCUMENTS

2012/0170457 A1     7/2012  Zdarsky et al.
2018/0054835 A1     2/2018  Fodor et al.
(Continued)

OTHER PUBLICATIONS

International Search Report and Written Opinion—PCT/US2024/018370—ISA/EPO—Jun. 13, 2024.
(Continued)

*Primary Examiner* — Pamit Kaur
(74) *Attorney, Agent, or Firm* — Holland & Hart LLP

(57) ABSTRACT

This disclosure provides methods, components, devices and systems for channel access techniques in a multi-hop framework for ultra-high reliability (UHR). Some aspects more specifically relate to a transmission opportunity (TXOP) sharing mechanism according to which wireless communication devices can relay data frames along multiple hops within a same TXOP, a coordinated medium access scheme associated with relaying data frames between a root access point (AP) and a wireless station (STA) via multiple service periods, and various signaling mechanisms and frame formats according to which wireless communication devices can exchange or negotiate information associated with a coordinated medium access scheme. In some implementations, a coordinated medium access scheme may be associated with multiple time epochs (each associated with a service period) and differentiated channel access across the multiple time epochs may facilitate the relay with or without TXOP sharing within the associated service periods.

30 Claims, 16 Drawing Sheets

(51) Int. Cl.
    *H04W 74/00* (2009.01)
    *H04W 74/0816* (2024.01)

(56) References Cited

U.S. PATENT DOCUMENTS

| | | | |
|---|---|---|---|
| 2018/0211053 A1 | 7/2018 | Takahashi | |
| 2018/0302908 A1 | 10/2018 | Aijaz | |
| 2019/0007253 A1 | 1/2019 | Cavalcanti et al. | |
| 2019/0090275 A1 | 3/2019 | Zhang et al. | |
| 2022/0124384 A1 | 4/2022 | Tsukagoshi | |
| 2023/0114857 A1 | 4/2023 | Lou et al. | |
| 2023/0209531 A1 | 6/2023 | Viger et al. | |
| 2023/0362996 A1* | 11/2023 | Cao | H04B 7/15528 |
| 2023/0389078 A1 | 11/2023 | Baron et al. | |
| 2024/0090021 A1 | 3/2024 | Max et al. | |
| 2024/0340945 A1 | 10/2024 | Ajami et al. | |
| 2024/0340952 A1 | 10/2024 | Ajami et al. | |
| 2024/0340953 A1 | 10/2024 | Ajami et al. | |

OTHER PUBLICATIONS

Khorov E., et al., "A Survey on IEEE 802.11ah: An Enabling Networking Technology for Smart Cities", Computer Communications, vol. 58, Sep. 3, 2014, pp. 53-69, XP055393135, NL, Section 4.5, p. 66-p. 68.

Lim D (LG Electronics)., et al., "Thought for Range Extension in UHR", doc.: IEEE 802.11-23/0042r0, IEEE Draft, 11-23-0042-00-0UHR-Thought-for-Range-Extension-In-UHR, IEEE-SA Mentor, Piscataway, NJ USA, vol. 802.11 UHR, Mar. 13, 2023, Jan. 13, 2023, pp. 1-16, XP068201579, p. 3, p. 8-p. 13.

\* cited by examiner

WAN 102-a — Root AP 202-c     202-a 102-d — Sat AP

Sat AP — 102-b 202-b 204-c     204-b

STA     STA 104-c     104-b 102-c — Sat AP 204-a

STA 104-a

| - - - - - - - | Fronthaul Link |
|---------------|----------------|
| ———————— | Backhaul Link |

200

| | T | TXS Frame | | D | Data Frame | | Q | Quieting Duration (using C-R-TWT) |
| | C | CTS Frame | | D' | Relayed Data Frame | | Q' | Quieting Duration (using TXS) |

Data Frame Component

825

Relay Component

835

Data Traffic Component

845

TXOP Sharing Component

830

Coordinated Medium Access
Component

840

Medium Access Negotiation
Component

850

820

800

Coordinated Medium Access
Component

925

Medium Access Negotiation
Component

935

Relay Component

930

920

900

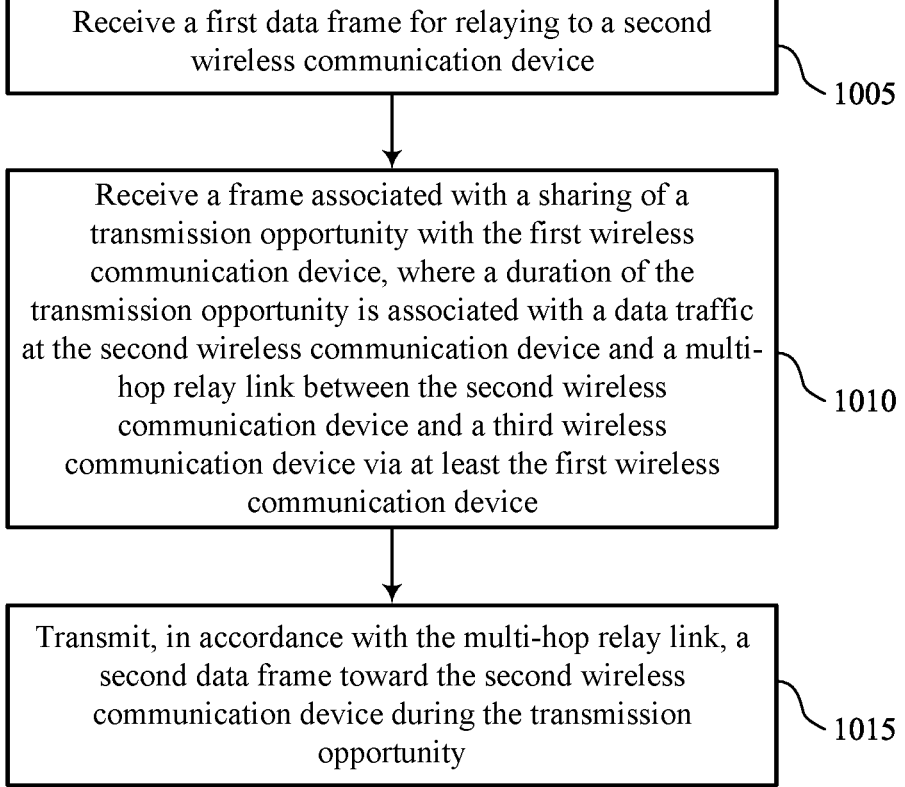

Receive a first data frame for relaying to a second wireless communication device

1005

Receive a frame associated with a sharing of a transmission opportunity with the first wireless communication device, where a duration of the transmission opportunity is associated with a data traffic at the second wireless communication device and a multi-hop relay link between the second wireless communication device and a third wireless communication device via at least the first wireless communication device

1010

Transmit, in accordance with the multi-hop relay link, a second data frame toward the second wireless communication device during the transmission opportunity

Figure 11:
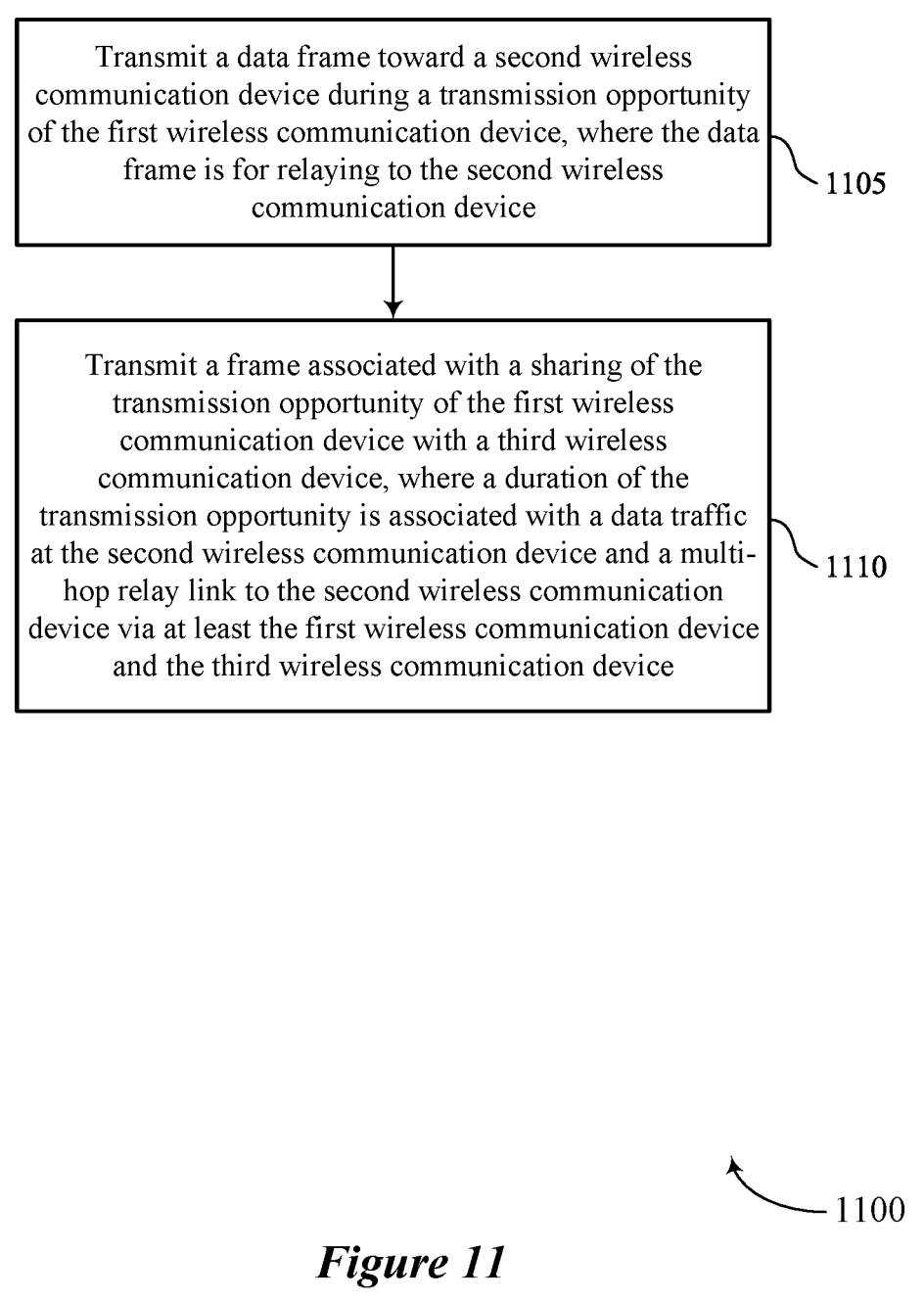

Transmit a data frame toward a second wireless communication device during a transmission opportunity of the first wireless communication device, where the data frame is for relaying to the second wireless communication device

1105

Transmit a frame associated with a sharing of the transmission opportunity of the first wireless communication device with a third wireless communication device, where a duration of the transmission opportunity is associated with a data traffic at the second wireless communication device and a multi-hop relay link to the second wireless communication device via at least the first wireless communication device and the third wireless communication device

Figure 12:
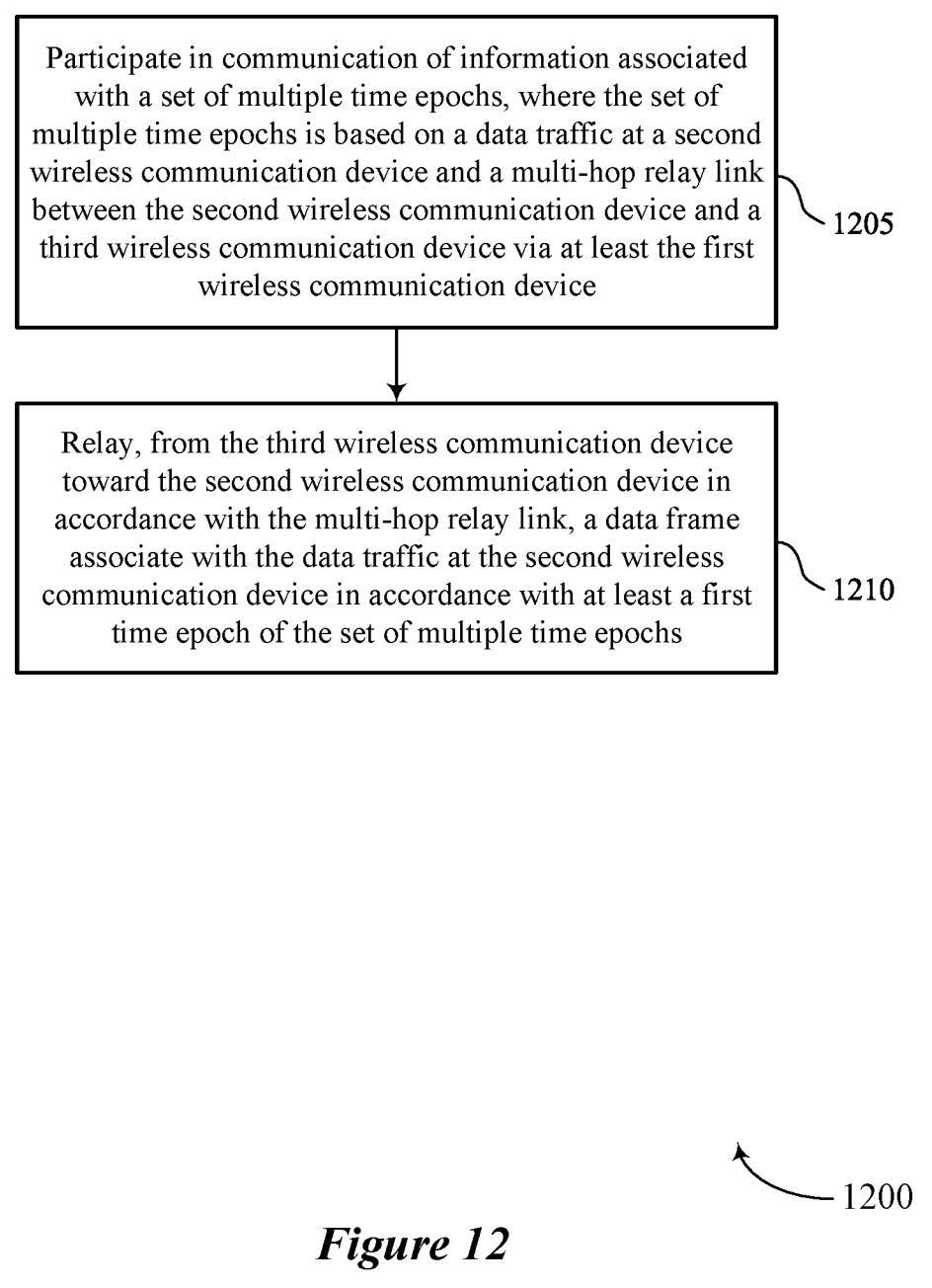

Participate in communication of information associated with a set of multiple time epochs, where the set of multiple time epochs is based on a data traffic at a second wireless communication device and a multi-hop relay link between the second wireless communication device and a third wireless communication device via at least the first wireless communication device

1205

Relay, from the third wireless communication device toward the second wireless communication device in accordance with the multi-hop relay link, a data frame associate with the data traffic at the second wireless communication device in accordance with at least a first time epoch of the set of multiple time epochs

Participate in communication of information associated with a set of multiple time epochs, where the set of multiple time epochs is based on a data traffic at the first wireless communication device and a multi-hop relay link to the first wireless communication device via at least a second wireless communication device and a third wireless communication device ⟍ 1305

Receive, in accordance with the multi-hop relay link, a data frame associated with the data traffic at the first wireless communication device in accordance with at least a first time epoch of the set of multiple time epochs ⟍ 1310

 — 1300

*Figure 13*

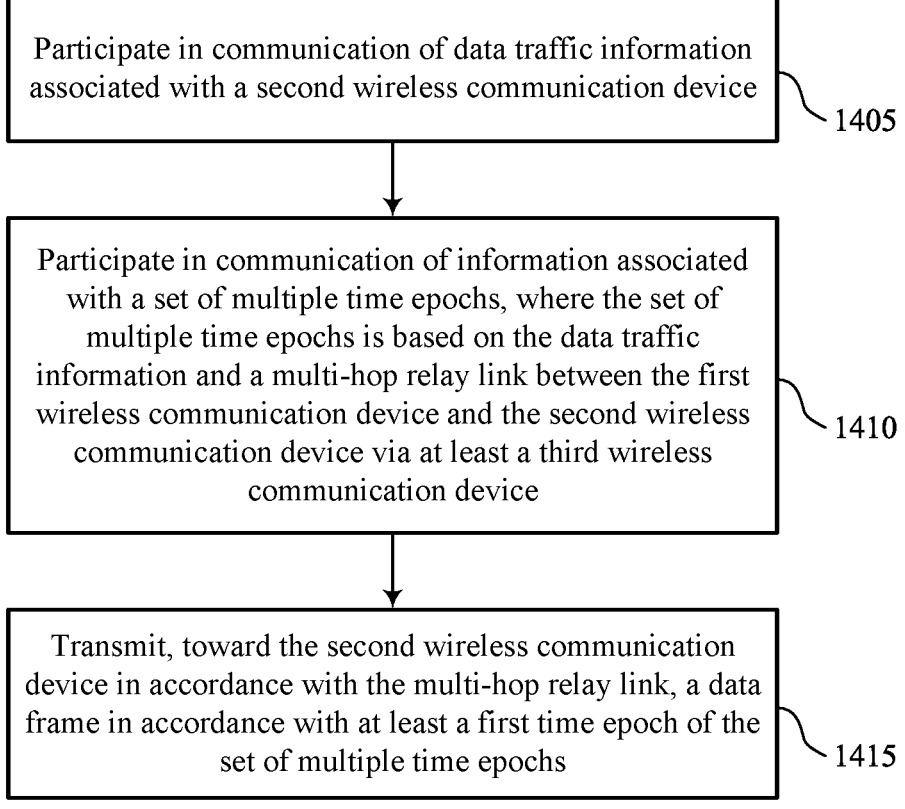

Participate in communication of data traffic information associated with a second wireless communication device

1405

Participate in communication of information associated with a set of multiple time epochs, where the set of multiple time epochs is based on the data traffic information and a multi-hop relay link between the first wireless communication device and the second wireless communication device via at least a third wireless communication device

1410

Transmit, toward the second wireless communication device in accordance with the multi-hop relay link, a data frame in accordance with at least a first time epoch of the set of multiple time epochs

Figure 15:
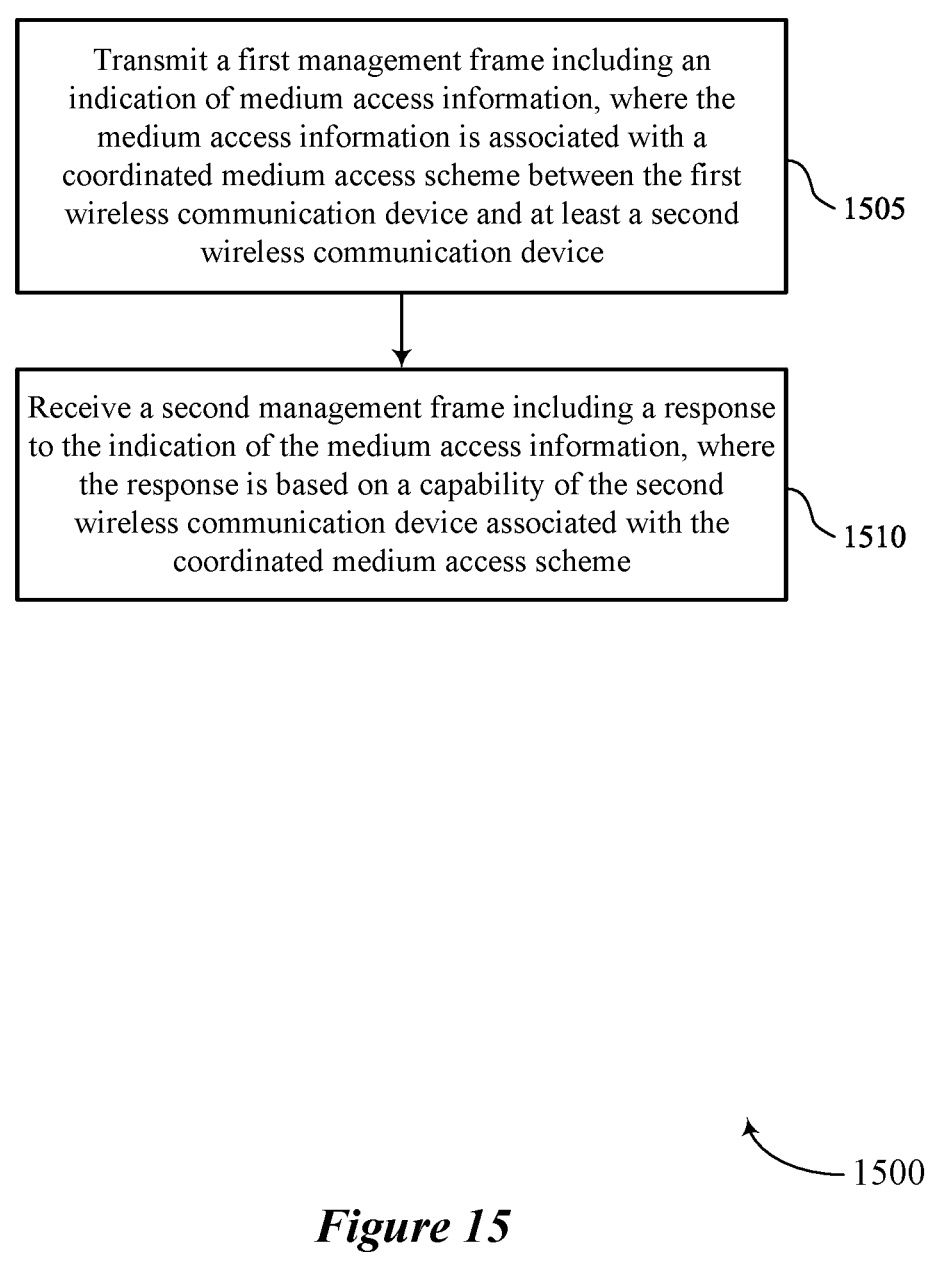

Transmit a first management frame including an indication of medium access information, where the medium access information is associated with a coordinated medium access scheme between the first wireless communication device and at least a second wireless communication device ⟍ 1505

Receive a second management frame including a response to the indication of the medium access information, where the response is based on a capability of the second wireless communication device associated with the coordinated medium access scheme ⟍ 1510

Figure 16:
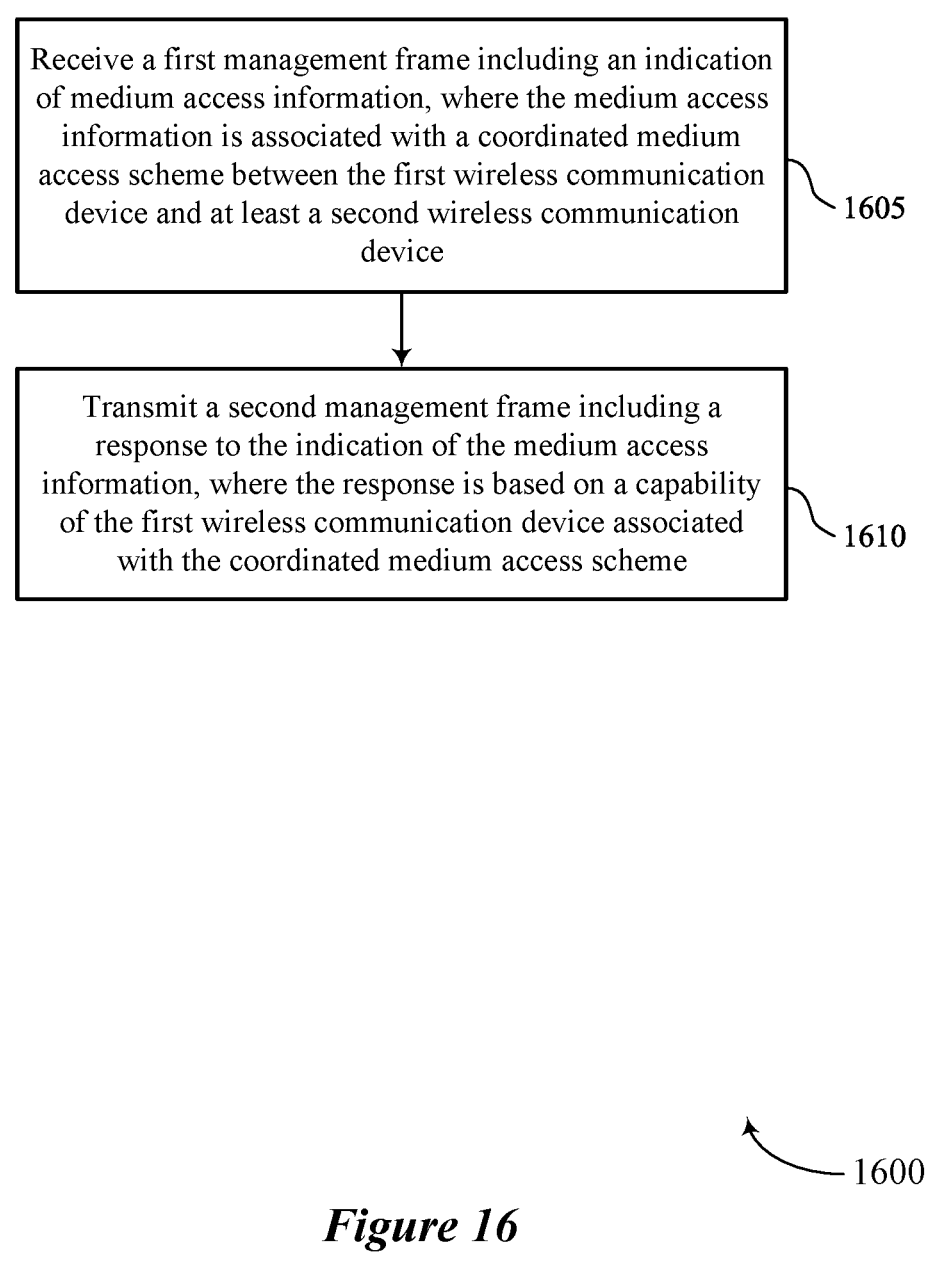

Receive a first management frame including an indication of medium access information, where the medium access information is associated with a coordinated medium access scheme between the first wireless communication device and at least a second wireless communication device ⟍ 1605

Transmit a second management frame including a response to the indication of the medium access information, where the response is based on a capability of the first wireless communication device associated with the coordinated medium access scheme ⟍ 1610

CHANNEL ACCESS TECHNIQUES IN A MULTI-HOP FRAMEWORK FOR ULTRA-HIGH RELIABILITY

TECHNICAL FIELD

This disclosure relates to wireless communication and, more specifically, to channel access techniques in a multi-hop framework for ultra-high reliability (UHR).

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

SUMMARY

The systems, methods, and devices of this disclosure each have several innovative aspects, no single one of which is solely responsible for the desirable attributes disclosed herein.

One innovative aspect of the subject matter described in this disclosure can be implemented in a first wireless communication device. The first wireless communication device may include at least one memory and at least one processor communicatively coupled with the at least one memory. The at least one processor may be operable to cause the first wireless communication device to receive a first data frame for relaying to a second wireless communication device, receive a frame associated with a sharing of a transmission opportunity with the first wireless communication device, where a duration of the transmission opportunity is associated with a data traffic at the second wireless communication device and a multi-hop link between the second wireless communication device and a third wireless communication device via at least the first wireless communication device, and transmit, in accordance with the multi-hop link, a second data frame toward the second wireless communication device during the transmission opportunity.

Another innovative aspect of the subject matter described in this disclosure can be implemented in a method for wireless communication performable at a first wireless communication device. The method may include receiving a first data frame for relaying to a second wireless communication device, receiving a frame associated with a sharing of a transmission opportunity with the first wireless communication device, where a duration of the transmission opportunity is associated with a data traffic at the second wireless communication device and a multi-hop link between the second wireless communication device and a third wireless communication device via at least the first wireless communication device, and transmitting, in accordance with the multi-hop link, a second data frame toward the second wireless communication device during the transmission opportunity.

Another innovative aspect of the subject matter described in this disclosure can be implemented in a first wireless communication device. The first wireless communication device may include means for receiving a first data frame for relaying to a second wireless communication device, means for receiving a frame associated with a sharing of a transmission opportunity with the first wireless communication device, where a duration of the transmission opportunity is associated with a data traffic at the second wireless communication device and a multi-hop link between the second wireless communication device and a third wireless communication device via at least the first wireless communication device, and means for transmitting, in accordance with the multi-hop link, a second data frame toward the second wireless communication device during the transmission opportunity.

Another innovative aspect of the subject matter described in this disclosure can be implemented in a non-transitory computer-readable medium storing code for wireless communication performable at a first wireless communication device. The code may include instructions executable by a processor to receive a first data frame for relaying to a second wireless communication device, receive a frame associated with a sharing of a transmission opportunity with the first wireless communication device, where a duration of the transmission opportunity is associated with a data traffic at the second wireless communication device and a multi-hop link between the second wireless communication device and a third wireless communication device via at least the first wireless communication device, and transmit, in accordance with the multi-hop link, a second data frame toward the second wireless communication device during the transmission opportunity.

Another innovative aspect of the subject matter described in this disclosure can be implemented in a first wireless communication device. The first wireless communication device may include at least one memory and at least one processor communicatively coupled with the at least one memory. The at least one processor may be operable to cause the first wireless communication device to transmit a data frame toward a second wireless communication device during a transmission opportunity of the first wireless communication device, where the data frame is for relaying to the second wireless communication device and transmit a frame associated with a sharing of the transmission opportunity of the first wireless communication device with a third wireless communication device, where a duration of the transmission opportunity is associated with a data traffic at the second wireless communication device and a multi-hop link to the second wireless communication device via at least the first wireless communication device and the third wireless communication device.

Another innovative aspect of the subject matter described in this disclosure can be implemented in a method for wireless communication performable at a first wireless communication device. The method may include transmitting a data frame toward a second wireless communication device during a transmission opportunity of the first wireless communication device, where the data frame is for relaying to the second wireless communication device and transmitting a frame associated with a sharing of the transmission opportunity of the first wireless communication device with a third wireless communication device, where a duration of the transmission opportunity is associated with a data traffic at the second wireless communication device and a multi-hop link to the second wireless communication device via at least the first wireless communication device and the third wireless communication device.

Another innovative aspect of the subject matter described in this disclosure can be implemented in a first wireless communication device. The first wireless communication device may include means for transmitting a data frame toward a second wireless communication device during a transmission opportunity of the first wireless communication device, where the data frame is for relaying to the second wireless communication device and means for transmitting a frame associated with a sharing of the transmission opportunity of the first wireless communication device with a third wireless communication device, where a duration of the transmission opportunity is associated with a data traffic at the second wireless communication device and a multi-hop link to the second wireless communication device via at least the first wireless communication device and the third wireless communication device.

Another innovative aspect of the subject matter described in this disclosure can be implemented in a non-transitory computer-readable medium storing code for wireless communication performable at a first wireless communication device. The code may include instructions executable by a processor to transmit a data frame toward a second wireless communication device during a transmission opportunity of the first wireless communication device, where the data frame is for relaying to the second wireless communication device and transmit a frame associated with a sharing of the transmission opportunity of the first wireless communication device with a third wireless communication device, where a duration of the transmission opportunity is associated with a data traffic at the second wireless communication device and a multi-hop link to the second wireless communication device via at least the first wireless communication device and the third wireless communication device.

Another innovative aspect of the subject matter described in this disclosure can be implemented in a first wireless communication device. The first wireless communication device may include at least one memory and at least one processor communicatively coupled with the at least one memory. The at least one processor may be operable to cause the first wireless communication device to participate in communication of information associated with a set of multiple time epochs, where the set of multiple time epochs is based on a data traffic at a second wireless communication device and a multi-hop link between the second wireless communication device and a third wireless communication device via at least the first wireless communication device and relaying, from the third wireless communication device toward the second wireless communication device in accordance with the multi-hop link, a data frame associate with the data traffic at the second wireless communication device in accordance with at least a first time epoch of the set of multiple time epochs.

Another innovative aspect of the subject matter described in this disclosure can be implemented in a method for wireless communication performable at a first wireless communication device. The method may include participating in communication of information associated with a set of multiple time epochs, where the set of multiple time epochs is based on a data traffic at a second wireless communication device and a multi-hop link between the second wireless communication device and a third wireless communication device via at least the first wireless communication device and relaying, from the third wireless communication device toward the second wireless communication device in accordance with the multi-hop link, a data frame associated with the data traffic at the second wireless communication device in accordance with at least a first time epoch of the set of multiple time epochs.

Another innovative aspect of the subject matter described in this disclosure can be implemented in a first wireless communication device. The first wireless communication device may include means for participating in communication of information associated with a set of multiple time epochs, where the set of multiple time epochs is based on a data traffic at a second wireless communication device and a multi-hop link between the second wireless communication device and a third wireless communication device via at least the first wireless communication device and means for relaying, from the third wireless communication device toward the second wireless communication device in accordance with the multi-hop link, a data frame associated with the data traffic at the second wireless communication device in accordance with at least a first time epoch of the set of multiple time epochs.

Another innovative aspect of the subject matter described in this disclosure can be implemented in a non-transitory computer-readable medium storing code for wireless communication performable at a first wireless communication device. The code may include instructions executable by a processor to participate in communication of information associated with a set of multiple time epochs, where the set of multiple time epochs is based on a data traffic at a second wireless communication device and a multi-hop link between the second wireless communication device and a third wireless communication device via at least the first wireless communication device and relaying, from the third wireless communication device toward the second wireless communication device in accordance with the multi-hop link, a data frame associate with the data traffic at the second wireless communication device in accordance with at least a first time epoch of the set of multiple time epochs.

Another innovative aspect of the subject matter described in this disclosure can be implemented in a first wireless communication device. The first wireless communication device may include at least one memory and at least one processor communicatively coupled with the at least one memory. The at least one processor may be operable to cause the first wireless communication device to participate in communication of information associated with a set of multiple time epochs, where the set of multiple time epochs is based on a data traffic at the first wireless communication device and a multi-hop link to the first wireless communication device via at least a second wireless communication device and a third wireless communication device and receive, in accordance with the multi-hop link, a data frame associated with the data traffic at the first wireless communication device in accordance with at least a first time epoch of the set of multiple time epochs.

Another innovative aspect of the subject matter described in this disclosure can be implemented in a method for wireless communication performable at a first wireless communication device. The method may include participating in communication of information associated with a set of multiple time epochs, where the set of multiple time epochs is based on a data traffic at the first wireless communication device and a multi-hop link to the first wireless communication device via at least a second wireless communication device and a third wireless communication device and receiving, in accordance with the multi-hop link, a data frame associated with the data traffic at the first wireless communication device in accordance with at least a first time epoch of the set of multiple time epochs.

Another innovative aspect of the subject matter described in this disclosure can be implemented in a first wireless communication device. The first wireless communication device may include means for participating in communication of information associated with a set of multiple time epochs, where the set of multiple time epochs is based on a data traffic at the first wireless communication device and a multi-hop link to the first wireless communication device via at least a second wireless communication device and a third wireless communication device and means for receiving, in accordance with the multi-hop link, a data frame associated with the data traffic at the first wireless communication device in accordance with at least a first time epoch of the set of multiple time epochs.

Another innovative aspect of the subject matter described in this disclosure can be implemented in a non-transitory computer-readable medium storing code for wireless communication performable at a first wireless communication device. The code may include instructions executable by a processor to participate in communication of information associated with a set of multiple time epochs, where the set of multiple time epochs is based on a data traffic at the first wireless communication device and a multi-hop link to the first wireless communication device via at least a second wireless communication device and a third wireless communication device and receive, in accordance with the multi-hop link, a data frame associated with the data traffic at the first wireless communication device in accordance with at least a first time epoch of the set of multiple time epochs.

Another innovative aspect of the subject matter described in this disclosure can be implemented in a first wireless communication device. The first wireless communication device may include at least one memory and at least one processor communicatively coupled with the at least one memory. The at least one processor may be operable to cause the first wireless communication device to participate in communication of data traffic information associated with a second wireless communication device, participate in communication of information associated with a set of multiple time epochs, where the set of multiple time epochs is based on the data traffic information and a multi-hop link between the first wireless communication device and the second wireless communication device via at least a third wireless communication device, and transmit, toward the second wireless communication device in accordance with the multi-hop link, a data frame in accordance with at least a first time epoch of the set of multiple time epochs.

Another innovative aspect of the subject matter described in this disclosure can be implemented in a method for wireless communication performable at a first wireless communication device. The method may include participating in communication of data traffic information associated with a second wireless communication device, participating in communication of information associated with a set of multiple time epochs, where the set of multiple time epochs is based on the data traffic information and a multi-hop link between the first wireless communication device and the second wireless communication device via at least a third wireless communication device, and transmitting, toward the second wireless communication device in accordance with the multi-hop link, a data frame in accordance with at least a first time epoch of the set of multiple time epochs.

Another innovative aspect of the subject matter described in this disclosure can be implemented in a first wireless communication device. The first wireless communication device may include means for participating in communication of data traffic information associated with a second wireless communication device, means for participating in communication of information associated with a set of multiple time epochs, where the set of multiple time epochs is based on the data traffic information and a multi-hop link between the first wireless communication device and the second wireless communication device via at least a third wireless communication device, and means for transmitting, toward the second wireless communication device in accordance with the multi-hop link, a data frame in accordance with at least a first time epoch of the set of multiple time epochs.

Another innovative aspect of the subject matter described in this disclosure can be implemented in a non-transitory computer-readable medium storing code for wireless communication performable at a first wireless communication device. The code may include instructions executable by a processor to participate in communication of data traffic information associated with a second wireless communication device, participate in communication of information associated with a set of multiple time epochs, where the set of multiple time epochs is based on the data traffic information and a multi-hop link between the first wireless communication device and the second wireless communication device via at least a third wireless communication device, and transmit, toward the second wireless communication device in accordance with the multi-hop link, a data frame in accordance with at least a first time epoch of the set of multiple time epochs.

Another innovative aspect of the subject matter described in this disclosure can be implemented in a first wireless communication device. The first wireless communication device may include at least one memory and at least one processor communicatively coupled with the at least one memory. The at least one processor may be operable to cause the first wireless communication device to transmit a first management frame including an indication of medium access information, where the medium access information is associated with a coordinated medium access scheme between the first wireless communication device and at least a second wireless communication device and receive a second management frame including a response to the indication of the medium access information, where the response is based on a capability of the second wireless communication device associated with the coordinated medium access scheme.

Another innovative aspect of the subject matter described in this disclosure can be implemented in a method for wireless communication performable at a first wireless communication device. The method may include transmitting a first management frame including an indication of medium access information, where the medium access information is associated with a coordinated medium access scheme between the first wireless communication device and at least a second wireless communication device and receiving a second management frame including a response to the indication of the medium access information, where the response is based on a capability of the second wireless communication device associated with the coordinated medium access scheme.

Another innovative aspect of the subject matter described in this disclosure can be implemented in a first wireless communication device. The first wireless communication device may include means for transmitting a first management frame including an indication of medium access information, where the medium access information is associated with a coordinated medium access scheme between the first wireless communication device and at least a second wireless communication device and means for receiving a second management frame including a response to the indication of the medium access information, where the response is based on a capability of the second wireless communication device associated with the coordinated medium access scheme.

Another innovative aspect of the subject matter described in this disclosure can be implemented in a non-transitory computer-readable medium storing code for wireless communication performable at a first wireless communication device. The code may include instructions executable by a processor to transmit a first management frame including an indication of medium access information, where the medium access information is associated with a coordinated medium access scheme between the first wireless communication device and at least a second wireless communication device and receive a second management frame including a response to the indication of the medium access information, where the response is based on a capability of the second wireless communication device associated with the coordinated medium access scheme.

Another innovative aspect of the subject matter described in this disclosure can be implemented in a first wireless communication device. The first wireless communication device may include at least one memory and at least one processor communicatively coupled with the at least one memory. The at least one processor may be operable to cause the first wireless communication device to receive a first management frame including an indication of medium access information, where the medium access information is associated with a coordinated medium access scheme between the first wireless communication device and at least a second wireless communication device and transmit a second management frame including a response to the indication of the medium access information, where the response is based on a capability of the first wireless communication device associated with the coordinated medium access scheme.

Another innovative aspect of the subject matter described in this disclosure can be implemented in a method for wireless communication performable at a first wireless communication device. The method may include receiving a first management frame including an indication of medium access information, where the medium access information is associated with a coordinated medium access scheme between the first wireless communication device and at least a second wireless communication device and transmitting a second management frame including a response to the indication of the medium access information, where the response is based on a capability of the first wireless communication device associated with the coordinated medium access scheme.

Another innovative aspect of the subject matter described in this disclosure can be implemented in a first wireless communication device. The first wireless communication device may include means for receiving a first management frame including an indication of medium access information, where the medium access information is associated with a coordinated medium access scheme between the first wireless communication device and at least a second wireless communication device and means for transmitting a second management frame including a response to the indication of the medium access information, where the response is based on a capability of the first wireless communication device associated with the coordinated medium access scheme.

Another innovative aspect of the subject matter described in this disclosure can be implemented in a non-transitory computer-readable medium storing code for wireless communication performable at a first wireless communication device. The code may include instructions executable by a processor to receive a first management frame including an indication of medium access information, where the medium access information is associated with a coordinated medium access scheme between the first wireless communication device and at least a second wireless communication device and transmit a second management frame including a response to the indication of the medium access information, where the response is based on a capability of the first wireless communication device associated with the coordinated medium access scheme.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIGS. 10 through 16 show flowcharts illustrating example processes that support channel access techniques in a multi-hop framework for UHR according to some aspects of the present disclosure.

Like reference numbers and designations in the various drawings indicate like elements.

DETAILED DESCRIPTION

Figure 1:
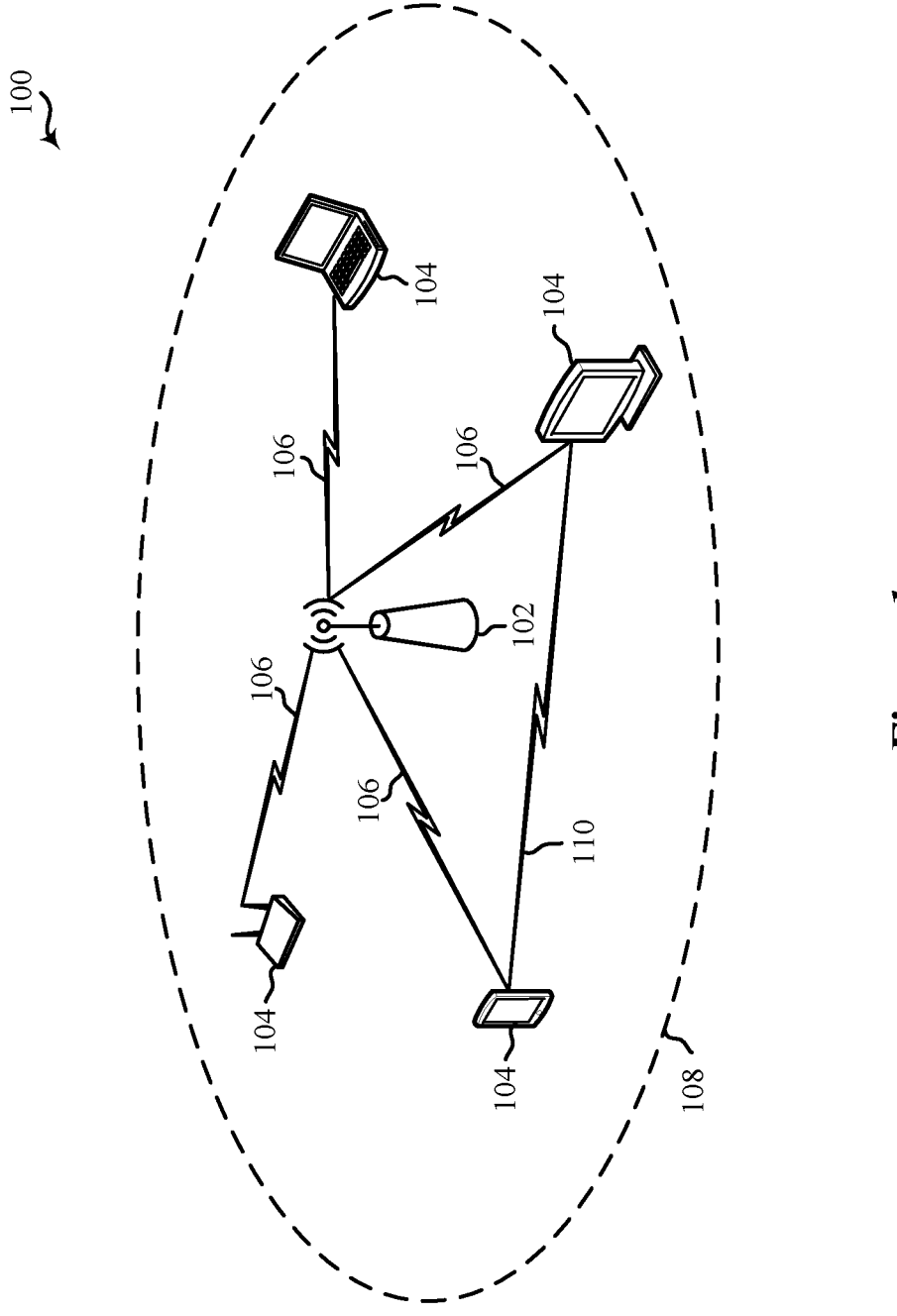
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

Some Wi-Fi deployments are trending toward increasingly mesh-like or mesh-based topologies, which may be associated with (such as involve) a deployment or use of multiple access points (APs) within a geographic area (such as a home, an office, a factory floor, or any other Wi-Fi equipped area). For example, a single AP may fail to provide sufficient coverage for an entire area on its own. As such, a consumer may elect to deploy or use multiple APs within the area, and each of the multiple APs may be connected to at least one other AP via an Ethernet link or a Wi-Fi link to form backhaul links between the multiple APs (such that each AP may route, directly or indirectly, information between the internet and an end user). An AP that is directly connected to the internet may be referred to or understood as a root AP and an AP that is not directly connected to the internet may be referred to or understood as a satellite AP. In deployments involving a root AP and multiple satellite APs, delay may be incurred at each 'hop' (such as at each satellite AP) between the root AP and a wireless station (STA), which may contribute meaningfully to an end-to-end delay between the root AP and the wireless STA. A large end-to-end delay may be detrimental to some applications, such as latency sensitive applications (including extended reality (XR) applications, virtual reality (VR) applications, and the like). In some deployments, a significant portion of an end-to-end delay may be attributed to an availability (or lack thereof) of medium access opportunities across the multiple hops between the root AP and the wireless STA.

Various aspects relate generally to channel access techniques in a multi-hop framework for ultra-high reliability (UHR), including at least for latency sensitive applications associated with relatively stringent delay bounds. Some aspects more specifically relate to a transmission opportunity (TXOP) sharing mechanism according to which wireless communication devices can relay data frames along multiple hops (such as across multiple satellite APs) within a same TXOP, a coordinated (and fully scheduled) medium access scheme associated with relaying data frames between a root AP and a wireless STA in accordance with multiple time epochs (such as via multiple service periods (SPs)

associated with the multiple time epochs), and various signaling mechanisms and frame formats according to which wireless communication devices can exchange or negotiate information associated with a coordinated medium access scheme. In some implementations, the coordinated medium access scheme may be associated with multiple time epochs (each associated with an SP) including at least a first time epoch (and first associated SP) for relaying a data frame across one or more backhaul links of a multi-hop path and a second time epoch (and second associated SP) for relaying the data frame across a fronthaul link of the multi-hop path.

Various communication devices may coordinate on wireless medium access across the multiple time epochs in accordance with differentiated priorities between the communication devices for each of the multiple time epochs (such that a wireless communication device may obtain medium access in accordance with a first time epoch at which a first, higher priority set of channel access parameters may apply but not in accordance with a second time epoch at which a second, lower priority set of channel access parameters may apply). Further, a timing or scheduling of the multiple time epochs, as well as an assigning of different medium access priorities to different devices for each of the multiple time epochs, may be based on a data traffic to or from a wireless STA (such as an order of flow associated with the data traffic to or from the wireless STA). As described herein, obtaining medium access or communicating in accordance with a time epoch may be understood as obtaining medium access or communicating at a time instance associated with the time epoch, within a threshold time period after the time epoch (such as during an associated SP), or otherwise in accordance with parameters configured for (and/or activated at) the time epoch.

Wireless communication devices may implement the coordinated medium access scheme with or without TXOP sharing. In examples in which wireless communication devices implement the coordinated medium access scheme with TXOP sharing, a first wireless communication device may access a wireless medium to transmit a data frame along a multi-hop path in accordance with a first time epoch (such as during a first SP) and may share at least a portion of a transmission opportunity with a second wireless communication device (a next hop wireless communication device, such as a satellite AP). As such, the second wireless communication device may receive the data frame and, based on the TXOP sharing, may additionally transmit the data frame along the multi-hop path to a further downstream wireless communication device (such as another satellite AP). In examples in which wireless communication devices implement the coordinated medium access scheme without TXOP sharing, a first wireless communication device (such as a root AP or a first satellite AP) may access a wireless medium and transmit a data frame along a multi-hop path in accordance with a first time epoch (such as during a first SP) and a second wireless communication device (a further downstream satellite AP), which may receive the data frame, may access the wireless medium and transmit the data frame along the multi-hop path in accordance with a second (such as next) time epoch (such as during a second SP). In some aspects, a time epoch (an instance in time) may be associated with a timing synchronization function (TSF) timer.

Further, although sometimes described in the context of a relay path from one wireless communication device to another wireless communication device, wireless communication devices may implement the coordinated medium access scheme with or without TXOP sharing in various deployment scenarios, including relay scenarios, mesh scenarios (such as 802.11s-based mesh scenarios), or any other scenarios associated with (such as involving) device-to-device (such as AP to AP, or AP to STA, or STA to STA) communication. For example, multiple wireless communication devices may communication in accordance with the coordinated medium access scheme described herein to coordinate transmissions in a mesh type scenario, with or without relaying, and with or without TXOP sharing. As such, a multi-hop link or a multi-hop path may refer to a multi-hop relay link or a multi-hop relay path, or may generally refer to any other wireless communication involving, for example, coordination among three or more wireless communication devices.

Particular aspects of the subject matter described in this disclosure can be implemented to realize one or more of the following potential advantages. For example, in accordance with supporting a TXOP sharing mechanism according to which wireless communication devices can relay data frames along multiple hops (such as across multiple satellite APs) within a same TXOP, wireless communication devices may achieve lower medium access latency, fewer collisions, and more aptly and dynamically support aperiodic latency sensitive traffic by enabling relatively 'on-the-fly' medium access in multi-hop frameworks. Further, in accordance with supporting a coordinated medium access scheme, wireless communication devices may experience more predictable channel access through differentiated prioritization on a time epoch-by-time epoch (or SP-by-SP) basis (such as differentiated prioritization relating to which devices may access a channel or medium at a given time). Moreover, in accordance with supporting TXOP sharing within a coordinated medium access scheme, wireless communication devices may experience more predictable and lower latency channel access in a manner that is adaptable to (or that ubiquitously supports, or both) both periodic and aperiodic latency sensitive traffic.

Further, by supporting a coordinated medium access scheme with successive TXOPs (such that different devices access the medium during different, successive TXOPs in accordance with a prioritization of the relay traffic), wireless communication devices may efficiently relay traffic in various deployment scenarios, including deployment scenarios in which relay traffic is sent via different channels across hops (such as from backhaul to fronthaul, or vice versa). Additionally, the described signaling mechanisms and frame formats according to which wireless communication devices can exchange or negotiate information associated with a coordinated medium access scheme may facilitate greater coordination with efficient signaling overhead. By facilitating lower latency, fewer collisions, and more support for both aperiodic and periodic latency sensitive traffic in multi-hop frameworks, the described techniques may be implemented to also achieve greater system capacity, greater spectral efficiency, higher data rates, and improved user experience, among other benefits.

FIG. 1 shows a pictorial diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8). The WLAN 100 may include numerous wireless communication devices such as a wireless AP 102 and multiple wireless STAs1. While only one AP 102 is shown in FIG. 1, the WLAN 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell which is supported by an AP 102 serving as a miniature base station. Further, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (such as TVs (including smart TVs), computer monitors, navigation systems, among others), music or other audio or stereo devices, remote control devices ("remotes"), printers, kitchen appliances (including smart refrigerators) or other household appliances, key fobs (such as for passive keyless entry and start (PKES) systems), Internet of Things (IoT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (such as the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some examples of the APs 102 and STAs 104 described herein also may communicate in other frequency bands, such as the 5.9 GHz and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4 GHz, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it may wait for a particular time and then contend for access to the wireless medium. The DCF is implemented through the use of time intervals (including the slot time (or "slot interval") and the inter-frame space (IFS). IFS provides priority access for control frames used for proper network operation. Transmissions may begin at slot boundaries. Different varieties of IFS exist including the short IFS (SIFS), the distributed IFS (DIFS), the extended IFS (EIFS), and the arbitration IFS (AIFS). The values for the slot time and IFS may be provided by a suitable standard specification, such as one or more of the IEEE 802.11 family of wireless communication protocol standards.

In some implementations, the wireless communication device may implement the DCF through the use of carrier sense multiple access (CSMA) with collision avoidance (CA) (CSMA/CA) techniques. According to such techniques, before transmitting data, the wireless communication device may perform a clear channel assessment (CCA) and may determine (such as identify, detect, ascertain, calculate, or compute) that the relevant wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine (such as identify, detect, ascertain, calculate, or compute) whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy.

Virtual carrier sensing is accomplished via the use of a network allocation vector (NAV), which effectively serves as a time duration that elapses before the wireless communication device may contend for access even in the absence of a detected symbol or even if the detected energy is below the relevant threshold. The NAV is reset each time a valid frame is received that is not addressed to the wireless communication device. When the NAV reaches 0, the wireless communication device performs the physical carrier sensing. If the channel remains idle for the appropriate IFS, the wireless communication device initiates a backoff timer, which represents a duration of time that the device senses the medium to be idle before it is permitted to transmit. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has "won" contention for the wireless medium. The TXOP duration may be indicated in the U-SIG field of a PPDU. If, on the other hand, one or more of the carrier sense mechanisms indicate that the channel is busy, a MAC controller within the wireless communication device will not permit transmission.

Each time the wireless communication device generates a new PPDU for transmission in a new TXOP, it randomly selects a new backoff timer duration. The available distribution of the numbers that may be randomly selected for the backoff timer is referred to as the contention window (CW). There are different CW and TXOP durations for each of the four access categories (ACs): voice (AC_VO), video (AC VI), background (AC_BK), and best effort (AC BE). This enables particular types of traffic to be prioritized in the network.

Some APs 102 and STAs 104 may implement spatial reuse techniques. For example, APs 102 and STAs 104 configured for communications using IEEE 802.11ax or 802.11be may be configured with a BSS color. APs 102 associated with different BSSs may be associated with different BSS colors. A BSS color is a numerical identifier of an AP's respective BSS (such as a 6 bit field carried by the SIG field). Each STA 104 may learn its own BSS color based on association with the respective AP 102. BSS color information is communicated at both the PHY and MAC sublayers. If an AP 102 or a STA 104 detects, obtains, selects, or identifies, a wireless packet from another wireless communication device while contending for access, the AP 102 or STA 104 may apply different contention parameters in accordance with whether the wireless packet is transmitted by, or transmitted to, another wireless communication device within its BSS or from a wireless communication device from an overlapping BSS (OBSS), as determined, identified, ascertained, or calculated by a BSS color indication in a preamble of the wireless packet. For example, if the BSS color associated with the wireless packet is the same as the BSS color of the AP 102 or STA 104, the AP 102 or STA 104 may use a first received signal strength indication (RSSI) detection threshold when performing a CCA on the wireless channel. However, if the BSS color associated with the wireless packet is different than the BSS color of the AP 102 or STA 104, the AP 102 or STA 104 may use a second RSSI detection threshold in lieu of using the first RSSI detection threshold when performing the CCA on the wireless channel, the second RSSI detection threshold being greater than the first RSSI detection threshold. In this way, the criteria for winning contention are relaxed when interfering transmissions are associated with an OBSS.

Some APs 102 and STAs 104 may implement techniques for spatial reuse that involve participation in a coordinated communication scheme. According to such techniques, an AP 102 may contend for access to a wireless medium to obtain control of the medium for a TXOP. The AP 102 that wins the contention (hereinafter also referred to as a "sharing AP") may select one or more other APs 102 (hereinafter also referred to as "shared APs") to share resources of the TXOP. The sharing and shared APs 102 may be located in proximity to one another such that at least some of their wireless coverage areas at least partially overlap. Some examples may specifically involve coordinated AP TDMA or OFDMA techniques for sharing the time or frequency resources of a TXOP. To share its time or frequency resources, the sharing AP 102 may partition the TXOP into multiple time segments or frequency segments each including respective time or frequency resources representing a portion of the TXOP, The sharing AP 102 may allocate the time or frequency segments to itself or to one or more of the shared APs 102. For example, each shared AP 102 may utilize a partial TXOP assigned by the sharing AP 102 for its uplink or downlink communications with its associated STAs 104.

In some examples of such TDMA techniques, each portion of a plurality of portions of the TXOP includes a set of time resources that do not overlap with any time resources of any other portion of the plurality of portions. In such examples, the scheduling information may include an indication of time resources, of multiple time resources of the TXOP, associated with each portion of the TXOP. For example, the scheduling information may include an indication of a time segment of the TXOP such as an indication of one or more slots or sets of symbol periods associated with each portion of the TXOP such as for multi-user TDMA.

In some other examples of OFDMA techniques, each portion of the plurality of portions of the TXOP includes a set of frequency resources that do not overlap with any frequency resources of any other portion of the plurality of portions. In such implementations, the scheduling information may include an indication of frequency resources, of multiple frequency resources of the TXOP, associated with each portion of the TXOP. For example, the scheduling information may include an indication of a bandwidth portion of the wireless channel such as an indication of one or more subchannels or resource units (RUs) associated with each portion of the TXOP such as for multi-user OFDMA.

In this manner, the sharing AP's acquisition of the TXOP enables communication between one or more additional shared APs 102 and their respective BSSs, subject to appropriate power control and link adaptation. For example, the sharing AP 102 may limit the transmit powers of the selected shared APs 102 such that interference from the selected APs 102 does not prevent STAs 104 associated with the TXOP owner from successfully decoding packets transmitted by the sharing AP 102. Such techniques may be used to reduce latency because the other APs 102 may not need to wait to win contention for a TXOP to be able to transmit and receive data according to conventional CSMA/CA or enhanced distributed channel access (EDCA) techniques. Additionally, by enabling a group of APs 102 associated with different BSSs to participate in a coordinated AP transmission session, during which the group of APs 102 may share at least a portion of a single TXOP obtained by any one of the participating APs 102, such techniques may increase throughput across the BSSs associated with the participating APs 102 and also may achieve improvements in throughput fairness. Further, with appropriate selection of the shared APs 102 and the scheduling of their respective time or frequency resources, medium utilization may be maximized or otherwise increased while packet loss resulting from OBSS interference is minimized or otherwise reduced. Various implementations may achieve these and other advantages without requiring that the sharing AP 102 or the shared APs 102 be aware of the STAs 104 associated with other BSSs, without requiring a preassigned or dedicated master AP 102 or preassigned groups of APs 102, and without requiring backhaul coordination between the APs 102 participating in the TXOP.

In some examples in which the signal strengths or levels of interference associated with the selected APs 102 are relatively low (such as less than a given value), or when the decoding error rates of the selected APs 102 are relatively low (such as less than a threshold), the start times of the communications among the different BSSs may be synchronous. Conversely, when the signal strengths or levels of interference associated with the selected APs 102 are relatively high (such as greater than the given value), or when the decoding error rates of the selected APs 102 are relatively high (such as greater than the threshold), the start times may be offset from one another by a time period associated with decoding the preamble of a wireless packet and determining, from the decoded preamble, whether the wireless packet is an intra-BSS packet or is an OBSS packet. For example, the time period between the transmission of an intra-BSS packet and the transmission of an OBSS packet may allow a respective AP 102 (or its associated STAs 104) to decode the preamble of the wireless packet and obtain the BSS color value carried in the wireless packet to determine whether the wireless packet is an intra-BSS packet or an OBSS packet. In this manner, each of the participating APs 102 and their associated STAs 104 may be able to receive and decode intra-BSS packets in the presence of OBSS interference.

In some implementations, the sharing AP 102 may perform polling of a set of un-managed or non-co-managed APs 102 that support coordinated reuse to identify candidates for future spatial reuse opportunities. For example, the sharing AP 102 may transmit one or more spatial reuse poll frames as part of determining one or more spatial reuse criteria and selecting one or more other APs 102 to be shared APs 102. According to the polling, the sharing AP 102 may receive responses from one or more of the polled APs 102. In some specific examples, the sharing AP 102 may transmit a coordinated AP TXOP indication (CTI) frame to other APs 102 that indicates time and frequency of resources of the TXOP that can be shared. The sharing AP 102 may select one or more candidate APs 102 in accordance with receiving a coordinated AP TXOP request (CTR) frame from a respective candidate AP 102 that indicates a desire by the respective AP 102 to participate in the TXOP. The poll responses or CTR frames may include a power indication, for example, an RX power or RSSI measured by the respective AP 102. In some other examples, the sharing AP 102 may directly measure potential interference of a service supported (such as UL transmission) at one or more APs 102, and select the shared APs 102 based on the measured potential interference. The sharing AP 102 generally selects the APs 102 to participate in coordinated spatial reuse such that it still protects its own transmissions (which may be referred to as primary transmissions) to and from the STAs 104 in its BSS. The selected APs 102 may then be allocated resources during the TXOP as described herein.

APs 102 and STAs 104 can support multi-user (MU) communications; that is, concurrent transmissions from one device to each of multiple devices (such as multiple simultaneous downlink (DL) communications from an AP 102 to corresponding STAs 104), or concurrent transmissions from multiple devices to a single device (such as multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including multiple frequency subcarriers (also referred to as "tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs also may be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP 102 also may designate one or more random access (RA) RUs that unscheduled STAs 104 may contend for.

Some wireless communication devices (including both APs 102 and STAs 104) are capable of multi-link operation (MLO). In some implementations, MLO supports establishing multiple different communication links (such as a first link on the 2.4 GHz band, a second link on the 5 GHz band, and the third link on the 6 GHz band) between the STA 104 and the AP 102. Each communication link may support one or more sets of channels or logical entities. In some cases, each communication link associated with a given wireless communication device may be associated with a respective radio of the wireless communication device, which may include one or more transmit/receive (Tx/Rx) chains, include or be coupled with one or more physical antennas, or include signal processing components, among other components. An MLO-capable device may be referred to as a multi-link device (MLD). For example, an AP MLD may include multiple APs 102 each configured to communicate on a respective communication link with a respective one of multiple STAs 104 of a non-AP MLD (also referred to as a "STA MLD"). The STA MLD may communicate with the AP MLD over one or more of the multiple communication links at a given time.

One type of MLO is multi-link aggregation (MLA), where traffic associated with a single STA 104 is simultaneously transmitted across multiple communication links in parallel to maximize the utilization of available resources to achieve higher throughput. That is, during at least some duration of time, transmissions or portions of transmissions may occur over two or more links in parallel at the same time. In some implementations, the parallel wireless communication links may support synchronized transmissions. In some other examples, or during some other durations of time, transmissions over the links may be parallel, but not be synchronized or concurrent. In some examples or durations of time, two or more of the links may be used for communications between the wireless communication devices in the same direction (such as all uplink or all downlink). In some other examples or durations of time, two or more of the links may be used for communications in different directions. For example, one or more links may support uplink communications and one or more links may support downlink communications. In such examples, at least one of the wireless communication devices operates in a full duplex mode. Generally, full duplex operation enables bi-directional communications where at least one of the wireless communication devices may transmit and receive at the same time.

MLA may be implemented in various ways. In some implementations, MLA may be packet-based. For packet-based aggregation, frames of a single traffic flow (such as all traffic associated with a given traffic identifier (TID)) may be sent concurrently across multiple communication links. In some other examples, MLA may be flow-based. For flow-based aggregation, each traffic flow (such as all traffic associated with a given TID) may be sent using a single one of multiple available communication links. As an example, a single STA MLD may access a web browser while streaming a video in parallel. The traffic associated with the web browser access may be communicated over a first communication link while the traffic associated with the video stream may be communicated over a second communication link in parallel (such that at least some of the data may be transmitted on the first channel concurrently with data transmitted on the second channel).

In some other examples, MLA may be implemented as a hybrid of flow-based and packet-based aggregation. For example, an MLD may employ flow-based aggregation in situations in which multiple traffic flows are created and may employ packet-based aggregation in other situations. The determination to switch among the MLA techniques or modes may additionally, or alternatively, be associated with other metrics (such as a time of day, traffic load within the network, or battery power for a wireless communication device, among other factors or considerations).

To support MLO techniques, an AP MLD and a STA MLD may exchange supported MLO capability information (such as supported aggregation type or supported frequency bands, among other information). In some implementations, the exchange of information may occur via a beacon signal, a probe request or probe response, an association request or an association response frame, a dedicated action frame, or an operating mode indicator (OMI), among other examples. In some implementations, an AP MLD may designate a given channel in a given band as an anchor channel (such as the channel on which it transmits beacons and other management frames). In such examples, the AP MLD also may transmit beacons (such as ones which may contain less information) on other channels for discovery purposes.

MLO techniques may provide multiple benefits to a WLAN. For example, MLO may improve user perceived throughput (UPT) (such as by quickly flushing per-user transmit queues). Similarly, MLO may improve throughput by improving utilization of available channels and may increase spectral utilization (such as increasing the bandwidth-time product). Further, MLO may enable smooth transitions between multi-band radios (such as where each radio may be associated with a given RF band) or enable a framework to set up separation of control channels and data channels. Other benefits of MLO include reducing the ON time of a modem, which may benefit a wireless communication device in terms of power consumption. Another benefit of MLO is the increased multiplexing opportunities in the case of a single BSS. For example, multi-link aggregation may increase the quantity of users per multiplexed transmission served by the multi-link AP MLD.

Some Wi-Fi deployments are trending toward increasingly mesh-like or mesh-based topologies, which may be associated with (such as involve) a deployment or use of multiple APs 102 within a geographic area (such as a home, an office, a factory floor, or any other Wi-Fi equipped area). For example, a single AP 102 may fail to provide sufficient coverage for an entire area on its own. As such, a consumer may elect to deploy or use multiple APs 102 within the area, and each of the multiple APs 102 may be connected to at least one other AP 102 via an Ethernet link (such as a wired link) and/or a Wi-Fi link (such as a wireless link) to form backhaul links between the multiple APs 102. As such, each AP 102 may route, directly or indirectly, information between the internet and an end user, such as a wireless STA 104 used by the end user. An AP 102 that is directly connected to the internet may be referred to or understood as a root AP 102 and an AP 102 that is not directly connected to the internet may be referred to or understood as a satellite AP 102. In deployments involving a root AP 102 and multiple satellite APs 102, delay may be incurred at each 'hop' (such as at each satellite AP 102) between the root AP 102 and a wireless STA 104, which may contribute meaningfully to an end-to-end delay between the root AP 102 and the wireless STA 104. A large end-to-end delay may be detrimental to some applications, such as latency sensitive applications (including XR applications, VR applications, and the like). In some deployments, a significant portion of an end-to-end delay may be attributed to medium access opportunities across the multiple hops between the root AP 102 and the wireless STA 104.

Various aspects relate generally to channel access techniques in a multi-hop framework for UHR, including at least for latency sensitive applications associated with relatively stringent delay bounds. Some aspects more specifically relate to a TXOP sharing mechanism according to which wireless communication devices can relay data frames along multiple hops (such as across multiple satellite APs 102) within a same TXOP, a coordinated (and/or fully scheduled) medium access scheme associated with relaying data frames between a root AP 102 and a wireless STA 104 in accordance with multiple time epochs (and/or via multiple SPs associated with the multiple time epochs), and various signaling mechanisms and frame formats according to which wireless communication devices can exchange or negotiate information associated with a coordinated medium access scheme. In some implementations, the coordinated medium access scheme may be associated with multiple time epochs including at least a first time epoch for relaying a data frame via one or more backhaul links of a multi-hop path and a second time epoch for relaying the data frame via a fronthaul link of the multi-hop path.

Different communication devices may coordinate on wireless medium access across the multiple time epochs in accordance with differentiated priorities between the communication devices for each of the multiple time epochs. For example, a wireless communication device may obtain medium access at or during (or within a threshold time period after) a first time epoch but not a second time epoch in accordance with having different medium access priorities for the first time epoch and the second time epoch. Further, a timing or scheduling of the multiple time epochs, as well as an assigning of different medium access priorities to different devices for each of the multiple time epochs, may be based on a data traffic to or from a wireless STA. For example, the multiple time epochs (such as the SPs associated with the multiple time epochs) of the coordinated medium access scheme may be scheduled in a back-to-back manner in accordance with data traffic characteristics (such as a delay bound or other latency constraint) associated with a data traffic to a wireless STA 104.

Some example medium access priorities may include a quieting duration for one or more wireless communication devices, differentiated EDCA parameters for one or more wireless communication devices, multi-user (MU)-EDCA parameters for one or more wireless communication devices, whether a restarting of a random backoff counter at a beginning of a time epoch is to be performed by one or more wireless communication devices, power control operations or information applicable to one or more wireless communication devices, or any combination thereof. In some aspects, power control operations or information applicable to one or more wireless communication devices for medium access priority may be associated with how different wireless communication devices (such as different APs 102) may select different transmission powers for respective transmissions such that other devices (such as other APs 102) in the neighborhood are silenced. In some aspects, using a quieting duration for one or more wireless communication devices for medium access priority may be associated with how different wireless communication devices may select different quieting periods (periods during which a wireless communication device selects to stay silent and refrain from transmitting) in a coordinated manner (such as to efficiently relay communication from a root AP 102 to a wireless STA 104).

Additionally, in some implementations, medium access priority may relate to how different wireless communication devices (such as a root AP 102 or a satellite AP 102) can adjust one or more EDCA parameters for one or more flow identifiers (such as TIDs or SCS identifiers (SCSIDs)) such that a subset of wireless communication devices (such as a subset of APs 102) have priority to gain access to the medium. For example, for a downlink case, a root AP 102 may gain access during a first epoch (such as by selecting a countdown value from a lower CW range or a lower AIFS number (AIFSN) value) while a downstream satellite AP 102 may have a higher CW range (or a higher AIFSN value). By having a lower CW, it may be likely that the root AP 102 may gain (such as win) access to the medium before the downstream satellite AP 102. Accordingly, in some implementations (such as in accordance with the described coordinated medium access schemes), the downstream satellite AP 102 may have priority access by selecting a lower CW (while the root AP 102 selects a higher CW). In some implementations, such medium access priority information may be signaled between devices to facilitate (or as part of) a coordinated medium access scheme. Additionally, in some implementations, devices not participating in the multi-link path (such as previous generation or lower capability devices) may be deprioritized via higher EDCA parameters announced by an AP 102 (such as a root AP 102 or a satellite AP 102). For example, on either or both of a fronthaul channel and a backhaul channel, associated devices (such as associated legacy devices) may be deprioritized from channel access in accordance with an AP 102 transmitting indications of relatively higher EDCA parameters in an EDCA Parameter Set information element (which may be referenced by devices that do not follow an MU-EDCA parameter set), and such relatively higher EDCA parameters (such as a relatively larger CW value) may be associated with lower priority channel access or may otherwise result in a lower likelihood of channel access. Some other devices may receive medium access priority information via an MU-EDCA Parameter element, which an AP 102 may transmit via one or more frames (such as one or more Beacon frames).

Further, medium access priorities may be assigned (explicitly or implicitly) to devices along a multi-hop path to facilitate the relay. For example, for a downlink flow, a root AP 102 may have a highest priority for accessing the wireless medium at or within a threshold time period after an initial time epoch (such as during an initial SP associated with the initial time epoch), a next hop satellite AP 102 may have a highest priority for accessing the wireless medium at or within a threshold time period after a next time epoch (such as during an immediately subsequent SP associated with the next time epoch), and so on such that medium access priorities may be associated with (such as based on) an overall system topology between a root AP 102 and a wireless STA 104. For an uplink flow, an inverse may be applicable, such that the wireless STA 104 has a highest priority for accessing the wireless medium at or within a threshold time period after an initial time epoch (such as during an initial SP associated with the initial time epoch) and each next upstream wireless communication device may, in turn, have a relative highest priority for accessing the wireless medium until a final satellite AP 102 obtains medium access for relaying to the root AP 102. In some aspects, medium access priority may be based on one or more channel access parameters, such as a contention window (CW) counter (such that a smaller CW counter may be associated with relatively higher priority access and a larger CW counter may be associated with relatively lower priority access). In some aspects, signaled medium access information may indicate a pattern associated with the different priorities of different devices at different times (in accordance with an order of flow, such as in accordance with one of uplink or downlink flow).

Accordingly, in some implementations, medium access priority may be in accordance with prioritizing one direction (uplink or downlink) over the other (downlink or uplink). In some other implementations, medium access prioritization may be more flexible and a coordinated medium access scheme may support prioritization of one or both of uplink and downlink. For example, at each hop, a coordinated medium access scheme may prioritize the uplink or the downlink, or both (within the same TXOP or SP). In other words, the relay resources over the multi-hop (such as relay) path may be dedicated just for uplink and, accordingly, a coordinated medium access scheme may prioritize the delivery of the uplink flow through the relay path on all the hops (such as successive medium access resources (including successive TXOPs and/or successive SPs) just for uplink). Additionally, or alternatively, the relay resources over the multi-hop (such as relay) path may be dedicated just for downlink and, accordingly, a coordinated medium access scheme may prioritize the delivery of the downlink flow through the relay path on all the hops (such as successive medium access resources (including successive TXOPs and/ or successive SPs) just for downlink).

In some implementations, such medium access prioritization (differentiated EDCA) may be extended to sets of multiple APs 102. For example, in a scenario of 16 APs 102, there may be 4 sets each including 4 APs 102. At each time epoch (or corresponding SP) or TXOP, one set (of the 4 sets of 4 APs 102) may obtain priority access (such as be configured with a relatively smaller CW counter) while APs 102 in the other sets may be configured with relatively larger CW counters. Different sets of APs 102 may have different priorities (such as different channel access parameters) in accordance with a pattern (such as a pattern signaled via medium access information) across different times or TXOPs.

Further, one or more wireless communication devices may support one or both of negotiation and discovery of one or more operational parameters or capabilities for different medium access techniques, and may implement a given medium access technique (which may be equivalently referred to as a coordinated medium access scheme) in accordance with the negotiated and/or discovered parameters or capabilities. In some aspects, signaling associated with negotiation and discovery may occur at the same time or at different times. For example, first signaling associated with discovery of one or more operational parameters or capabilities for different medium access techniques may occur during an initial discovery and/or during capability exchange, while second signaling associated with negotiating channel access and coordination mechanisms (such as what rules may apply for coordination, what scheme to use for coordination, and the like) may occur after initial discovery and/or capability exchange. Such negotiation and/or discovery may include negotiation and/or discovery of parameters associated with schemes that leverage (such as use) epochs and/or SPs or parameters associated with schemes that do not leverage (such as do not use) epochs and/or SPs, or both. In some aspects, such negotiation and/or discovery may occur during setup, such as during an initial setup of a root AP 102 and of one or more satellite APs 102 (such as immediately after discovery) and/or each time there is a new flow (as part of an end-to-end setup for that flow). If performed each time there is a new flow, the negotiation and/or discovery may be part of a frame exchange associated with a stream classification service (SCS).

Additionally, or alternatively, when a relay path is altered (such as when a STA 104 moves to another AP 102, which can be a root AP 102 or a satellite AP 102), at least some of the wireless communication devices associated with the relay path may coordinate to update the relay path and the related operations. For example, the STA 104 and/or one or more APs 102 may perform frame exchanges to establish and/or update one or more medium access parameters, which may include timing information associated with epochs or SPs, medium prioritization parameters, what coordinated medium access scheme is to be used, and the like. Further, as used herein, performing a frame exchange, or otherwise participating in communication, may be understood as transmitting or receiving, or both.

Figure 2:
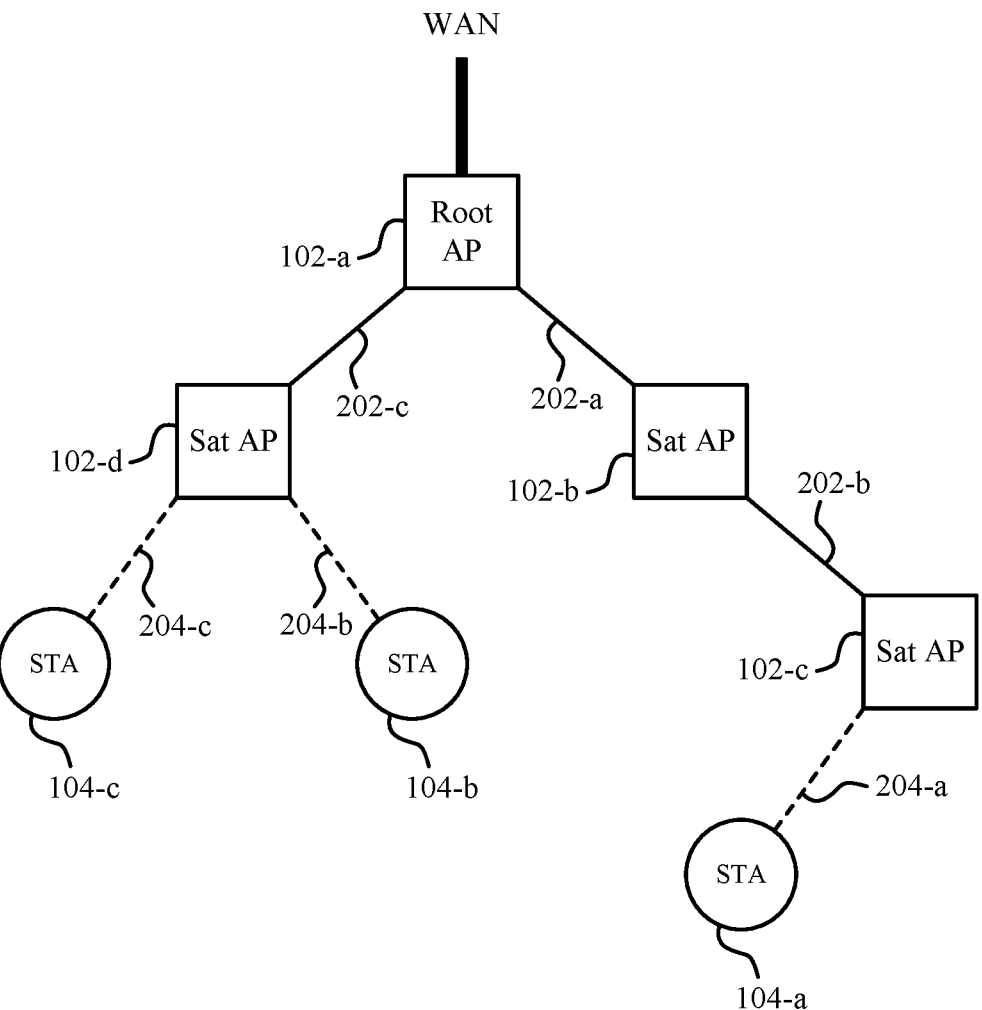
FIG. 2 shows an example of a wireless communications system that supports channel access techniques in a multi-hop framework for ultra-high reliability (UHR) according to some aspects of the present disclosure.

FIG. 2 shows an example of a wireless communications system 200 that supports channel access techniques in a multi-hop framework for ultra-high reliability according to some aspects of the present disclosure. The wireless communications system 200 illustrates communication between various wireless communication devices in accordance with a mesh-like or mesh-based system topology. For example, the wireless communications system 200 illustrates communication between a root AP 102-*a*, satellite APs 102-*b*, 102-*c*, and 102-*d*, and wireless STAs 104-*a*, 104-*b*, and 104-*c*. The root AP 102-*a* and the satellite APs 102-*b*, 102-*c*, and 102-*d* may communicate with each other via one or more backhaul links. Each of the wireless STAs 104-*a*, 104-*b*, and 104-*c* may communicate with at least one AP 102 (and potentially multiple APs 102) via at least one fronthaul link. In some aspects, the root AP 102-*a* may be directly connected to the internet, which may be referred to as or otherwise understood as a wide area network (WAN). The satellite APs 102-*b*, 102-*c*, and 102-*d* may be indirectly connected to the internet via at least the root AP 102-*a*. As such, a satellite AP 102 may directly or indirectly relay data traffic between the root AP 102-*a* (the internet) and one or more wireless STAs 104.

In the example of the wireless communications system 200, the root AP 102-*a* may communicate with the satellite AP 102-*b* via a backhaul link 202-*a*, the satellite AP 102-*b* may communicate with the satellite AP 102-*c* via a backhaul link 202-*b*, and the root AP 102-*a* may communicate with the satellite AP 102-*d* via a backhaul link 202-*c*. As further illustrated in the example of the wireless communications system 200, the satellite AP 102-*c* may communicate with the wireless STA 104-*a* via a fronthaul link 204-*a* and the satellite AP 102-*d* may communicate with the wireless STA 104-*b* and the wireless STA 104-*c* via a fronthaul link 204-*b* and a fronthaul link 204-*c*, respectively. As described herein, a wireless communication device may refer to any of the root AP 102-*a*, the satellite APs 102-*b*, 102-*c*, and 102-*d*, or the wireless STAs 104-*a*, 104-*b*, and 104-*c*.

In some cases, such as in an average size single-family home, a single AP 102 may not provide enough Wi-Fi coverage for the entire home, including the yard. As such, a consumer may elect to install multiple APs 102 in accordance with a type of mesh deployment. In accordance with some mesh type deployments, APs 102 may be connected via an Ethernet cable or a Wi-Fi link to form a backhaul and each AP 102 may be capable of supporting a fronthaul that serves an end STA 104. In some implementations, a fronthaul link may be associated with a different channel than a backhaul link. Some of such mesh type deployments may be associated with an easy mesh (or EasyMesh) based design, which may involve a wireless distribution system (WDS) using a multi-address mode (such as a 4-address mode) in the backhaul with a tree or daisy-chained like topology. Some other mesh type deployments may be associated with a full mesh topology, which may involve a 'flat' topology in which any given device may connect to one or multiple other devices (without a configured hierarchy). In some aspects, such a full mesh topology may be associated with or otherwise referred to as an 802.11s based mesh topology. The multi-hop link (such as the multi-hop path or framework) described herein may relate to any one or more of such types of mesh deployments.

In some aspects, the AP 102-*a* that has access to the WAN may be referred to or understood as a root AP while an intermediate AP 102 (such as a relay AP 102) may be referred to or understood as a satellite AP 102. A satellite AP 102 may be equivalently referred to as a Sat AP 102. A mesh type deployment may provide mechanisms to enable communication between the WAN and any STA 104 on a network (such as a home network), any two STAs 104 within the network, or any two APs 102 within the network. In some aspects, a controller at the root AP 102-*a* may control the satellite APs 102-*b*, 102-*c*, and 102-*d*.

Some of the wireless communication devices illustrated in the example of the wireless communications system 200 may be associated with multiple functionalities, components, or (physical or logical) entities. For example, each satellite AP 102 may be associated with a non-AP STA instance (which may be referred to as a backhaul STA or "bSTA") that associates with (such as communicates with) an upstream AP 102 and an upstream AP instance (which may be referred to as a backhaul BSS or "bBSS") that services a downstream bSTA. If there are multiple links and the root AP 102-*a* and a satellite AP 102 communicate in accordance with MLO, the bSTA may be (or otherwise operate or function as) a non-AP MLD and an upstream AP may be (or otherwise operate or function as) an AP MLD.

In some cases, wireless communication devices in the wireless communications system 200 may incur a significant delay because of a relay operation. In other words, the relay operation between the root AP 102-*a* and, for example, the wireless STA 104-*a* may incur additional delay in each hop between the root AP 102-*a* and the wireless STA 104-*a*, as each satellite AP 102 may be constrained to wait for channel access before performing a transmission to the next hop (such as to the bSTA of the next hop). Such channel access-based delay may adversely impact all applications at an end STA, and may have a relatively larger negative impact on latency sensitive data traffic. For example, for some UHR applications, some amount of delay introduced by a relay operation may be unsuitable and adversely impact a quality and user experience associated with such UHR applications.

Accordingly, the described techniques may be implemented to support one or more mechanisms to improve end-to-end latency in a relay scenario to satisfy constraints associated with latency sensitive applications. In accordance with the described techniques, wireless communication devices associated with a multi-hop path (which may be equivalently referred to as a multi-hop link or a multi-hop link framework) may support one or more channel access designs for multi-hop relay to satisfy one or more quality of service (QoS) constraints. Such QoS constraints may include data traffic characteristics, such as latency constraints or delay bounds associated with latency sensitive traffic. For example, some applications (such as an XR application or a gaming application) may have tight latency constraints in the downlink and/or the uplink. Such tight latency constraints may include, for example, a delay bound of 10 milliseconds or a round trip time (RTT) of less than 15 milliseconds in the $99^{th}$ percentile (such as 99% of the time) over Wi-Fi.

In accordance with the implementations of the present disclosure, wireless communication devices may support end-to-end channel prioritization to meet (such as satisfy) latency constraints while allowing channel access, such as EDCA-based access, by a bSTA of a satellite AP 102. In some implementations, for example, one or more wireless communication devices may indicate a schedule and/or data traffic prioritization information to a downstream or upstream AP 102 via an allocation frame (priority bits) or A-Control field of a preceding MPDU. Further, in some implementations, wireless communication devices may provide support for both periodic and aperiodic traffic. In some implementations, one or more wireless communication devices may support periodic traffic by using scheduled access and triggered TXOP sharing and/or may support aperiodic traffic through dynamic resource requests and allocations. Additionally, or alternatively, one or more wireless communication devices may (dynamically) exchange delay bound information to adapt to channel access delays and relay path interruptions while meeting QoS constraints (such as to facilitate AP channel contention and relay packet transmission within a threshold amount of time). In some implementations, one or more wireless communication devices may potentially suppress hidden nodes throughout a relay path to avoid an interruption of the relay sequence via various types of prioritization or medium access control mechanisms.

To facilitate a timely relay sequence within a multi-hop framework, wireless communication devices along a multi-hop path may, in some implementations, support Trigger-based channel access with TXOP sharing (such as in accordance with an MU-request to send (RTS) TXOP sharing (TXS) framework). In accordance with such TXOP sharing, wireless communication devices may enable a relay of a data frame (such as an MPDU) along multiple (such as two or three) hops within a same TXOP, which may reduce medium access latency and collisions, and which one or more wireless communication devices may leverage to support aperiodic traffic. Additionally, or alternatively, such TXOP sharing may be extended to support coordinated TDMA (C-TDMA) between APs 102.

In some aspects, dynamic TXOP sharing may provide a finite amount of time (such as between approximately 100 and 200 microseconds) for a wireless communication device with which a TXOP is shared to process and deliver a relay data packet (such as a relay MPDU), which may result in a relatively quick turnaround time for the wireless communication device with which the TXOP is shared. Accordingly, in some implementations, the wireless communication device with which the TXOP is shared may obtain more time for processing and relaying by, for example, transmitting a CTS frame (such as a CTS2Self frame). In some implementations, dynamic TXOP sharing may provide a channel access delay for a wireless communication device (such as an AP 102) to acquire the medium and transmit a control frame associated with sharing a TXOP (such as an MU-RTS TXS Trigger frame). Further, the described TXOP sharing may be performed by an AP 102 (such as a bBSS of the root AP 102-*a*) or by a STA (such as a bSTA of a satellite AP 102) to enable, facilitate, or otherwise allow for TXOP sharing to a downstream AP 102 and/or to an upstream AP 102.

Within the scope of the present disclosure, a TXOP shared by a first wireless communication device may be used for various signaling types and directions. For example, a shared TXOP may be used to relay traffic received from the first wireless communication to a second wireless communication device (a next hop satellite AP 102 or an associated wireless STA 104). Additionally, or alternatively, a shared TXOP may be used to transmit uplink signaling to the first wireless communication device. Additionally, or alternatively, a shared TXOP may be used to solicit uplink from a second wireless communication device (a next hop satellite AP 102 or an associated wireless STA 104).

Additionally, or alternatively, to facilitate a timely relay sequence within a multi-hop framework, wireless communication devices along a multi-hop path may, in some implementations, support a coordinated medium access scheme, which may be performed with or without TXOP sharing. In some aspects, such a coordinated medium access scheme may be a coordinated TWT (C-TWT)-based channel access scheme (with or without TXOP sharing), such as a coordinated restricted target wake time (C-R-TWT)-based channel access scheme, an individual (I-TWT)-based channel access scheme, a broadcast TWT (B-TWT)-based channel access scheme, an off-channel TWT-based channel access scheme, a peer-to-peer (P2P)-TWT-based channel access scheme, or any other type of TWT-based channel access scheme. As such, C-TWT may be an example of (and equivalently referred to as) C-R-TWT, I-TWT, B-TWT, off-channel TWT, or P2P-TWT. In accordance with the coordinated medium access scheme, wireless communication devices (such as APs 102) may schedule and experience more predictable channel access through differentiated EDCA or some other quieting behavior. For example, the coordinated medium access scheme may provide a time epoch (and/or an SP) for each hop along the multi-hop path, such as via C-TWT between APs 102 on each hop with differentiated access (which may be scalable in terms of quantity of hops and address periodic traffic). In an example, one or more APs 102 of interest (such as APs 102 in line to relay a data frame) may access a channel with a higher priority than other APs 102, and/or at least some APs 102 may be configured or indicated to restart a set of EDCA parameters (such as a backoff counter or a CW counter) at each time epoch (such as at a start of each SP) of the coordinated medium access scheme. Further, channel access for one or more STAs 104 may be deprioritized at or within a time period after one or more time epochs (such as within one or more SPs corresponding to the one or more time epochs) of the coordinated medium access scheme through, for example, MU-EDCA.

In some aspects, the coordinated medium access scheme may be an example of a fully scheduled medium access scheme and, as such, wireless communication devices may suitably prepare for relay transmissions along the multi-hop path. Accordingly, having a quick turnaround time to process and deliver a relay data frame (such as a relay MPDU) may be less impactful as part of the coordinated medium access scheme (as compared to, for example, more dynamic TXOP sharing). In some implementations, one or more wireless communication devices may use the described C-TWT medium access scheme with Triggered TXOP sharing to provide more dynamic access at or within a time period after a time epoch (such as within an SP) by sharing a TXOP with a next hop satellite AP 102. In some aspects, TXOP sharing within the coordinated medium access scheme may be selectively used by a wireless communication device in accordance with (such as based on) a relay data size and/or airtime to be used to relay a data frame. In some aspects, a maximum quantity of hops that can be relayed across within a shared TXOP (within C-TWT) may be configured. Such a maximum quantity of hops may be, for example, two hops, three hops, or four hops.

As such, a TXOP may be shared with up to a quantity of devices equal to the maximum quantity of hops. For example, a TXOP owner may share the TXOP with up to two other devices, up to three other devices, or up to four other devices. In examples in which the TXOP owner shares the TXOP with multiple other devices, the TXOP owner may, in some implementations, transmit an indication of a prioritization schedule for the TXOP to each of the multiple devices with which the TXOP is shared. The prioritization schedule for the TXOP may indicate priority information and/or a schedule to obtain medium access for each of the devices with which the TXOP is shared. For example, if the TXOP is shared with a first wireless communication device and a second wireless communication device, a prioritization schedule may indicate, via medium access priority information (which may be explicitly indicated or indicated more implicitly via one or more channel access parameters) and/or a medium access schedule, which of the first wireless communication device and the second wireless communication device may obtain medium access (within the shared TXOP) first (initially, such as during a first portion of the TXOP) and which of the first wireless communication device and the second wireless communication device may obtain medium access (within the shared TXOP) second (subsequently, such as during a second portion of the TXOP).

As such, the various wireless communication devices in the example of the wireless communications system 200 may support a hybrid access scheme associated with scheduled access and EDCA-based access, with time split into a series of back-to-back C-TWTs and EDCA periods (as illustrated by and described in more detail with reference to FIG. 3). One or more wireless communication devices may use the EDCA periods, which may exist or be scheduled outside of the SPs of the coordinated medium access scheme (such as at a distinct set of time epochs or at any time outside the C-TWT SPs, such as C-R-TWT SPs), for unscheduled access and dynamic triggering, such as for flushing any pending low-latency data (including for aperiodic resource allocation), for starting a new flow, or for uplink buffered unit (BU) or dynamic resource request indication. In some aspects, such a resource request could be for uplink and/or TXOP sharing (such as via an MU-RTS TXS Trigger frame, and, more specifically, an MU-RTS TXS mode 2 Trigger frame).

For scheduled access via Triggering within a TWT SP, wireless communication devices may use back-to-back C-TWT time epochs and/or back-to-back C-TWT SPs to assist in meeting an end-to-end delay bound constraint for a low-latency flow with periodic traffic. To facilitate the coordinated medium access scheme, one or more wireless communication devices may support one or more of various types of prioritization techniques. In some implementations, for example, an MU-EDCA parameter, such as an AIFSN, may be set to a zero value to manage uplink from fronthaul and backhaul non-AP STAs 104. Additionally, or alternatively, wireless communication devices may support differentiated access to prioritize an AP 102 of interest (such as an AP 102 in turn to relay a data frame), which may be applicable to APs 102 on fronthaul (such as a downstream AP 102) or backhaul (such as an upstream AP 102).

Figure 3:
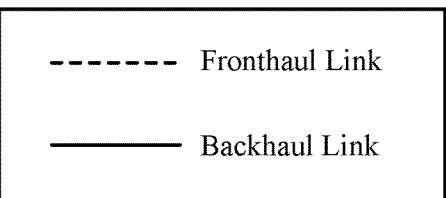
FIG. 3 shows an example of a communication timeline that supports channel access techniques in a multi-hop framework for UHR according to some aspects of the present disclosure.
Figure 3:
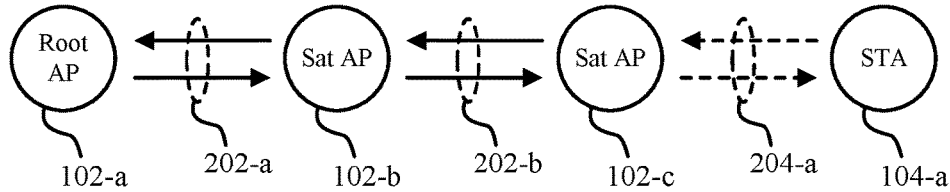
Figure 3:
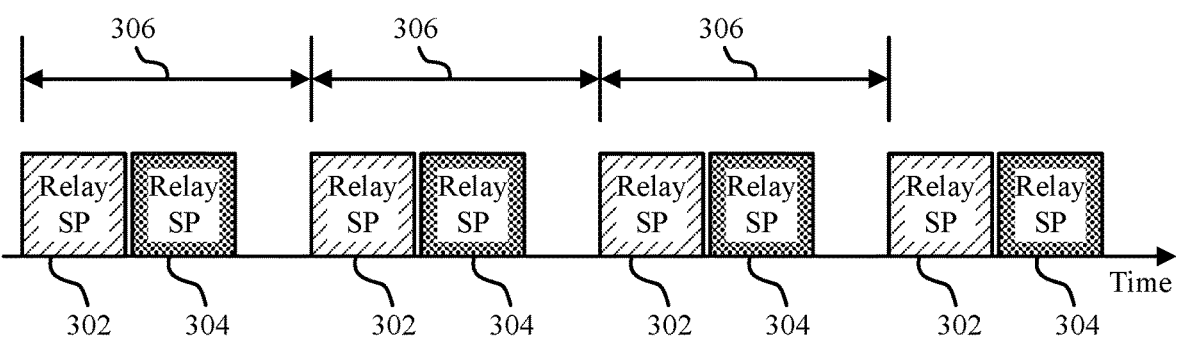
Figure 3:

FIG. 3 shows an example of a communication timeline 300 that supports channel access techniques in a multi-hop framework for ultra-high reliability according to some aspects of the present disclosure. The communication timeline 300 illustrates scheduled SPs and EDCA periods as part of a coordinated medium access scheme to support a multi-hop path between the root AP 102-a and the wireless STA 104-a via the satellite AP 102-b and the satellite AP 102-c. As illustrated in the example of the communication timeline 300, the coordinated medium access scheme may be associated with multiple SPs (each associated with a respective starting time epoch) including at least an SP 302 for backhaul relayed data frames and an SP 304 for fronthaul relayed data frames. Further, although illustrated as including one SP 302 for backhaul relayed frame, the coordinated medium access scheme may include any quantity of SPs 302 for backhaul relays (such as two backhaul relay SPs, three backhaul relay SPs, four backhaul relay SPs, and so on). In some aspects, a quantity of backhaul relay SPs may be associated with (such as equal to) a quantity of hops in the multi-hop path (such as a quantity of APs 102 between the internet and the wireless STA 104-*a*).

In some aspects, the SP 302 and the SP 304 may be scheduled in a back-to-back manner (in accordance with a delay bound or other data traffic characteristics of a latency sensitive data traffic) and may repeat in a periodic manner (in accordance with a periodic nature of the latency sensitive data traffic). In some implementations, a period 306 of the repetitions of the SP 302 and the SP 304 may be associated with (such as equal to) a periodicity of data generation (at the internet, the root AP 102-*a*, and/or the wireless STA 104-*a*) associated with the latency sensitive data traffic. As such, subsequent SPs on both the backhaul and the fronthaul may be scheduled and used to achieve timely relay delivery.

In some implementations, the wireless communication devices associated with the multi-hop path may communicate resource constraints, expectations, or requests on the relay path and the SPs 302 and the SPs 304 may be scheduled in accordance with the resource constraints, expectations, or requests. For example, a satellite AP 102 may provide consolidated buffer status and/or flow information (such as via management frames, such as SCS frames) including indications for downstream APs 102 to establish relay SPs. Further, in some implementations, one or more of the wireless communication devices may optionally support dynamic resource requests from other devices (such as from bSTAs), the dynamic resource requests including indications of one or more of a delay bound, a requested medium time, and a requested bandwidth for TXOP sharing. Further, in some implementations, a dynamic resource request may include a flow identifier associated with relayed data traffic, and the flow identifier may be indicated by a TID, a flow identifier (ID), or an SCSID, among other IDs that may be used to differentiate between multiple flows, multiple data types, or multiple applications.

As such, the wireless communication devices associated with the multi-hop path may support a hybrid access including fully scheduled access during the relay SPs (where the wireless communication devices may employ differentiated access between APs 102 through C-TWT to facilitate timely access for an AP 102 with relay traffic) and including regular EDCA-based access outside the relay SPs. In other words, the relay SPs 302 and the relay SPs 304 may provide fully scheduled access and clients (such as wireless STAs 104) may follow a specific MU-EDCA parameter (such as AIFSN=0) during the relay SPs 302 and the relay SPs 304, while STAs 104 (backhaul and fronthaul) may follow the regular EDCA-based access outside the relay SPs 302 and the relay SPs 304 (such as during scheduled EDCA periods). In some aspects, regular EDCA-based access outside the relay SPs 302 and the relay SPs 304 may include dynamic resource allocation for uplink or TXOP sharing and any AIFSN value, as opposed to the use of the specific AIFSN=0 value used during the relay SPs 302 and the relay SPs 304. In other words, in accordance with a coordinated medium access scheme, differentiated access may apply just in the SPs (less priority through higher EDCA or MU-EDCA parameters) and outside of the SPs a client may use another set of regular EDCA parameters. For example, a client device may be configured with a first set of EDCA parameters for use during SPs (or any other time durations) associated with a coordinated medium access scheme and may be configured with a second set of EDCA parameters for use outside of SPs (or any other time durations) associated with the coordinated medium access scheme.

As such, a wireless communication device may be understood has having priority when contending if the wireless communication device is tied to EDCA and may be understood as being deprioritized if AIFSN=0 in the context of MU-EDCA, as AIFSN=0 in the context of MU-EDCA may indicate that EDCA is disabled or suspended for a specific amount of time (such as a specific amount of time indicated through an MU-EDCA timer. In other words, a value of 0 in an AIFSN field may indicate that EDCA is disabled for a duration specified by the MU-EDCA timer (for a corresponding access category). Further, in some implementations, such a disabling of channel access for a duration may be indicated with or tied to a specific data traffic. For example, such a disabling of channel access may be tied to a specific TID, SCSID, flow ID, or any other traffic identification of a corresponding traffic flow to indicate that a wireless communication device is to refrain from attempting to obtain channel access to transmit data frames associated with the indicated TID, SCSID, flow ID, or other traffic identification for an indicated duration.

The backhaul SPs (such as the SP 302) may be relatively short in time duration or may be relatively long in time duration. In implementations in which the backhaul SPs are relatively short in time duration, each backhaul SP may be associated with (such as used by) a different AP 102 (such that backhaul SPs are scheduled on a per-hop basis). In some aspects, relatively shorter SPs may leverage C-TWT rules or criteria to manage channel access. For example, a wireless communication device may terminate a TXOP before a new SP boundary. As described herein, an SP boundary may refer to a starting point of an SP, which may be equivalently referred to or understood as a time epoch. Additionally, or alternatively, an SP boundary may refer to an ending point of an SP, which may be approximately aligned with a next C-TWT time epoch.

Further, while a wireless communication device may terminate a TXOP before a new SP boundary in some implementations, a wireless communication device may selectively (such as in accordance with medium access priority information) not terminate and instead continue a TXOP beyond an associated epoch or SP. For example, if the wireless communication device is expected (in accordance with medium access priority information associated with a coordinated medium access scheme) to get access during a next epoch or SP (for example, the device currently carries the data frame to be relayed), the wireless communication device may not terminate and instead continue with the TXOP beyond the epoch or SP and use the continued TXOP to relay the data frame. Other devices that had an active TXOP may still be expected to terminate the TXOP before the epoch or start of SP (to facilitate less contention and more efficient relaying). Such selective termination of a TXOP at an epoch or start of an SP may be associated with (such as applicable for) any coordinated medium access scheme, including relay use cases as well as mesh use cases.

In implementations in which the backhaul SPs are relatively long in time duration, a given backhaul SP may span transmissions across multiple hops (such that multiple APs 102 may relay a data frame along multiple hops of the multi-hop path within the given backhaul SP). Relatively longer SPs may support (intra-SP) Triggered TXOP sharing or C-TDMA. In some aspects, Triggered TXOP sharing may be associated with an MU-RTS TXS mode 2 Trigger frame and C-TDMA may be associated with a MU-RTS TXS' Trigger frame. If a TXOP is shared within a backhaul SP, the TXOP sharing may be triggered by the root AP 102-*a* and the TXOP may be shared with the next hop satellite AP 102-*b*. For example, the root AP 102-*a* may be an initiator of the data path and may share sufficient TXOP with the satellite AP 102-*b* along the relay path for downlink and/or uplink (where uplink may be adapted based on a collected buffer status). Additionally, or alternatively, the satellite AP 102-*b* may share a TXOP with the next hop satellite AP 102-*c* (for downstream TXOP sharing) and/or with the root AP 102-*a* (for upstream TXOP sharing). A TXOP may be shared with one other wireless communication or with multiple other wireless communication devices, where medium access information may indicate a priority and/or schedule for medium access within a TXOP if a TXOP is shared with multiple other wireless communication devices.

In some implementations, an AP 102 may schedule (and transmit) a dynamic request either during a relay SP (such as the SP 302 or the SP 304) or outside of a relay SP depending on a traffic load and/or commitment (such as a commitment to provide a traffic flow). In some implementations, one or more wireless communication devices may support or leverage an expiration for an end-to-end flow (such as a configured or indicated lifetime and expiration of a QoS agreement associated with relayed traffic between the root AP 102-*a* and the wireless STA 104-*a*) to support a reordering of QoS priorities at any one or more of the wireless communication devices associated with the multi-hop path. In other words, frequent, occasional, or periodic expiration and renewal of QoS agreements may assist the network in adapting to changing constraints and changing priorities.

Figure 4:
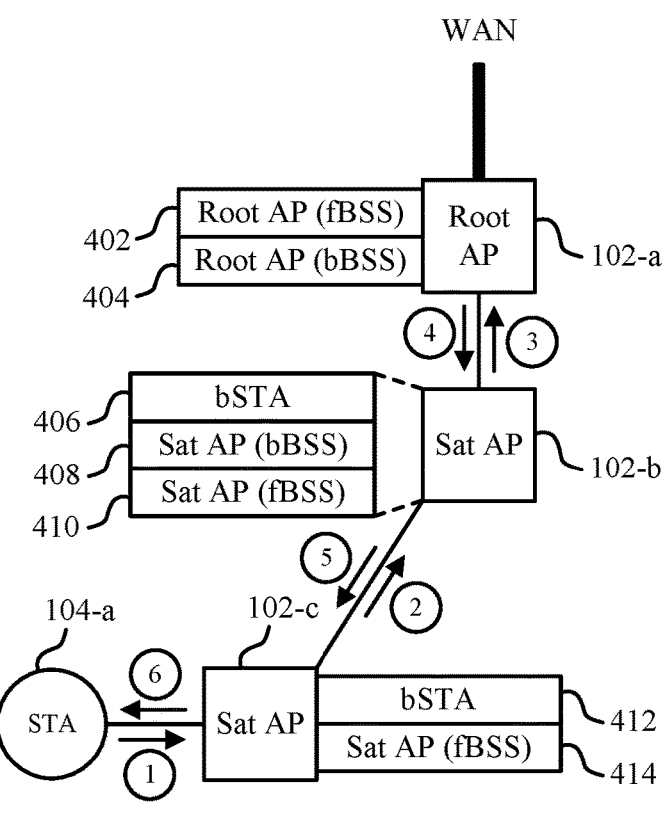
FIG. 4 shows an example of a multi-hop path that supports channel access techniques in a multi-hop framework for UHR according to some aspects of the present disclosure.
Figure 4:
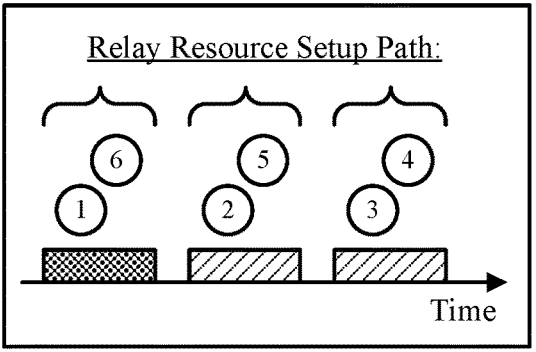
Figure 4:
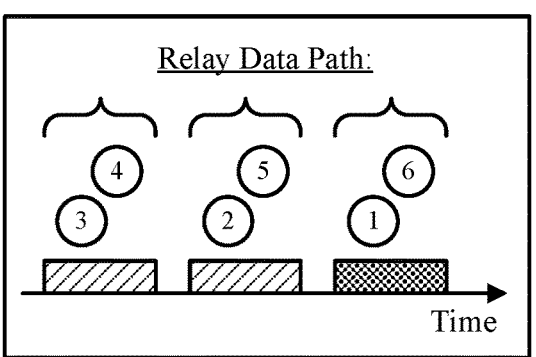
Figure 4:

FIG. 4 shows an example of a multi-hop path 400 that supports channel access techniques in a multi-hop framework for ultra-high reliability according to some aspects of the present disclosure. The multi-hop path 400 illustrates relay communication between the internet (the WAN) and the wireless STA 104-*a* via the root AP 102-*a*, the satellite AP 102-*b*, and the satellite AP 102-*c*. In some aspects, the APs 102 of the multi-hop path 400 may each be associated with one or more different components, functionalities, or logical entities. For example, the root AP 102-*a* may be associated with a fronthaul BSS (fBSS) 402 and a bBSS 404; the satellite AP 102-*b* may be associated with a bSTA 406, a bBSS 408, and an fBSS 410; and the satellite AP 102-*c* may be associated with a bSTA 412 and an fBSS 414.

In some implementations, the wireless communication devices of the multi-hop path 400 may relay communication as part of a relay resource setup path and as part of a relay data path (once relay resources are setup). In accordance with the relay resource setup path, the wireless STA 104-*a* and the satellite AP 102-*c* may exchange information (such as data traffic information, resource request information, resource allocation information, relay SP and/or relay time epoch information, or the like) during a first time period (such as during a first TXOP). In some aspects, the wireless STA 104-*a* may activate an application associated with periodic low-latency traffic and may setup SCS with the satellite AP 102-*c* for uplink and downlink scheduling. Such exchanged information between the wireless STA 104-*a* and the satellite AP 102-*c* may include setup SCS information.

Further, in accordance with the relay resource setup path, the satellite AP 102-*c* and the satellite AP 102-*b* may exchange information (such as data traffic information, resource request information, resource allocation information, relay SP and/or relay time epoch information, or the like) during a second time period (such as during a second TXOP). In some aspects, the bSTA 412 of the satellite AP 102-*c* also may setup SCS with the bBSS 408 of the satellite AP 102-*b* for uplink and downlink (back-to-back) with SCS flows from the wireless STA 104-*a* to the fBSS 414 of the satellite AP 102-*c*.

Further, in accordance with the relay resource setup path, the satellite AP 102-*b* and the root AP 102-*a* may exchange information (such as data traffic information, resource request information, resource allocation information, relay SP and/or relay time epoch information, or the like) during a third time period (such as during a third TXOP). In some aspects, for the backhaul link between the satellite AP 102-*b* and the root AP 102-*a*, the satellite AP 102-*b* and the root AP 102-*a* may support one or more setup options. In a first option, the bSTA 406 of the satellite AP 102-*b* may setup SCS with the bBSS 404 of the root AP 102-*a* for direct link communication. In accordance with such a first option, the root AP 102-*a* may selectively transmit an MU-RTS TXS Mode 2 Trigger frame for downstream TXOP sharing (to allow for relay plus uplink). In a second option, the bBSS 408 of the satellite AP 102-*b* may setup an SCS-like agreement with the root AP 102-*a* as part of a C-TDMA setup. In accordance with such a second option, the root AP 102-*a* may selectively transmit an MU-RTS TXS' Trigger frame for downstream TXOP sharing.

In some implementations, the SPs that are setup during the setup phase (such as based on the relay resource setup path) may assist each device in determining which other device is the next hop for either direction. For example, the setup SPs may assist a first wireless communication device in determining that a second wireless communication device may function as a next hop downlink relay and that a third wireless communication device may function as a next hop uplink relay. As such, during the data phase, a bSTA and a satellite AP 102 on a relay device may know what action to take, such as to what other device a data frame is to be relayed (assuming SPs are non-overlapping, as some constraints may be supported to limit a sharing of an SP for a same end client, such as for a same wireless STA 104). In some aspects, such SP setup may further assist with buffer management, as, for example, at a satellite AP 102, the satellite AP 102 may be able to determine which scoreboard context and ReO context to activate during a particular SP because the SP may be dedicated to service a specific end client (such as a specific wireless STA 104).

As part of the relay data path, the root AP 102-*a* and the satellite AP 102-*b* may relay data traffic (such as the root AP 102-*a* may transmit a data frame to the satellite AP 102-*b* for eventual routing to the wireless STA 104-*a*) during a first time period. In some implementations, the first time period may be a first SP (such as a first SP 302) of a fully scheduled coordinated medium access scheme (such as a C-TWT medium access scheme). Additionally, or alternatively, the first time period may be a time period or duration after a first time epoch. The satellite AP 102-*b* and the satellite AP 102-*c* may relay data traffic (such as the satellite AP 102-*b* may relay on the data frame received from the root AP 102-*a* to the satellite AP 102-*c*) during a second time period. In some implementations, the second time period may be a second SP (such as a second SP 302 immediately subsequent to the first SP 302) of the fully scheduled coordinated medium access scheme. Additionally, or alternatively, the second time period may be a time period or duration after a second time epoch. In some implementations, the second time period may be within the first SP and within a TXOP of the root AP 102-*a* that the root AP 102-*a* shares with the satellite AP 102-*b*.

The satellite AP 102-*c* and the wireless STA 104-*a* may relay data traffic (such as the satellite AP 102-*c* may relay on the data frame received from the satellite AP 102-*b* to the wireless STA 104-*a*) during a third time period. In some implementations, the third time period may be a second SP subsequent to the first SP (if the first SP included TXOP sharing such that multiple hops were spanned within the first SP) or may be a third SP subsequent to the second SP (if there was no TXOP sharing across the APs 102). Additionally, or alternatively, the third time period may be a time period or duration after a third time epoch. In some aspects, low-latency traffic relaying from the wireless STA 104-a to the satellite AP 102-b through the satellite AP 102-c may be served through Trigger-enabled C-TWT, as traffic between the wireless STA 104-a and the satellite AP 102-c may be sent over a different channel than traffic between the satellite AP 102-c and the satellite AP 102-b.

Further, although illustrated and described in the context of the satellite AP 102-b and the satellite AP 102-c relaying data from one device to one other device, one or both of the satellite AP 102-b and the satellite AP 102-c may function as a relay for one or multiple traffic flows between any quantity of devices. For example, the satellite AP 102-c may relay first data traffic between the satellite AP 102-b and the wireless STA 104-a and may further relay second data traffic between another satellite AP 102 and another wireless STA 104 (or to another satellite AP 102). In such examples, the satellite AP 102-c may support one or multiple coordinated medium access schemes, such as a first coordinated medium access scheme to relay the first data traffic and a second coordinated medium access scheme to relay the second data traffic, or a single coordinated medium access scheme that provides medium access information for both the first data traffic and the second data traffic.

Further, in some implementations, any one or more of the root AP 102-a, the satellite AP 102-b, the satellite AP 102-c, and the wireless STA 104 may be MLDs capable of communicating via multiple links (simultaneously or one at a time). In implementations in which at least some of the root AP 102-a, the satellite AP 102-b, the satellite AP 102-c, and the wireless STA 104 are MHLDs, a data traffic-to-link mapping may be used to prioritize relay packets by mapping a TID, SCSID, flow ID, or any other traffic identification of a corresponding traffic flow to a set (such as all or a subset) of links and maintaining best effort on a different subset of links, if available. Additionally, or alternatively, if MLO is supported, any one or more of the root AP 102-a, the satellite AP 102-b, the satellite AP 102-c, and the wireless STA 104 may support and establish overlapping SPs (such as parallel SPs) on multiple links, such as on both a fronthaul link and a backhaul link, to facilitate a timely and low-latency delivery of relayed packets. Such overlapping SPs may be based on TWT or may be based on any management signaling, such as SCS request and/or response (which may generally be at the MLD level).

Additionally, or alternatively, in implementations in which at least some of the root AP 102-a, the satellite AP 102-b, the satellite AP 102-c, and the wireless STA 104 are MLDs, any one or more of such wireless communication devices may support a per-link configuration of medium access parameters. As such, any one or more of parameters associated with medium access priority (such as EDCA parameters and MU-EDCA parameters), what coordinated medium access scheme to use, or any other parameters associated with the coordinated medium access schemes described herein may be configured on a per link basis. In other words, different parameters may apply to different links of an MLD.

Figure 5:
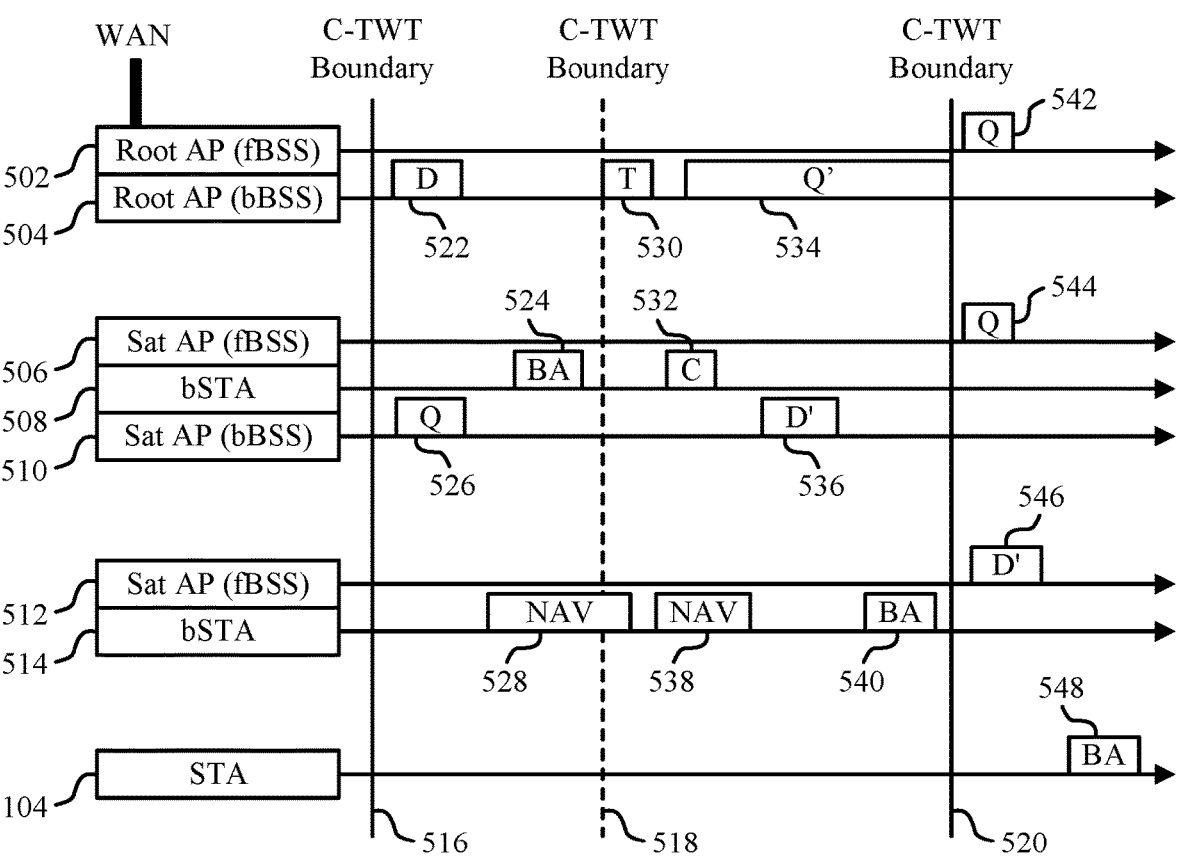
FIGS. 5 and 6 show examples of communication timelines that support channel access techniques in a multi-hop framework for UHR according to some aspects of the present disclosure.
Figure 5:
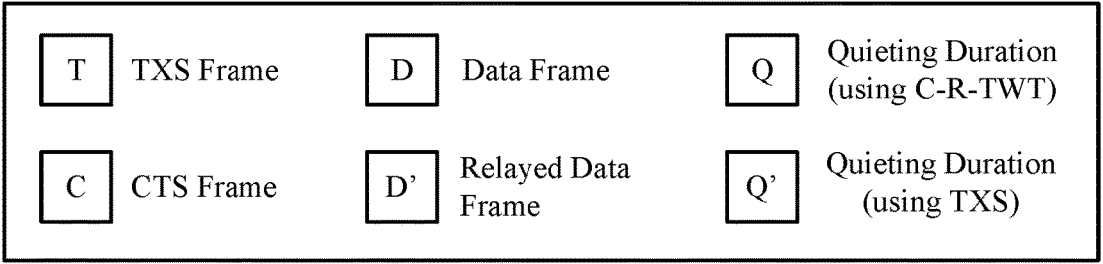

FIG. 5 shows an example of a communication timeline 500 that supports channel access techniques in a multi-hop framework for ultra-high reliability according to some aspects of the present disclosure. The communication timeline 500 illustrates a multi-hop framework between the internet and a wireless STA 104 via a root AP 102 and multiple satellite APs 102. In the example of the communication timeline 500, the root AP 102 and the multiple satellite APs 102 are shown in the context of respective components, functionalities, or logical entities responsible for or otherwise associated with upstream and downstream relay communication.

For example, the root AP 102 (which may be an example of the root AP 102-a illustrated by and described with reference to FIGS. 2-4) may be associated with an fBSS 502 and a bBSS 504; a first satellite AP 102 (which may be an example of the satellite AP 102-b illustrated by and described with reference to FIGS. 2-4) may be associated with an fBSS 506, a bSTA 508, and a bBSS 510; and a second satellite AP 102 (which may be an example of the satellite AP 102-c illustrated by and described with reference to FIGS. 2-4) may be associated with an fBSS 512 and a bSTA 514.

In some implementations, the wireless communication devices associated with the multi-hop framework may support a coordinated medium access scheme, such as a C-TWT scheme, to provide more predictable medium access on the fronthaul link and backhaul links between APs 102. In some aspects, the coordinated medium access scheme may be associated with multiple time epochs, including a first time epoch associated with a first C-TWT boundary 516, an optional second time epoch associated with an optional second C-TWT boundary 518, and a subsequent time epoch associated with a C-TWT boundary 520. In some aspects, one or more of the C-TWT boundary 516, the C-TWT boundary 518, and the C-TWT boundary 520 may be associated with a respective SP, which may be a time period or duration measured from a corresponding C-TWT boundary (from a corresponding time epoch). For example, a first SP may be associated with the first C-TWT boundary 516, an optional second SP may be associated with the optional second C-TWT boundary 518, and a subsequent SP may be associated with the C-TWT boundary 520.

To facilitate coordination between APs and STAs of the multi-hop framework, APs 102 and STAs 104 may employ one or both of quieting durations and differentiated EDCA (such as via different CW counter configurations at different devices at different times, with a restarting of a random backoff (RBO) at the start of a time epoch or SP) to assist in prioritizing medium access for an intended AP. In some aspects, one or more of the wireless communication devices associated with the multi-hop framework may configure, indicate, set, negotiate, or otherwise determine timing information associated with the multiple time epochs (such as starting points of SPs). Further, each SP of the multiple SPs may be configured with a respective starting point (which may correspond to a respective C-TWT boundary or time epoch) and a respective time period or duration. As such, a time epoch may refer to an instance in time and an SP may refer to an instance in time (such as a time epoch) plus a subsequent time period or duration.

In the example of delivering related traffic from the root AP 102 to the wireless STA 104 illustrated by the communication timeline 500, the bBSS 504 of the root AP 102 may transmit, to the first satellite AP 102 (to the bSTA 508 of the first satellite AP 102), a first data frame 522 during the first SP (such as during or within a time period after the first time epoch). The bSTA 508 of the first satellite AP 102 may transmit, during the first SP (such as during or within a time period after the first time epoch), a block acknowledgment (BA) 524 responsive to the first data frame 522. In some implementations, to preempt the bBSS 510 of the first satellite AP 102 from accessing the channel before the bBSS 504 of the root AP 102, the wireless communication devices of the multi-hop framework may support (and activate) a quieting duration 526 of C-TWT between bBSS APs (such as between bBSS APs only, as channel access of bSTAs may be managed through MU-EDCA parameters including an AIFSN=0). For example, for a duration of the first and/or second SPs (such as up until the C-TWT boundary 520), the bSTA 508 and/or the bSTA 514 may be restricted or pre-empted from medium access (or otherwise have their respective medium access ability controlled) by one or more MU-EDCA parameters, such as a configuration of AIFSN=0. Additionally, or alternatively, if the bBSS 510 of the first satellite AP 102 follows MU-EDCA-based access based on an MU-EDCA of the bSTA 508, APs 102 may refrain from using C-TWT on the backhaul. For example, the bSTA 514 may refrain from attempting to obtain medium access in accordance with a network allocation vector (NAV) duration 528.

To relay the data carried by the first data frame from the first satellite AP 102 to the second satellite AP 102, the satellite APs 102 may either perform the relaying during the first SP (such as during or within a time period after the first time epoch) associated with the C-TWT boundary 516 in accordance with a TXOP sharing by the root AP 102 or during the second SP (such as during or within a time period after the second time epoch) associated with the optional C-TWT boundary 518. If the first SP is relatively longer in duration, the root AP 102 may share a TXOP of the root AP 102 with the first satellite AP 102 to facilitate the relaying of the data across multiple hops (such as to the second satellite AP 102) within the first SP. If the first SP is relatively shorter in duration, the second SP may be separately scheduled to facilitate the relaying of the data from the first satellite AP 102 to the second satellite AP 102 during the second SP.

In implementations in which the root AP 102 shares a TXOP of the root AP 102 with the first satellite AP 102 during the first SP (such as during or within a time period after the first time epoch), the root AP 102 (via the bBSS 504) may transmit a TXS Trigger frame 530 to the first satellite AP 102. The root AP 102 may transmit the TXS Trigger frame 530 based on receiving a dynamic resource request from the first satellite AP 102. The bSTA 508 of the first satellite AP 102 may transmit a CTS frame 532 responsive to the TXS Trigger frame 530. In some implementations, the TXS Trigger frame 530 may include information associated with a priority of delivery of the data carried by the first data frame 522 to the wireless STA 104. As such, the first satellite AP 102 may access the wireless medium (such as use the shared TXOP) and relay the conveyed data in accordance with the priority information. The bBSS 504 of the root AP 102 may enter a quieting duration 534 (in accordance with transmitting the TXS Trigger frame) and the bSTA 508 of the first satellite AP 102 may transmit a second data frame 536 to the second satellite AP 102 within the shared TXOP (and during the first SP). To support coordination and prioritized medium access, the bSTA 514 of the second satellite AP 102 may refrain from attempting to obtain medium access in accordance with a NAV duration 538. After the NAV duration 538, the bSTA 514 of the second satellite AP 102 may receive the second data frame 536 and may transmit a BA 540 responsive to the second data frame 536. The second data frame 536 may be a relayed version of the first data frame 522.

To support coordination and prioritized medium access during the subsequent SP associated with the C-TWT boundary 520, the fBSS 502 of the root AP 102 and the fBSS 506 of the first satellite AP 102 may enter a quieting duration 542 and a quieting duration 544, respectively, in accordance with the C-TWT coordinated medium access scheme. While the fBSS 502 and the fBSS 506 are quieted, the second satellite AP 102 may transmit (via the fBSS 512 of the second satellite AP 102) a third data frame 546 to the wireless STA 104 during the SP associated with the C-TWT boundary 520 (such as during or within a time period after the third time epoch). Responsive to receiving the third data frame 546, the wireless STA 104 may transmit a BA 548.

The third data frame 546 may be a relayed version of the second data frame 536. As such, each of the first data frame 522, the second data frame 536, and the third data frame 546 may include or otherwise convey same data or information bits. As such, although differentiated as being different data frames in the example of the communication timeline 500, the first data frame 522, the second data frame 536, and the third data frame 546 may be referred to as a same data frame because each of the first data frame 522, the second data frame 536, and the third data frame 546 carry the same data.

A header of any one or more of the first data frame 522, the second data frame 536, and the third data frame 546 may be modified by the root AP 102 or the satellite APs 102 and, in some implementations, the root AP 102 or the satellite APs 102 may embed information associated with the forwarding (such as relaying) of the data during the shared TXOP or the second SP. In other words, the root AP 102 may set a bit or a field in the first data frame 522 to inform the bSTA 508 of the first satellite AP 102 to pass the shared TXOP to the bBSS 510 of the first satellite AP 102 for forwarding the data further. Similarly, the bBSS 510 of the first satellite AP 102 may update or maintain the field value to enable or allow a subsequent satellite AP 102 (such as the second satellite AP 102) to use the TXOP for downstream forwarding. In some aspects, such a relay scheme may assume a bSTA of each satellite AP 102 passes on the TXOP to the satellite AP 102 (such as the bBSS of the satellite AP 102) within the same device. In a similar manner, a non-AP STA on an end device (such as a phone) may receive a TXOP from an AP and may pass the TXOP along to a softAP functionality on the end device.

Additionally, or alternatively, a header or control field (such as an A-Control field) of a data frame (such as the relayed data frame or a previous data frame) may indicate information associated with a priority of delivery of the data carried by the relayed data frame to the wireless STA 104. For example, a field (such as a field in the A-Control field or some other field in another portion of the header of an MPDU) may indicate that the MPDU is to be relayed further when the TXOP is shared by the wireless communication device (such as the AP 102 or STA 104) that transmits the MPDU. In some aspects, a first wireless communication device sharing the TXOP may further indicate (via a field of the data frame itself or the frame associated with sharing the TXOP) an expectation or constraint according to which a second wireless communication device is to deliver the data frame (such as the relay packet). Such an expectation or constraint may include a transmission (such as a relay) of the packet either within the same TXOP and/or within an indicated delay bound, deadline, or expiration time. As such, a wireless communication device may access the wireless medium and relay the data frame to a next device in accordance with the priority information (such as in accordance with the indicated expectation of relay within the same TXOP and/or within the indicated delay bound, deadline, or expiration time). Further, although illustrated and described in the context of downstream TXOP sharing and a downstream relay of data, the described techniques may be equally applicable to upstream TXOP sharing and/or an upstream relay of data. For example, the wireless communication devices of the communication timeline 500 may relay data from the wireless STA 104 to the root AP 102 in accordance with the same or similar coordinated medium access techniques. Further, although illustrated and described in the context of one root AP 102 and two satellite APs 102, the described techniques may be equally applicable to any system or link topology and any quantity of communication devices (such as any quantity of hops), including system or link topologies with or without a dedicated root AP 102 and with or without a strict or dedicated tree-like relay link topology. Further, any one or more of the wireless communication devices illustrated and described with reference to the communication timeline 500 may be MLDs capable of communicating over multiple links (simultaneously or one at a time).

Figure 6:
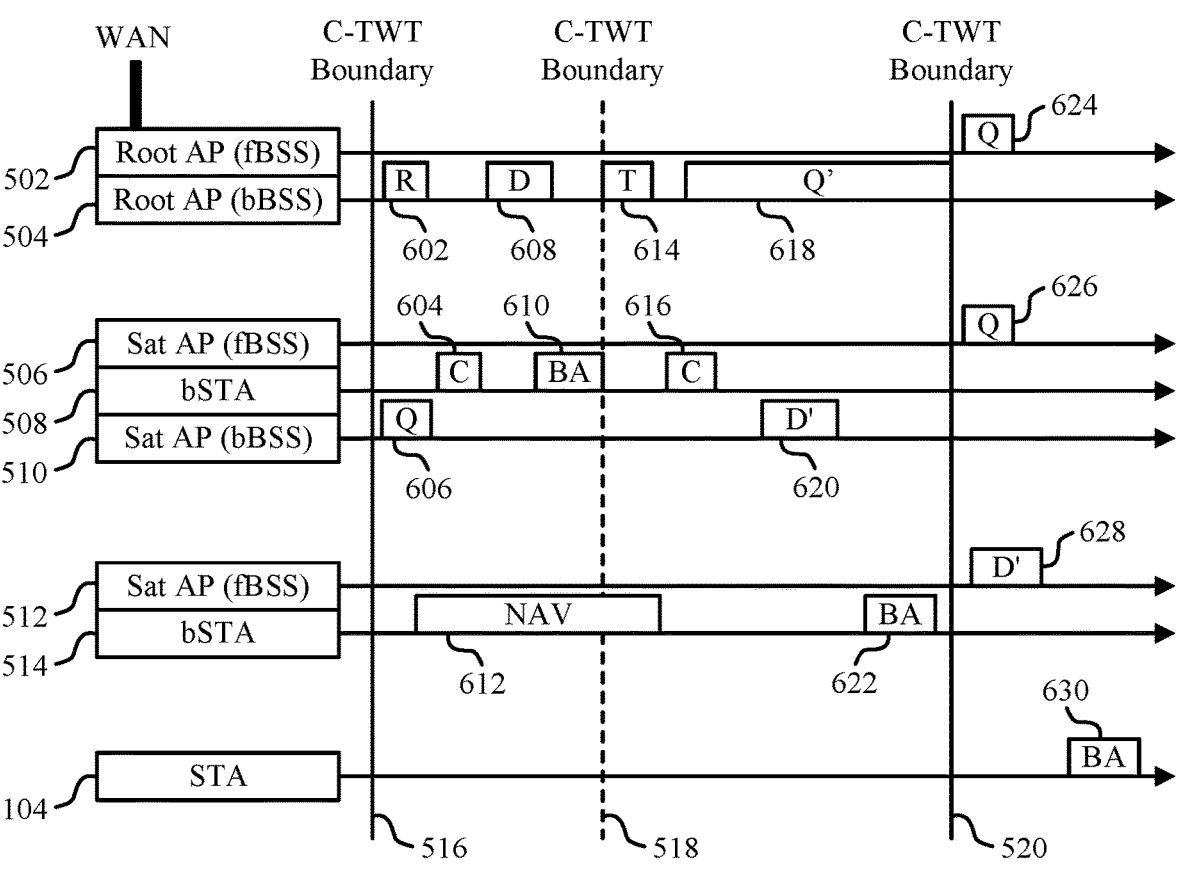
Figure 6:
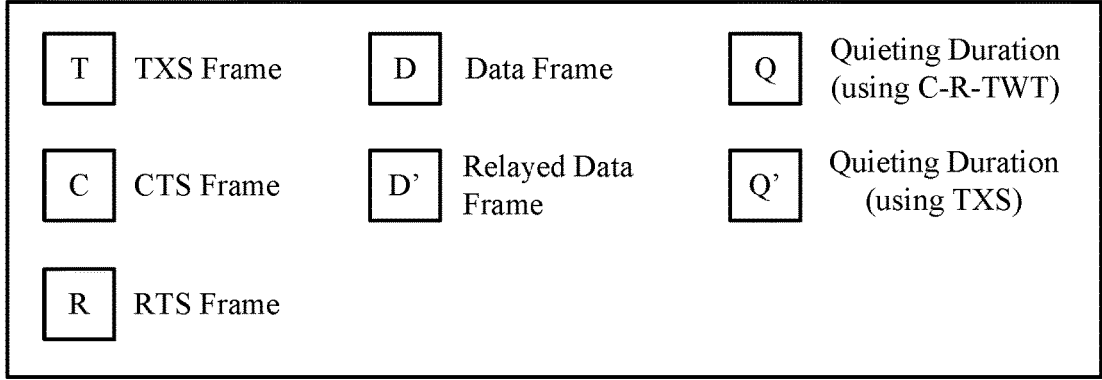

FIG. 6 shows an example of a communication timeline 600 that supports channel access techniques in a multi-hop framework for ultra-high reliability according to some aspects of the present disclosure. The communication timeline 600 illustrates a multi-hop framework between the internet and a wireless STA 104 via a root AP 102 and multiple satellite APs 102. In the example of the communication timeline 600, the root AP 102 and the multiple satellite APs 102 are shown in the context of respective components, functionalities, or logical entities responsible for or otherwise associated with upstream and downstream relay communication.

For example, the root AP 102 (which may be an example of the root AP 102-*a* illustrated by and described with reference to FIGS. 2-4) may be associated with an fBSS 502 and a bBSS 504; a first satellite AP 102 (which may be an example of the satellite AP 102-*b* illustrated by and described with reference to FIGS. 2-4) may be associated with an fBSS 506, a bSTA 508, and a bBSS 510; and a second satellite AP 102 (which may be an example of the satellite AP 102-*c* illustrated by and described with reference to FIGS. 2-4) may be associated with an fBSS 512 and a bSTA 514.

In some implementations, the wireless communication devices associated with the multi-hop framework may support a coordinated medium access scheme, such as a C-TWT scheme, to provide more predictable medium access on the fronthaul link and backhaul links between APs 102. In some aspects, the coordinated medium access scheme may be associated with multiple time epochs, including a first time epoch associated with a first C-TWT boundary 516, an optional second time epoch associated with an optional second C-TWT boundary 518, and a subsequent time epoch associated with a C-TWT boundary 520. In some aspects, one or more of the C-TWT boundary 516, the C-TWT boundary 518, and the C-TWT boundary 520 may be associated with a respective SP, which may be a time period or duration measured from a corresponding C-TWT boundary (from a corresponding time epoch). For example, a first SP may be associated with the first C-TWT boundary 516, an optional second SP may be associated with the optional second C-TWT boundary 518, and a subsequent SP may be associated with the C-TWT boundary 520.

To facilitate coordination between APs and STAs of the multi-hop framework, APs 102 and STAs 104 may employ one or both of quieting durations and differentiated EDCA (such as via different CW counter configurations at different devices at different times, with a restarting of a random backoff (RBO) at the start of a time epoch or SP) to assist in prioritizing medium access for an intended AP. In some aspects, one or more of the wireless communication devices associated with the multi-hop framework may configure, indicate, set, negotiate, or otherwise determine timing information associated with the multiple time epochs (such as starting points of SPs). In some implementations, each SP of the multiple SPs may be configured with a respective starting point (which may correspond to a respective C-TWT boundary or time epoch) and a respective time period or duration. As such, a time epoch may refer to an instance in time and an SP may refer to an instance in time (such as a time epoch) plus a subsequent time period or duration.

In the example of delivering related traffic from the root AP 102 to the wireless STA 104 illustrated by the communication timeline 600, the root AP 102 (via the bBSS 504 of the root AP 102) may transmit an RTS frame 602 during the first SP (such as during or within a time period after the first time epoch). Responsive to the RTS frame 602, the bSTA 508 of the first satellite AP 102 may transmit a CTS frame 604. To support medium access coordination between the wireless communication devices during the first SP, the bBSS 510 of the first satellite AP 102 may enter a quieting duration 606 in accordance with the C-TWT access scheme. During the first SP (such as during or within a time period after the first time epoch), the bBSS 504 of the root AP 102 may transmit a first data frame 608 to the bSTA 508 of the first satellite AP 102 and the bSTA 508 may transmit a BA 610 responsive to receiving the first data frame.

Further, in some aspects, the exchange of the RTS frame 602 and the CTS frame 604 may protect the first SP from a hidden node. For example, if the bSTA 514 of the second satellite AP 102 is hidden from a root AP transmission, channel protection or reservation during the first SP may be obtained by indicating the bSTA 514 of the second satellite AP 102 to set a NAV by triggering the transmission of the CTS frame 604 from the bSTA 508 of the first satellite AP 102. In other words, although the bSTA 514 of the second satellite AP 102 may follow MU-EDCA with AIFSN=0 within relay SPs in some implementations, the bSTA 514 of the second satellite AP 102 may contend for channel access in some other implementations. Thus, in implementations in which the bSTA 514 of the second satellite AP 102 contends for channel access (AIFSN #0), an RTS/CTS frame exchange between the root AP 102 and the first satellite AP 102 may be used to suppress the bSTA 514 from obtaining channel access. In accordance with the RTS/CTS frame exchange between the root AP 102 and the first satellite AP 102, the bSTA 514 of the second satellite AP 102 may avoid channel access for a NAV duration 612.

To relay the data carried by the first data frame 608 from the first satellite AP 102 to the second satellite AP 102, the satellite APs 102 may either perform the relaying during the first SP (such as during or within a time period after the first time epoch) associated with the C-TWT boundary 516 in accordance with a TXOP sharing by the root AP 102 or during the second SP (such as during or within a time period after the second time epoch) associated with the optional C-TWT boundary 518. If the first SP is relatively longer in duration, the root AP 102 may share a TXOP of the root AP 102 with the first satellite AP 102 to facilitate the relaying of the data across multiple hops (such as to the second satellite AP 102) within the first SP. If the first SP is relatively shorter in duration, the second SP may be separately scheduled to facilitate the relaying of the data from the first satellite AP 102 to the second satellite AP 102 during the second SP.

In implementations in which the root AP 102 shares a TXOP of the root AP 102 with the first satellite AP 102 during the first SP (such as during or within a time period after the first time epoch), the root AP 102 (via the bBSS 504) may transmit a TXS Trigger frame 614 associated with a sharing of the TXOP of the root AP 102 with the first satellite AP 102. In some implementations, the TXS Trigger frame 614 may include information associated with a priority of delivery of the data carried by the first data frame 608 to the wireless STA 104. As such, the first satellite AP 102 may access the wireless medium (such as use the shared TXOP) and relay the conveyed data in accordance with the priority information. Responsive to receiving the TXS Trigger frame 614, the bSTA 508 may transmit a CTS frame 616. In accordance with transmitting the TXS Trigger frame 614, the bBSS 504 of the root AP 102 may enter a quieting duration 618. The bBSS 510 of the first satellite AP 102 may transmit a second data frame 620 (which may be a relayed version of the first data frame 608) to the second satellite AP 102 and, in accordance with receiving the second data frame 620, the bSTA 514 of the second satellite AP 102 may transmit a BA 622.

During the subsequent SP associated with the C-TWT boundary 520 (such as during or within a time period after the third time epoch), the fBSS 502 of the root AP 102 and the fBSS 506 of the first satellite AP 102 may enter a quieting duration 624 and a quieting duration 626, respectively. In some aspects, the entrance of the fBSS 502 and the fBSS 506 into respective quieting durations may facilitate (or otherwise be part of) the coordination between the wireless communication devices to deliver data to the wireless STA 104. For example, while the fBSSs of the root AP 102 and the first satellite AP 102 are quieted, the fBSS of the second satellite AP 102 may transmit a third data frame 628 to the wireless STA 104. In accordance with receiving the third data frame 628, the wireless STA 104 may transmit a BA 630.

The third data frame 628 may be a relayed version of the second data frame 620. As such, each of the first data frame 608, the second data frame 620, and the third data frame 628 may include or otherwise convey same data or information bits. As such, although differentiated as being different data frames in the example of the communication timeline 600, the first data frame 608, the second data frame 620, and the third data frame 628 may be referred to as a same data frame because each of the first data frame 608, the second data frame 620, and the third data frame 628 carry the same data or information.

A header of any one or more of the first data frame 522, the second data frame 536, and the third data frame 546 may be modified by the root AP 102 or the satellite APs 102 and, in some implementations, the root AP 102 or the satellite APs 102 may embed information associated with the forwarding (such as relaying) of the data during the shared TXOP or the second SP. In other words, the root AP 102 may set a bit or a field in the first data frame 522 to inform the bSTA 508 of the first satellite AP 102 to pass the shared TXOP to the bBSS 510 of the first satellite AP 102 for forwarding the data further. Similarly, the bBSS 510 of the first satellite AP 102 may update or maintain the field value to enable or allow a subsequent satellite AP 102 (such as the second satellite AP 102) to use the TXOP for downstream forwarding. In some aspects, such a relay scheme may assume a bSTA of each satellite AP 102 passes on the TXOP to the satellite AP 102 (such as the bBSS of the satellite AP 102) within the same device. In a similar manner, a non-AP STA on an end device (such as a phone) may receive a TXOP from an AP and may pass the TXOP along to a softAP functionality on the end device.

Additionally, or alternatively, a header or control field (such as an A-control field) of a data frame (such as the relayed data frame or a previous data frame) may indicate information associated with a priority of delivery of the data carried by the relayed data frame to the wireless STA 104. As such, a wireless communication device may access the wireless medium and relay the data frame in accordance with the priority information. Further, although illustrated and described in the context of downstream TXOP sharing and a downstream relay of data, the described techniques may be equally applicable to upstream TXOP sharing and/or an upstream relay of data. For example, the wireless communication devices of the communication timeline 500 may relay data from the wireless STA 104 to the root AP 102 in accordance with the same or similar coordinated medium access techniques. Further, although illustrated and described in the context of one root AP 102 and two satellite APs 102, the described techniques may be equally applicable to any system or link topology and any quantity of communication devices (such as any quantity of hops), including system or link topologies with or without a dedicated root AP 102 and with or without a strict or dedicated tree-like relay link topology. Further, any one or more of the wireless communication devices illustrated and described with reference to the communication timeline 600 may be MLDs capable of communicating over multiple links (simultaneously or one at a time).

Figure 7:
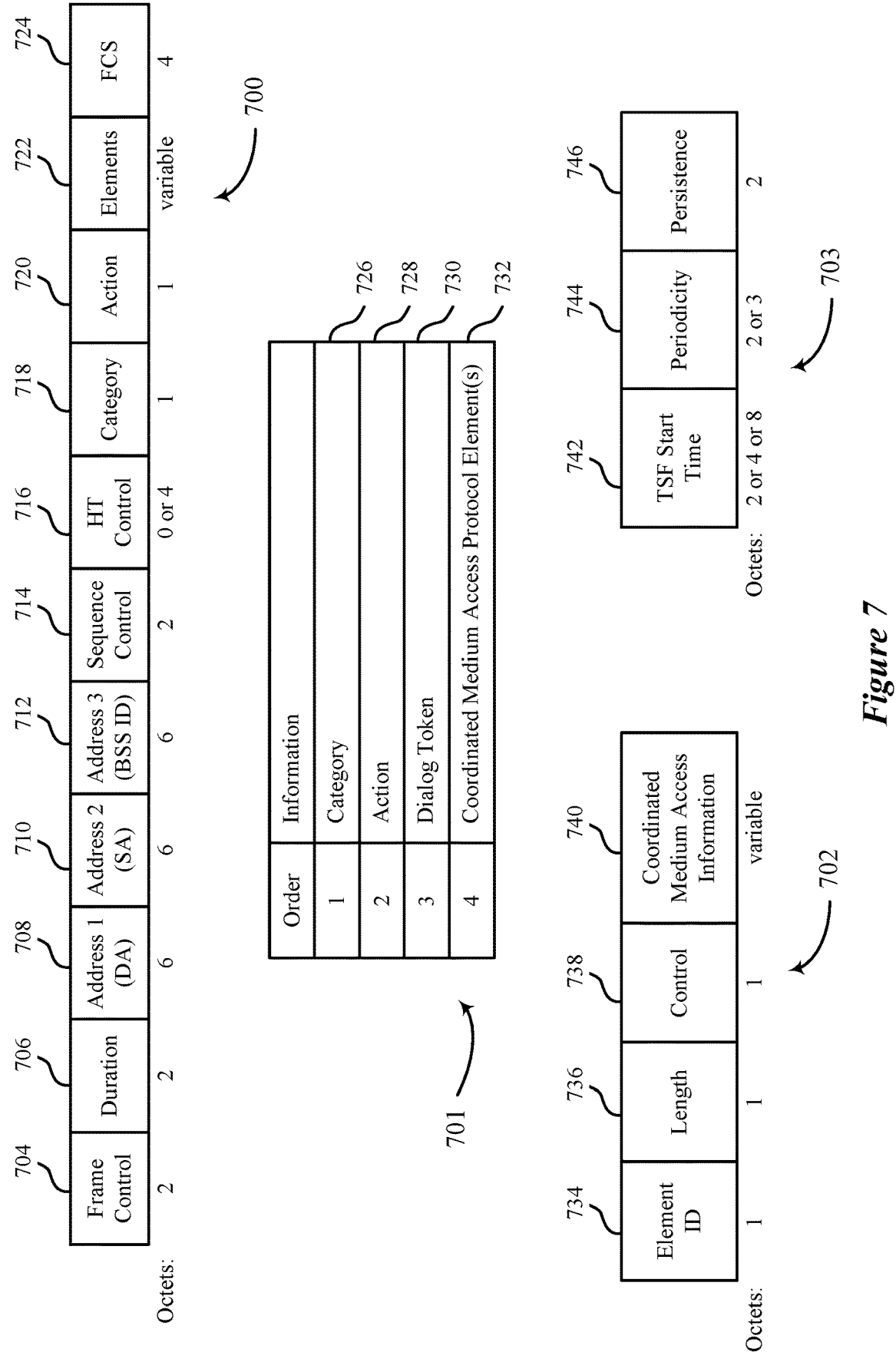
FIG. 7 shows an example of a frame format that supports channel access techniques in a multi-hop framework for UHR according to some aspects of the present disclosure.

FIG. 7 shows an example of a frame format 700 that supports channel access techniques in a multi-hop framework for ultra-high reliability according to some aspects of the present disclosure. In some implementations, the frame format 700 may be a format of a management frame that may indicate medium access information. The frame format 700 may be at least in part associated with an action field format 701, a coordinated medium access protocol information element (IE) 702, or a coordinated medium access parameter set 703. Each of the frame format 700, the coordinated medium access protocol IE 702, and the coordinated medium access parameter set 703 may include one or more fields and may include or otherwise convey medium access information. The fields illustrated by FIG. 7 each may include one or more octets (such as a group of 8 bits), as indicated by a numeric value below each field. For example, a frame control field 704 of the frame format 700 may include 2 octets.

A management frame which implements, at least in part, the frame format 700 may include one or more fields that include or convey medium access information indicated by the management frame. For example, the frame format 700 may include the frame control field 704, a duration field 706, a plurality of address fields (such as address 1 field 708, address 2 field 710, and address 3 field 712), a sequence control frame 714, an HT control field 716, a category field 718, an action field 720, an elements field 722, and a frame check sequence (FCS) field 724.

The action field 720 of the frame format 700 may be associated with a format illustrated by the action field format 701. For example, the action field 720 may include various subfields, which may follow an order as described by the action field format 701. One or more of the subfields of the action field 720 may include medium access information. As illustrated by the action field format 701, the action field 720 may include a category subfield 726, an action subfield 728, a dialog token subfield 730, and a coordinated medium access protocol element subfield 732 (which may be associated with or otherwise referred to as a set of one or more coordinated medium access protocol elements). In some cases, the coordinated medium access protocol element subfield 732 of the action field 720 may include or otherwise convey medium access information. Although the subfields of the action field format 701 are illustrated in a specific order, other orders are possible and foreseen by this disclosure.

The elements field 722 of the frame format 700 may include one or more information elements of varying sizes (such as lengths), each of which may include one or more fields or subfields. For example, in some implementations, the elements field 722 may include the coordinated medium access protocol IE 702. The coordinated medium access protocol IE 702 may include an element ID field 734, a length field 736, a control field 738, and a coordinated medium access information field 740 (which may be an example of a coordinated AP medium access information field).

The coordinated medium access parameter set 703 may be associated with the frame format 700 and transmitted within a management frame implementing the frame format 700. In some cases, one or more of the fields of the frame format 700 may include or otherwise convey the coordinated medium access parameter set 703. For example, the elements field 722 may include the coordinated medium access parameter set 703. In some implementations, within the elements field 722, the coordinated medium access information field 740 may include the coordinated medium access parameter set 703. The coordinated medium access parameter set 703 may include one or more fields, including a TSF start time field 742, a periodicity field 744, and a persistence field 746.

A management frame which implements, at least in part, the frame format 700 may indicate parameters and values associated with medium access (such as coordinated medium access between multiple wireless communication devices). In some cases, the coordinated medium access parameter set 703 may include or convey such parameters and values associated with medium access. For example, the coordinated medium access parameter set 703 may include a bandwidth parameter with an associated value (such as 80 MHz at 5 GHz, 2 spatial streams), a max TXOP parameter with an associated value (such as 4 milliseconds), a modulation and coding scheme (MCS) parameter with an associated value (such as fixed MCS 5), a transmission power parameter (such as an AP transmission power parameter) with an associated value (such as 21 dBm), a low latency traffic parameter with an associated value (such as downlink VR, a data rate of 60 Mbps, or a frame generation rate of 60 fps), or any combination thereof.

In some implementations, wireless communication devices (such as APs and/or STAs) that coordinate with each other may end transmissions at predetermined times or according to a predetermined schedule to be able to listen to transmissions from one another. In scenarios involving extremely high throughput (EHT) operation, wireless communication devices may use R-TWT-based coordination. According to R-TWTs, STAs may end a TXOP before a start time of an SP. An R-TWT may be introduced per single BSS, and may be used by a coordinating AP 102 to manage clients associated with the coordinating AP. In scenarios implementing UHR, some mechanisms may allow or enable APs 102 to coordinate synchronization times to end the transmissions and enhance channel access. The frame format 700 may be an example of or otherwise facilitate a signaling mechanism to support coordinating and/or negotiating resources and medium access between wireless communication devices (such as APs 102 and/or STAs 104) to achieve more coordinated channel access based on traffic priority, and to coordinate resources between wireless communication devices operating with various types of channel access mechanisms (such as EDCA-based access). The frame format 700 may assist in implementing a coordinated medium access scheme between two or more wireless communication devices, where the coordinated medium access scheme may facilitate transmissions between the coordinating wireless communication devices at the start of the synchronization times (such as a TSF start time).

In some implementations, wireless communication devices may coordinate to provide medium access protection for latency sensitive traffic delivery. In some implementations, a coordinated medium access protocol may allow wireless communication device (such as APs 102 and/or STAs 104) to exchange information related to synchronization times at which the wireless communication devices may perform specific actions based on coordination rules (such as a coordinated medium access protocol). For example, the specific actions may include ending a TXOP at a predetermined time or according to a predetermined schedule. Such ending of the TXOP also may include setting NAV for a subset of APs 102 and/or STAs 104 (such as quieting the subset of APs 102 and/or STAs 104), where such a subset of APs 102 and/or STAs 104 may not be members for a specified (such as static or dynamic) duration at those time instants (setting NAV). The specific actions also may include contending for channel access. In some aspects, the contending may involve a use of relatively lower or relatively higher priority EDCA parameters, where an owner AP 102 may use relatively higher priority EDCA parameters. Additionally, or alternatively, the contending may involve a use of reinforcement learning for channel access. The specific actions also may include sharing a TXOP between wireless communication devices with a specific AP 102 (such as an owner AP 102). In some aspects, relatively lower or relatively higher priority EDCA parameters may relate to CW counter parameter values, where a relatively smaller CW counter value may indicate or otherwise be associated with relatively higher priority medium access (such as advantaged medium access) and a relatively larger CW counter value may indicate or otherwise be associated with relatively lower priority medium access (such as disadvantaged medium access).

The coordinated medium access protocol (such as scheme) may include multiple levels of coordination. For example, a first level (such as level 1) of coordination may indicate that APs 102 follow the coordinated medium access protocol and participate in specific actions, such as the specific actions described herein. A second level (such as level 2) of coordination may dictate that APs 102 in addition to STAs 104 within each BSS follow the coordinated medium access protocol and participate in specific actions, such as the specific actions described herein.

The frame format 700 may provide coordinated medium access information between two or more wireless communication devices associated with a multi-hop link, path, or framework. In some implementations, the two or more wireless communication devices may be peer-to-peer devices (such as Wi-Fi direct devices, Wi-Fi aware devices). In some other examples, the two or more wireless communication devices may be a combination of one or more APs 102 and one or more STAs 104. For AP to STA coordination, an AP 102 may coordinate access, which may allow the two or more wireless communication devices to meet one or more latency constraints (such as key performance indicators (KPIs)). For AP to AP coordination, the APs 102 may coordinate medium access in terms of time, bandwidth, and related actions.

The frame format 700 may apply to different medium access coordination mechanisms. For example, the frame format 700 may apply to time-based access coordination, where the frame format 700 may provide signaling for coordinating such time-based access (such as time and actions). In such examples of time-based access, two or more wireless communication devices may coordinate on R-TWTs. Such coordination may involve TWT schedules that are non-overlapping in time, or that at least partially overlap in time. Time-based access may be associated with fully or partially overlapping schedules or completely non-overlapping schedules. In an example of non-overlapping schedules, time-based access may include a use of orthogonal SPs (to reduce or minimize interference) or back-to-back SPs, which may be applicable for relay use cases. Another aspect of time-based access may include triggered TXOP sharing. Such an aspect may be used when coordinating wireless communication devices include peer-to-peer devices or include devices utilizing C-TDMA. In such aspects, a management frame may provide information associated with coordination when a TXOP is shared between wireless communication devices, as well as one or more additional channel access parameters.

Additionally, or alternatively, the frame format 700 may apply to frequency-based medium access coordination mechanisms. For frequency-based medium access coordination, the frame format 700 may provide signaling for coordinating frequency-based access. In some cases, the frame format 700 may provide information or parameters associated with coordinated OFDMA (C-OFDMA). In such cases, a wireless communication device which obtains (such as holds or owns) a TXOP may allocate resource units (RUs) to other wireless communication devices within a duration of the TXOP, such that one or more other wireless communication devices may be allocated one or more RUs to use for their own transmissions. Additionally, or alternatively, the frame format 700 may provide information or parameters associated with coordinated FDMA (C-FDMA). C-FDMA may include frequency sharing between wireless communication devices. In an example, a wireless communication device with large bandwidth may share the bandwidth with other wireless communication devices during a TXOP, where each wireless communication device may use one or more different channels or sub-channels.

Additionally, or alternatively, the frame format 700 may apply to spatial reuse-based medium access coordination mechanisms. For spatial reuse-based medium access coordination, the frame format 700 may provide signaling for coordinating spatial reuse between wireless communication devices. For example, a management frame may indicate one or more parameters associated with spatial reuse-based medium access, which may include a transmission power of a principal and/or a secondary device. As described herein, signaled (transmitted and/or received) medium access information may include or otherwise indicate information associated with (such as parameters applicable to) one or more of a time-based medium access coordination mechanism, a frequency-based medium access coordination mechanism, and a spatial reuse-based medium access coordination mechanism.

In some implementations, one or more wireless communication devices may exchange management frames at least including timing information to coordinate or negotiate on a medium access scheme. For example, a first wireless communication device may transmit a first management frame including an indication of medium access information. The medium access information may be associated with a coordinated medium access scheme between the first wireless communication device and at least one other wireless communication device. The first wireless communication device may receive a second management frame including a response to the indication of the medium access information. The response may be based at least in part on a capability of the at least one other wireless communication device associated with the medium access scheme. Such a management frame exchange may apply to coordinated medium access scheme negotiation between an AP 102 and a STA 104 or between peer devices in a peer-to-peer network (such as a network using Wi-Fi direct communication).

In some implementations, a management frame may include a field associated with reason codes or modes to indicate the response. Such a field may be referred to as a reason code field, a usage mode field, an operating mode field, a mode indicator field, or the like. Such a field may indicate if a requested coordinated medium access scheme can be accommodated, if the requested coordinated medium access scheme exceeds capacity, if the requested coordinated medium access scheme is unrecognized or unknown (or if the request itself is unrecognized or unknown), or if any information conveyed by a received management frame is unrecognized or unknown. In some implementations, if the requested coordinated medium access scheme is unrecognized or unknown, a responding device may set or configure a set of bits of the field (of the reason code field) to a set of defined, dedicated, or preconfigured values. For example, the responding device may set the bits of the field to all "1" values, all "0" values, some other specific permutation of bit values, or some other value to indicate that the requested coordinated medium access scheme is unrecognized or unknown. In some aspects, such defined, dedicated, or preconfigured values may be stored in a memory of a device (such as in accordance with a standard configuration to facilitate mutual understanding between devices in a system). For example, a responding device (such as an AP or a non-AP STA) can set the 1 octet Usage Mode field that is carried in a Channel Usage element that it transmits to a fixed value (such as 255, i.e., all 1s) to indicate that it (i.e., the responding device) does not understand the content (i.e., request or indication) carried in a request frame transmitted by the peer device. Such a fixed value can be defined by IEEE 802.11 standard and thus made well known.

The timing information included in the exchanged management frames may be related to aspects of the coordinated medium access scheme. For example, the timing information may be related to synchronization times (such as start times, partial or full TSF time) at which specific actions by coordinating devices may be performed, a synchronization periodicity (such as repeating synchronization times) starting from the synchronization times, synchronization periods (such as SP duration) starting from the synchronization times, or any combination thereof. The synchronization periodicity may be defined at a microsecond level (such as 1 microsecond, 16 microseconds, 32 microseconds) or at a time unit (TU) level (such as which may be associated with time units defined on a 1,024 microseconds basis). The management frames sent and received also may include information related to coordination setup and rules type (such as Request and/or Response), access rules, TIDs, and other information related to the coordinated medium access scheme. In some cases, coordinating APs 102 also may announce an information element that carries similar information to assist the coordination among the APs 102 and the STAs 104.

Some frames described in the context of FIG. 7 may be used in a coordinated timing protocol (such as coordinated medium access protocol). For example, at least one of the exchanged management frames may be a coordinated (AP) medium access protocol setup frame, a coordinated (AP) medium access protocol teardown frame, a coordinated (AP) medium access protocol suspend frame, a coordinated (AP) medium access protocol resume frame, or a broadcast frame. In some aspects, a broadcast frame may assist in announcing information associated with the coordinated timing protocol to multiple STAs 104 and multiple associated APs 102. Management frames may include beacon frames, probe request/response frames, and associated request/response frames. As such, two or more wireless communication devices may exchange management frames including or conveying information or fields described in the context of FIG. 7 to facilitate coordination and/or negotiation on a medium access scheme, such as a medium access scheme for a multi-hop relay of latency sensitive data traffic.

Figure 8:
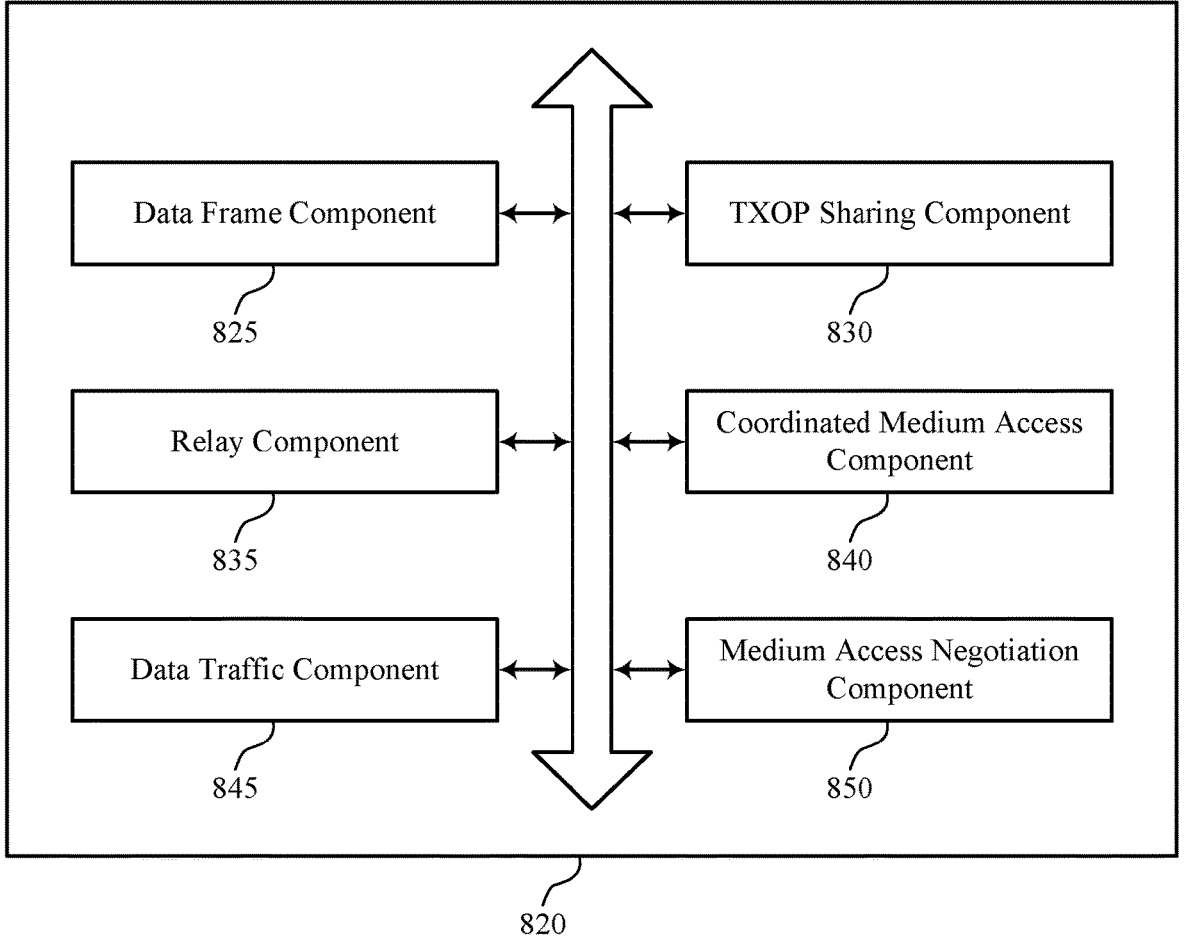
FIG. 8 shows a block diagram of an example wireless communication device that supports channel access techniques in a multi-hop framework for UHR according to some aspects of the present disclosure.
Figure 8:

FIG. 8 shows a block diagram of an example wireless communication device 800 that supports channel access techniques in a multi-hop framework for ultra-high reliability according to some aspects of the present disclosure. In various examples, the wireless communication device 800 can be a chip, SoC, chipset, package or device that may include: one or more modems (such as, a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

In some implementations, the wireless communication device 800 can be a device for use in an AP, such as AP 102 described with reference to FIG. 1. In some other examples, the wireless communication device 800 can be an AP that includes such a chip, SoC, chipset, package or device as well as multiple antennas. The wireless communication device 800 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some implementations, the wireless communication device 800 also includes or can be coupled with an application processor which may be further coupled with another memory. In some implementations, the wireless communication device 800 further includes at least one external network interface that enables communication with a core network or backhaul network to gain access to external networks including the Internet.

The wireless communication device 800 includes a data frame component 825, a TXOP sharing component 830, a relay component 835, a coordinated medium access component 840, a data traffic component 845, and a medium access negotiation component 850. Portions of the one or more of the data frame component 825, the TXOP sharing component 830, the relay component 835, the coordinated medium access component 840, the data traffic component 845, and the medium access negotiation component 850 may be implemented at least in part in the hardware or firmware. For example, one or more of the data frame component 825, the TXOP sharing component 830, the relay component 835, the coordinated medium access component 840, the data traffic component 845, and the medium access negotiation component 850 may be implemented at least in part by a modem. In some implementations, at least some of the data frame component 825, the TXOP sharing component 830, the relay component 835, the coordinated medium access component 840, the data traffic component 845, and the medium access negotiation component 850 are implemented at least in part by a processor and as software stored in memory. For example, portions of one or more of the data frame component 825, the TXOP sharing component 830, the relay component 835, the coordinated medium access component 840, the data traffic component 845, and the medium access negotiation component 850 can be implemented as non-transitory instructions (or "code") executable by the processor to perform the functions or operations of the respective module.

In some implementations, the processor may be a component of a processing system. A processing system may generally refer to a system or series of machines or components that receives inputs and processes the inputs to produce a set of outputs (which may be passed to other systems or components of, for example, the device 800). For example, a processing system of the device 800 may refer to a system including the various other components or subcomponents of the device 800, such as the processor, or a transceiver, or a communications manager, or other components or combinations of components of the device 800. The processing system of the device 800 may interface with other components of the device 800, and may process information received from other components (such as inputs or signals) or output information to other components. For example, a chip or modem of the device 800 may include a processing system, a first interface to output information and a second interface to obtain information. In some implementations, the first interface may refer to an interface between the processing system of the chip or modem and a transmitter, such that the device 800 may transmit information output from the chip or modem. In some implementations, the second interface may refer to an interface between the processing system of the chip or modem and a receiver, such that the device 800 may obtain information or signal inputs, and the information may be passed to the processing system. A person having ordinary skill in the art will readily recognize that the first interface also may obtain information or signal inputs, and the second interface also may output information or signal outputs.

The AP 820 may support wireless communication performable at a first wireless communication device in accordance with examples as disclosed herein. The data frame component 825 is capable of, configured to, or operable to support a means for receiving a first data frame for relaying to a second wireless communication device. The TXOP sharing component 830 is capable of, configured to, or operable to support a means for receiving a frame associated with a sharing of a transmission opportunity with the first wireless communication device, where a duration of the transmission opportunity is associated with a data traffic at the second wireless communication device and a multi-hop link between the second wireless communication device and a third wireless communication device via at least the first wireless communication device. The relay component 835 is capable of, configured to, or operable to support a means for transmitting, in accordance with the multi-hop link, a second data frame toward the second wireless communication device during the transmission opportunity.

In some implementations, the TXOP sharing component 830 is capable of, configured to, or operable to support a means for transmitting a dynamic resource request associated with the data traffic at the second wireless communication device, where receiving the frame associated with the sharing of the transmission opportunity with the first wireless communication device is based on the dynamic resource request.

In some implementations, the dynamic resource request indicates delay bound information, medium time information, bandwidth information, or any combination thereof based on the data traffic at the second wireless communication device.

In some implementations, the dynamic resource request indicates a flow identifier associated with the data traffic at the second wireless communication device. In some implementations, the flow identifier is indicated by a traffic identifier (TID) or a stream classification service (SCS) identifier (SCSID).

In some implementations, the TXOP sharing component 830 is capable of, configured to, or operable to support a means for transmitting the dynamic resource request to the third wireless communication device, where the transmission opportunity is initially obtained by the third wireless communication device. In some implementations, the TXOP sharing component 830 is capable of, configured to, or operable to support a means for transmitting the dynamic resource request to the second wireless communication device, where the transmission opportunity is initially obtained by the second wireless communication device.

In some implementations, the relay component 835 is capable of, configured to, or operable to support a means for participating in communication of information associated with a set of multiple time epochs, where the set of multiple time epochs is based on the data traffic at the second wireless communication device and the multi-hop link between the second wireless communication device and the third wireless communication device via at least the first wireless communication device, and where the transmission opportunity includes at least a portion of a first time epoch of the set of multiple time epochs.

In some implementations, each time epoch of the set of multiple time epochs is a starting point of a respective service period.

In some implementations, the data frame component 825 is capable of, configured to, or operable to support a means for receiving the first data frame from the third wireless communication device in accordance with the first time epoch. In some implementations, the relay component 835 is capable of, configured to, or operable to support a means for transmitting the second data frame toward the second wireless communication device in accordance with the first time epoch based on the sharing of the transmission opportunity with the first wireless communication device, where the second data frame is a relayed version of the first data frame.

In some implementations, the relay component 835 is capable of, configured to, or operable to support a means for participating in communication of medium access information associated with each of the set of multiple time epochs. In some implementations, the relay component 835 is capable of, configured to, or operable to support a means for accessing a wireless medium in accordance with the first time epoch of the set of multiple time epochs based on the medium access information and the sharing of the transmission opportunity, where the second data frame is transmitted in accordance with the first time epoch based on accessing the wireless medium in accordance with the first time epoch.

In some implementations, the medium access information indicates a respective medium access priority of the first wireless communication device for each time epoch of the set of multiple time epochs in accordance with a differentiated medium access scheme between at least the first wireless communication device and the third wireless communication device. In some implementations, the differentiated medium access scheme is associated with the multi-hop link between the second wireless communication device and the third wireless communication device via at least the first wireless communication device.

In some implementations, in accordance with the differentiated medium access scheme, the medium access information indicates different channel access parameters for different wireless communication devices at different times, the different channel access parameters for the different wireless communication devices indicating different medium access priorities for the different wireless communication devices, and the different channel access parameters at the different times indicating a pattern according to which a respective wireless communication device of the different wireless communication devices has relatively higher priority medium access at a respective time or a respective transmission opportunity.

In some implementations, the pattern is based on an order of flow. In some implementations, an upstream wireless communication device has relatively higher priority medium access at an earlier time or an earlier transmission opportunity and a downstream wireless communication device has relatively higher priority medium access at a later time or a later transmission opportunity for a downlink flow. In some implementations, the downstream wireless communication device has relatively higher priority medium access at the earlier time or the earlier transmission opportunity and the upstream wireless communication device has relatively higher priority medium access at the later time or the later transmission opportunity for an uplink flow.

In some implementations, the medium access information indicates a quieting duration for the first wireless communication device, differentiated enhanced distributed channel access (EDCA) parameters for the first wireless communication device, multi-user (MU)-EDCA parameters for the first wireless communication device, whether a restarting of a random backoff counter at a beginning of a time epoch is to be performed by the first wireless communication device, power control information, or any combination thereof.

In some implementations, the relay component 835 is capable of, configured to, or operable to support a means for receiving data traffic information associated with the second wireless communication device. In some implementations, the relay component 835 is capable of, configured to, or operable to support a means for transmitting, to the third wireless communication device, the data traffic information, where the information associated with the set of multiple time epochs is based on the data traffic information.

In some implementations, the data traffic information includes buffer status information or traffic flow information, or both.

In some implementations, the transmission opportunity terminates prior to a second time epoch of the set of multiple time epochs subsequent to the first time epoch.

In some implementations, an ending point of a service period associated with the first time epoch is aligned with a starting point of the second time epoch based on data traffic characteristics at the second wireless communication device.

In some implementations, the set of multiple time epochs is associated with a coordinated restricted target wake time (TWT)-based medium access scheme. In some implementations, a timing of the set of multiple time epochs is based on the data traffic at the second wireless communication device.

In some implementations, the relay component 835 is capable of, configured to, or operable to support a means for performing an enhanced distributed channel access (EDCA) scheme to obtain medium access during time periods outside of service periods associated with the set of multiple time epochs, where the information associated with the set of multiple time epochs indicates fully scheduled service periods associated with the data traffic at the second wireless communication device and EDCA time periods outside of the fully scheduled service periods.

In some implementations, the relay component 835 is capable of, configured to, or operable to support a means for transmitting a second frame associated with a further sharing of the transmission opportunity with a fourth wireless communication device, where the further sharing of the transmission opportunity with the fourth wireless communication device indicates that the fourth wireless communication device is to use the transmission opportunity to relay the second data frame to the second wireless communication device during the transmission opportunity.

In some implementations, the relay component 835 is capable of, configured to, or operable to support a means for receiving a third data packet for relaying to the third wireless communication device. In some implementations, the relay component 835 is capable of, configured to, or operable to support a means for transmitting, in accordance with the multi-hop link, a fourth data packet toward the third wireless communication device during the transmission opportunity, where the fourth data packet is a relayed version of the third data packet.

In some implementations, the frame associated with the sharing of the transmission opportunity is received from the third wireless communication device. In some implementations, the third wireless communication device initiates the relaying to the third wireless communication device in accordance with the sharing of the transmission opportunity.

In some implementations, the data frame component 825 is capable of, configured to, or operable to support a means for receiving the first data frame during a time period prior to the transmission opportunity shared by the frame.

In some implementations, the relay component 835 is capable of, configured to, or operable to support a means for transmitting a second frame during the transmission opportunity based on a processing of the first data frame, where transmitting the second data frame during the transmission opportunity is based on transmitting the second frame.

In some implementations, to support transmitting the second frame, the relay component 835 is capable of, configured to, or operable to support a means for transmitting the second frame based on a determination that the processing of the first data frame will take greater than a threshold time duration, where the threshold time duration is associated with the duration of the transmission opportunity, and where the second frame is a clear-to-send (CTS) frame.

In some implementations, to support transmitting the second data frame toward the second wireless communication device, the relay component 835 is capable of, configured to, or operable to support a means for transmitting the second data frame directly to the second wireless communication device or indirectly to the second wireless communication device via a downstream wireless communication device in accordance with a multi-hop link topology involving at least the first wireless communication device, the second wireless communication device, and the third wireless communication device.

In some implementations, the relay component 835 is capable of, configured to, or operable to support a means for receiving an indication of a priority associated with a delivery of the second data frame to the second wireless communication device, where the indication is included in one or more of a header of the first data frame, a control field of the first data frame, or the frame associated with the sharing of the transmission opportunity, and where transmitting the second data frame is based on the priority associated with the delivery of the second data frame to the second wireless communication device.

In some implementations, the transmission opportunity is shared with the first wireless communication device and a fourth wireless communication device in accordance with the multi-hop link between the second wireless communication device and the third wireless communication device via at least the first wireless communication device. In some implementations, medium access information indicates a prioritization schedule for the first wireless communication device and the fourth wireless communication device for medium access within the transmission opportunity.

In some implementations, the data traffic at the second wireless communication device is associated with latency sensitive data traffic.

In some implementations, the first wireless communication device is a satellite access point, the second wireless communication device is a wireless station, and the third wireless communication device is a root access point.

Additionally, or alternatively, the AP 820 may support wireless communication performable at a first wireless communication device in accordance with examples as disclosed herein. In some implementations, the data frame component 825 is capable of, configured to, or operable to support a means for transmitting a data frame toward a second wireless communication device during a transmission opportunity of the first wireless communication device, where the data frame is for relaying to the second wireless communication device. In some implementations, the TXOP sharing component 830 is capable of, configured to, or operable to support a means for transmitting a frame associated with a sharing of the transmission opportunity of the first wireless communication device with a third wireless communication device, where a duration of the transmission opportunity is associated with a data traffic at the second wireless communication device and a multi-hop link to the second wireless communication device via at least the first wireless communication device and the third wireless communication device.

In some implementations, the TXOP sharing component 830 is capable of, configured to, or operable to support a means for receiving, from the third wireless communication device, a dynamic resource request associated with the data traffic at the second wireless communication device, where transmitting the frame associated with the sharing of the transmission opportunity with the third wireless communication device is based on the dynamic resource request.

In some implementations, the dynamic resource request indicates delay bound information, medium time information, bandwidth information, or any combination thereof based on the data traffic at the second wireless communication device.

In some implementations, the relay component 835 is capable of, configured to, or operable to support a means for participating in communication of information associated with a set of multiple time epochs, where the set of multiple time epochs is based on the data traffic at the second wireless communication device and the multi-hop link to the second wireless communication device via at least the first wireless communication device and the third wireless communication device, and where the transmission opportunity includes at least a portion of a first time epoch of the set of multiple time epochs.

In some implementations, the relay component 835 is capable of, configured to, or operable to support a means for participating in communication of medium access information associated with each of the set of multiple time epochs. In some implementations, the relay component 835 is capable of, configured to, or operable to support a means for accessing a wireless medium in accordance with the first time epoch of the set of multiple time epochs based on the medium access information, where the data frame and the frame are transmitted in accordance with the first time epoch based on accessing the wireless medium in accordance with the first time epoch.

In some implementations, the relay component 835 is capable of, configured to, or operable to support a means for participating in communication of data traffic information associated with the second wireless communication device, where the set of multiple time epochs is based on the data traffic information.

In some implementations, the data traffic information includes buffer status information or traffic flow information, or both.

In some implementations, the transmission opportunity terminates prior to a second time epoch of the set of multiple time epochs subsequent to the first time epoch.

In some implementations, an ending point of a first service period associated with the first time epoch is aligned with a starting point of a second service period associated with the second time epoch based on data traffic characteristics at the second wireless communication device.

In some implementations, the set of multiple time epochs is associated with a coordinated restricted target wake time (TWT)-based medium access scheme. In some implementations, a timing of the set of multiple time epochs is based on the data traffic at the second wireless communication device.

In some implementations, the TXOP sharing component 830 is capable of, configured to, or operable to support a means for receiving a second data frame from the third wireless communication device in accordance with the sharing of the transmission opportunity, where the third wireless communication device is an upstream wireless communication device, where the data frame is a relayed version of the second data frame, and where the data frame is transmitted after the sharing of the transmission opportunity.

In some implementations, the TXOP sharing component 830 is capable of, configured to, or operable to support a means for sharing the transmission opportunity with the third wireless communication device to enable a relaying of the data frame from the third wireless communication device toward the second wireless communication device, where the third wireless communication device is a downstream wireless communication device, and where the data frame is transmitted prior to the sharing of the transmission opportunity.

In some implementations, to support transmitting the data frame toward the second wireless communication device, the relay component 835 is capable of, configured to, or operable to support a means for transmitting the data frame directly to the second wireless communication device or indirectly to the second wireless communication device via at least the third wireless communication device in accordance with a multi-hop link topology involving at least the first wireless communication device, the second wireless communication device, and the third wireless communication device.

In some implementations, the relay component 835 is capable of, configured to, or operable to support a means for transmitting an indication of a priority associated with a delivery of the data frame to the second wireless communication device, where the indication is included in one or more of a header of the data frame, a control field of the data frame, or the frame associated with the sharing of the transmission opportunity.

In some implementations, the transmission opportunity is shared with the third wireless communication device and a fourth wireless communication device in accordance with the multi-hop link between the first wireless communication device and the second wireless communication device via at least the third wireless communication device. In some implementations, medium access information indicates a prioritization schedule for the first wireless communication device and the fourth wireless communication device for medium access within the transmission opportunity.

In some implementations, the data traffic at the second wireless communication device is associated with latency sensitive data traffic.

In some implementations, the first wireless communication device is a satellite access point, the second wireless communication device is a wireless station, and the third wireless communication device is a root access point.

In some implementations, the first wireless communication device is a root access point, the second wireless communication device is a wireless station, and the third wireless communication device is a satellite access point.

Additionally, or alternatively, the AP 820 may support wireless communication performable at a first wireless communication device in accordance with examples as disclosed herein. The coordinated medium access component 840 is capable of, configured to, or operable to support a means for participating in communication of information associated with a set of multiple time epochs, where the set of multiple time epochs is based on a data traffic at a second wireless communication device and a multi-hop link between the second wireless communication device and a third wireless communication device via at least the first wireless communication device. In some implementations, the relay component 835 is capable of, configured to, or operable to support a means for relaying, from the third wireless communication device toward the second wireless communication device in accordance with the multi-hop link, a data frame associated with the data traffic at the second wireless communication device in accordance with at least a first time epoch of the set of multiple time epochs.

In some implementations, the coordinated medium access component 840 is capable of, configured to, or operable to support a means for participating in communication of medium access information associated with each of the set of multiple time epochs. In some implementations, the relay component 835 is capable of, configured to, or operable to support a means for accessing a wireless medium in accordance with at least the first time epoch of the set of multiple time epochs based on the medium access information, where relaying the data frame in accordance with at least the first time epoch is based on accessing the wireless medium in accordance with at least the first time epoch.

In some implementations, the coordinated medium access component 840 is capable of, configured to, or operable to support a means for refraining from accessing the wireless medium in accordance with at least a second time epoch of the set of multiple time epochs based on the medium access information, where the medium access information indicates a first medium access priority of the first wireless communication device for the first time epoch and indicates a second medium access priority of the first wireless communication device for the second time epoch.

In some implementations, the medium access information indicates the first medium access priority for the first time epoch and indicates the second medium access priority for the second time epoch in accordance with a differentiated medium access scheme between at least the first wireless communication device and the third wireless communication device. In some implementations, the differentiated medium access scheme is associated with the multi-hop link between the second wireless communication device and the third wireless communication device via at least the first wireless communication device.

In some implementations, in accordance with the differentiated medium access scheme, the medium access information indicates different channel access parameters for different wireless communication devices at different times, the different channel access parameters for the different wireless communication devices indicating different medium access priorities for the different wireless communication devices, and the different channel access parameters at the different times indicating a pattern according to which a respective wireless communication device of the different wireless communication devices has relatively higher priority medium access at a respective time or a respective transmission opportunity.

In some implementations, the pattern is based on an order of flow. In some implementations, an upstream wireless communication device has relatively higher priority medium access at an earlier time or an earlier transmission opportunity and a downstream wireless communication device has relatively higher priority medium access at a later time or a later transmission opportunity for a downlink flow. In some implementations, the downstream wireless communication device has relatively higher priority medium access at the earlier time or the earlier transmission opportunity and the upstream wireless communication device has relatively higher priority medium access at the later time or the later transmission opportunity for an uplink flow.

In some implementations, the second medium access priority is associated with a quieting duration for the first wireless communication device, a disabling of channel access for a time duration including the second time epoch, a restarting of a random backoff counter at a beginning of the second time epoch, a reception of a clear-to-send (CTS) frame, or any combination thereof.

In some implementations, to support relaying the data frame in accordance with at least the first time epoch, the relay component 835 is capable of, configured to, or operable to support a means for receiving the data frame from an upstream wireless communication device during a first service period associated with the first time epoch. In some implementations, to support relaying the data frame in accordance with at least the first time epoch, the relay component 835 is capable of, configured to, or operable to support a means for transmitting the data frame to a downstream wireless communication device during a second service period associated with a second time epoch of the set of multiple time epochs subsequent to the first time epoch.

In some implementations, the second time epoch is associated with a Trigger-enabled restricted target wake time (TWT). In some implementations, the downstream wireless communication device is the second wireless communication device.

In some implementations, an ending point of a service period associated with the first time epoch is aligned with a starting point of the second time epoch based on data traffic characteristics at the second wireless communication device.

In some implementations, the coordinated medium access component 840 is capable of, configured to, or operable to support a means for participating in communication of data traffic information associated with the second wireless communication device, where the information associated with the set of multiple time epochs is based on the data traffic information.

In some implementations, the data traffic information includes buffer status information or traffic flow information, or both.

In some implementations, the TXOP sharing component 830 is capable of, configured to, or operable to support a means for transmitting a dynamic resource request associated with the data traffic at the second wireless communication device, where the dynamic resource request indicates delay bound information, medium time information, bandwidth information, or any combination thereof. In some implementations, the TXOP sharing component 830 is capable of, configured to, or operable to support a means for receiving a frame associated with a sharing of a transmission opportunity with the first wireless communication device based on the dynamic resource request.

In some implementations, the transmission opportunity includes at least a portion of a service period associated with the first time epoch. In some implementations, relaying the data frame in accordance with at least the first time epoch is based on the sharing of the transmission opportunity.

In some implementations, a duration of the transmission opportunity is associated with the multi-hop link between the second wireless communication device and the third wireless communication device via at least the first wireless communication device.

In some implementations, the transmission opportunity terminates prior to a subsequent time epoch of the set of multiple time epochs.

In some implementations, the TXOP sharing component 830 is capable of, configured to, or operable to support a means for receiving a dynamic resource request associated with the data traffic at the second wireless communication device, where the dynamic resource request indicates delay bound information, medium time information, bandwidth information, or any combination thereof. In some implementations, the TXOP sharing component 830 is capable of, configured to, or operable to support a means for transmitting a frame associated with a sharing of a transmission opportunity based on the dynamic resource request.

In some implementations, the transmission opportunity includes at least a portion of the first time epoch. In some implementations, the transmission opportunity is for a relay of the data frame from the first wireless communication device toward the second wireless communication device.

In some implementations, the relay component 835 is capable of, configured to, or operable to support a means for receiving a request-to-send (RTS) frame from an upstream wireless communication device. In some implementations, the relay component 835 is capable of, configured to, or operable to support a means for transmitting a clear-to-send (CTS) frame in accordance with the first time epoch based on receiving the RTS frame, where relaying the data frame in accordance with at least the first time epoch is based on transmitting the CTS frame in accordance with the first time epoch.

In some implementations, the coordinated medium access component 840 is capable of, configured to, or operable to support a means for performing an enhanced distributed channel access (EDCA) scheme to obtain medium access during time periods outside of service periods associated with the set of multiple time epochs, where the information associated with the set of multiple time epochs indicates fully scheduled service periods associated with the data traffic at the second wireless communication device and EDCA time periods outside of the fully scheduled service periods.

In some implementations, the relay component 835 is capable of, configured to, or operable to support a means for participating in communication of an indication of a priority associated with a delivery of the data frame to the second wireless communication device, where the indication is included in one or more of a header of the data frame, a control field of the data frame, or a frame associated with a sharing of a transmission opportunity, and where relaying the data frame is based on the priority associated with the delivery of the data frame to the second wireless communication device.

In some implementations, the relay component 835 is capable of, configured to, or operable to support a means for receiving link mapping information for one or more data frames associated with the data traffic at the second wireless communication device, the one or more data frames including the data frame, where the link mapping information indicates priority information associated with the one or more data frames in accordance with a mapping of the data traffic at the second wireless communication device to a first set of one or more links, and where the first wireless communication device is a multi-link device.

In some implementations, the set of multiple time epochs include a pair of overlapping time epochs, each time epoch of the pair of overlapping time epochs being associated with a different link of the first wireless communication device, and each time epoch of the pair of overlapping time epochs being associated with one of fronthaul communication toward the second wireless communication device or backhaul communication toward the third wireless communication device.

In some implementations, the set of multiple time epochs is associated with a coordinated restricted target wake time (TWT)-based medium access scheme. In some implementations, a timing of the set of multiple time epochs is based on the data traffic at the second wireless communication device.

In some implementations, the data traffic at the second wireless communication device is associated with latency sensitive data traffic.

In some implementations, each time epoch of the set of multiple time epochs is a starting point of a respective service period.

In some implementations, the first wireless communication device is a satellite access point, the second wireless communication device is a wireless station, and the third wireless communication device is a root access point.

Additionally, or alternatively, the AP 820 may support wireless communication performable at a first wireless communication device in accordance with examples as disclosed herein. The data traffic component 845 is capable of, configured to, or operable to support a means for participating in communication of data traffic information associated with a second wireless communication device. In some implementations, the coordinated medium access component 840 is capable of, configured to, or operable to support a means for participating in communication of information associated with a set of multiple time epochs, where the set of multiple time epochs is based on the data traffic information and a multi-hop link between the first wireless communication device and the second wireless communication device via at least a third wireless communication device. In some implementations, the relay component 835 is capable of, configured to, or operable to support a means for transmitting, toward the second wireless communication device in accordance with the multi-hop link, a data frame in accordance with at least a first time epoch of the set of multiple time epochs.

In some implementations, the coordinated medium access component 840 is capable of, configured to, or operable to support a means for participating in communication of medium access information associated with each of the set of multiple time epochs. In some implementations, the relay component 835 is capable of, configured to, or operable to support a means for accessing a wireless medium in accordance with the first time epoch of the set of multiple time epochs based on the medium access information, where transmitting the data frame in accordance with the first time epoch is based on accessing the wireless medium in accordance with the first time epoch.

In some implementations, the coordinated medium access component 840 is capable of, configured to, or operable to support a means for refraining from accessing the wireless medium in accordance with at least a second time epoch of the set of multiple time epochs based on the medium access information, where the medium access information indicates a first medium access priority of the first wireless communication device for the first time epoch and indicates a second medium access priority of the first wireless communication device for the second time epoch.

In some implementations, the medium access information indicates the first medium access priority for the first time epoch and indicates the second medium access priority for the second time epoch in accordance with a differentiated medium access scheme between at least the first wireless communication device and the third wireless communication device. In some implementations, the differentiated medium access scheme is associated with the multi-hop link between the first wireless communication device and the second wireless communication device via at least the third wireless communication device.

In some implementations, the TXOP sharing component 830 is capable of, configured to, or operable to support a means for receiving a dynamic resource request associated with data traffic at the second wireless communication device, where the dynamic resource request indicates delay bound information, medium time information, bandwidth information, or any combination thereof. In some implementations, the TXOP sharing component 830 is capable of, configured to, or operable to support a means for transmitting a frame associated with a sharing of a transmission opportunity based on the dynamic resource request.

In some implementations, the transmission opportunity includes at least a portion of the first time epoch. In some implementations, a duration of the transmission opportunity is associated with the multi-hop link between the first wireless communication device and the second wireless communication device via at least the third wireless communication device.

In some implementations, the set of multiple time epochs is associated with a coordinated restricted target wake time (TWT)-based medium access scheme. In some implementations, a timing of the set of multiple time epochs is based on the data traffic information.

In some implementations, data traffic at the second wireless communication device is associated with latency sensitive data traffic.

In some implementations, the first wireless communication device is a root access point, the second wireless communication device is a wireless station, and the third wireless communication device is a satellite access point.

Additionally, or alternatively, the AP 820 may support wireless communication performable at a first wireless communication device in accordance with examples as disclosed herein. The medium access negotiation component 850 is capable of, configured to, or operable to support a means for transmitting a first management frame including an indication of medium access information, where the medium access information is associated with a coordinated medium access scheme between the first wireless communication device and at least a second wireless communication device. In some implementations, the medium access negotiation component 850 is capable of, configured to, or operable to support a means for receiving a second management frame including a response to the indication of the medium access information, where the response is based on a capability of the second wireless communication device associated with the coordinated medium access scheme.

In some implementations, the medium access negotiation component 850 is capable of, configured to, or operable to support a means for transmitting the indication of the medium access information via an information element of the first management frame.

In some implementations, the information element is included in an action field of the first management frame.

In some implementations, the medium access information includes timing information associated with a synchronization time between the first wireless communication device and at least the second wireless communication device, a synchronization periodicity between the first wireless communication device and at least the second wireless communication device, a duration of a synchronization period between the first wireless communication device and at least the second wireless communication device, or any combination thereof.

In some implementations, the medium access information includes information pertaining to time-based medium access. In some implementations, the information pertaining to the time-based medium access indicates first parameters associated with a coordinated restricted target wake time (TWT)-based medium access scheme involving at least the first wireless communication device and the second wireless communication device or second parameters associated with transmission opportunity sharing between at least the first wireless communication device and the second wireless communication device, or indicates both the first parameters and the second parameters.

In some implementations, the medium access information includes information pertaining to frequency-based medium access. In some implementations, the information pertaining to the frequency-based medium access indicates parameters associated with frequency division multiple access involving at least the first wireless communication device and the second wireless communication device.

In some implementations, the medium access information includes information pertaining to spatial-based medium access. In some implementations, the information pertaining to the spatial-based medium access indicates parameters associated with spatial reuse involving at least the first wireless communication device and the second wireless communication device.

In some implementations, the response to the indication of the medium access information includes an indication of whether parameters associated with the medium access information can be accommodated by the second wireless communication device, whether the parameters associated with the medium access information exceed a capacity of the second wireless communication device, whether the indication of the medium access information is recognized by the second wireless communication device, or any combination thereof.

In some implementations, the second management frame indicates the response via a reason code field associated with the medium access information.

In some implementations, the first management frame is one of a coordinated access point medium access protocol setup frame, a coordinated access point medium access protocol teardown frame, a coordinated access point medium access protocol suspend frame, a coordinated access point medium access protocol resume frame, or a broadcast fame associated with coordinating access point medium access.

In some implementations, the medium access information indicates first medium access information for coordinated medium access between the first wireless communication device and the second wireless communication device and indicates second medium access information for coordinated medium access between the second wireless communication device and a third wireless communication device.

In some implementations, the first wireless communication device is an AP, the second wireless communication device is a first non-AP device, and the third wireless communication device is a second non-AP device.

In some implementations, the coordinated medium access scheme indicates coordination between first transmissions by the first wireless communication device or a third wireless communication device and second transmissions by the second wireless communication device. In some implementations, the first wireless communication device and the third wireless communication device are AP devices and the second wireless communication device is a non-AP device.

In some implementations, the coordinated medium access scheme indicates medium access coordination across a set of multiple hops of a multi-hop link involving at least the first wireless communication device, the second wireless communication device, and a third wireless communication device.

In some implementations, the first wireless communication device and the second wireless communication device are both satellite AP devices. In some implementations, one of the first wireless communication device or the second wireless communication device is a root AP device and one of the first wireless communication device or the second wireless communication device is a satellite AP device. In some implementations, the third wireless communication device is an AP device or a non-AP device.

In some implementations, an exchange of the first management frame and the second management frame is associated with a negotiation of the medium access information.

In some implementations, the first wireless communication device is a first AP device or a first non-AP device and the second wireless communication device is a second AP device or a second non-AP device.

Additionally, or alternatively, the AP 820 may support wireless communication performable at a first wireless communication device in accordance with examples as disclosed herein. In some implementations, the medium access negotiation component 850 is capable of, configured to, or operable to support a means for receiving a first management frame including an indication of medium access information, where the medium access information is associated with a coordinated medium access scheme between the first wireless communication device and at least a second wireless communication device. In some implementations, the medium access negotiation component 850 is capable of, configured to, or operable to support a means for transmitting a second management frame including a response to the indication of the medium access information, where the response is based on a capability of the first wireless communication device associated with the coordinated medium access scheme.

In some implementations, the medium access negotiation component 850 is capable of, configured to, or operable to support a means for receiving the indication of the medium access information via an information element of the first management frame.

In some implementations, the information element is included in an action field of the first management frame.

In some implementations, the medium access information includes timing information associated with a synchronization time between the first wireless communication device and at least the second wireless communication device, a synchronization periodicity between the first wireless communication device and at least the second wireless communication device, a duration of a synchronization period between the first wireless communication device and at least the second wireless communication device, or any combination thereof.

In some implementations, the medium access information includes information pertaining to time-based medium access. In some implementations, the information pertaining to the time-based medium access indicates first parameters associated with a coordinated restricted target wake time (TWT)-based medium access scheme involving at least the first wireless communication device and the second wireless communication device or second parameters associated with transmission opportunity sharing between at least the first wireless communication device and the second wireless communication device, or indicates both the first parameters and the second parameters.

In some implementations, the medium access information includes information pertaining to frequency-based medium access. In some implementations, the information pertaining to the frequency-based medium access indicates parameters associated with frequency division multiple access involving at least the first wireless communication device and the second wireless communication device.

In some implementations, the medium access information includes information pertaining to spatial-based medium access. In some implementations, the information pertaining to the spatial-based medium access indicates parameters associated with spatial reuse involving at least the first wireless communication device and the second wireless communication device.

In some implementations, the response to the indication of the medium access information includes an indication of whether parameters associated with the medium access information can be accommodated by the second wireless communication device, whether the parameters associated with the medium access information exceed a capacity of the second wireless communication device, whether the indication of the medium access information is recognized by the second wireless communication device, or any combination thereof.

In some implementations, the second management frame indicates the response via a reason code field associated with the medium access information.

In some implementations, the response indicates that information indicated in the first management frame is unrecognized by the second wireless communication device in accordance with setting a set of bits of the reason code field to dedicated values, the dedicated values associated with indicating that the indication of the medium access information is unrecognized.

In some implementations, the first management frame is one of a coordinated access point medium access protocol setup frame, a coordinated access point medium access protocol teardown frame, a coordinated access point medium access protocol suspend frame, a coordinated access point medium access protocol resume frame, or a broadcast fame associated with coordinating access point medium access.

In some implementations, the medium access information indicates first medium access information for coordinated medium access between the first wireless communication device and the second wireless communication device and indicates second medium access information for coordinated medium access between the first wireless communication device and a third wireless communication device.

In some implementations, the first wireless communication device is an AP, the second wireless communication device is a first non-AP device, and the third wireless communication device is a second non-AP device.

In some implementations, the coordinated medium access scheme indicates coordination between first transmissions by the first wireless communication device and second transmissions by the second wireless communication device or a third wireless communication device. In some implementations, the second wireless communication device and the third wireless communication device are AP devices and the first wireless communication device is a non-AP device.

In some implementations, the coordinated medium access scheme indicates medium access coordination across a set of multiple hops of a multi-hop link involving at least the first wireless communication device, the second wireless communication device, and a third wireless communication device.

In some implementations, the first wireless communication device and the second wireless communication device are both satellite AP devices. In some implementations, one of the first wireless communication device or the second wireless communication device is a root AP device and one of the first wireless communication device or the second wireless communication device is a satellite AP device. In some implementations, the third wireless communication device is an AP device or a non-AP device.

In some implementations, an exchange of the first management frame and the second management frame is associated with a negotiation of the medium access information.

In some implementations, the first wireless communication device is a first AP device or a first non-AP device and the second wireless communication device is a second AP device or a second non-AP device.

Figure 9:
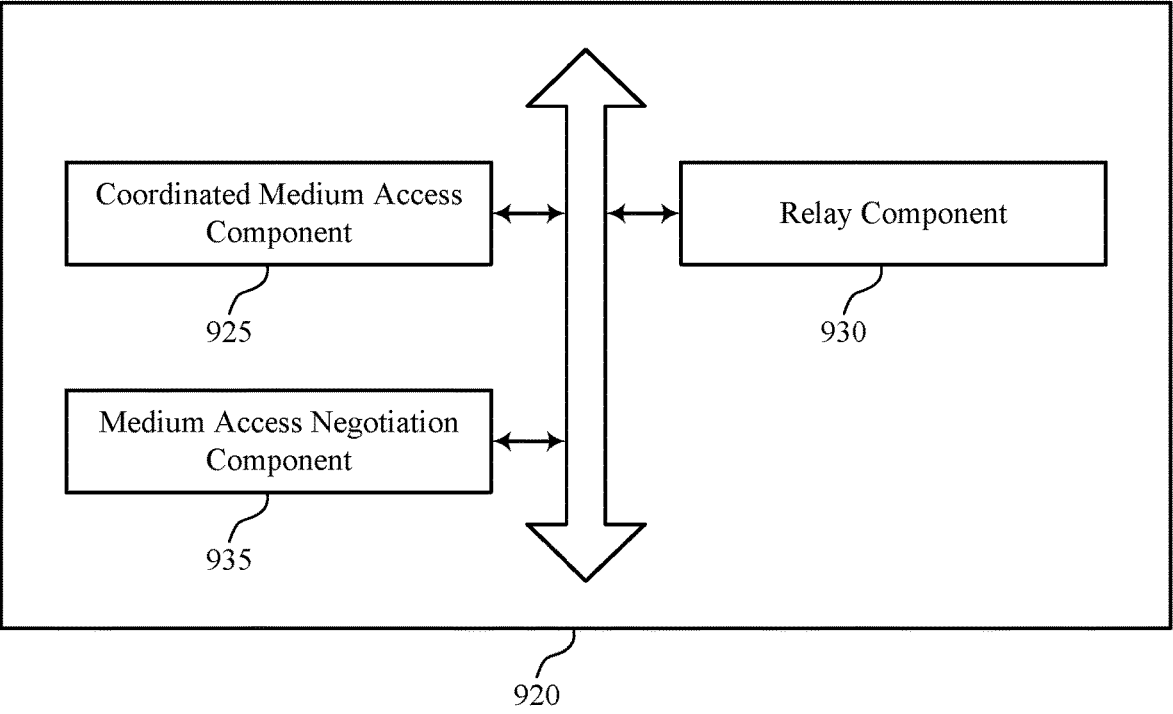
FIG. 9 shows a block diagram of an example wireless communication device that supports channel access techniques in a multi-hop framework for UHR according to some aspects of the present disclosure.
Figure 9:

FIG. 9 shows a block diagram of an example wireless communication device 900 that supports channel access techniques in a multi-hop framework for ultra-high reliability according to some aspects of the present disclosure. In various examples, the wireless communication device 900 can be a chip, SoC, chipset, package or device that may include: one or more modems (such as, a Wi-Fi (IEEE 802.11) modem or a cellular modem such as 3GPP 4G LTE or 5G compliant modem); one or more processors, process- ing blocks or processing elements (collectively "the proces- sor"); one or more radios (collectively "the radio"); and one or more memories or memory blocks (collectively "the memory").

In some implementations, the wireless communication device 900 can be a device for use in a STA, such as STA 104 described with reference to FIG. 1. In some other examples, the wireless communication device 900 can be a STA that includes such a chip, SoC, chipset, package or device as well as multiple antennas. The wireless commu- nication device 900 is capable of transmitting and receiving wireless communications in the form of, for example, wire- less packets. For example, the wireless communication device can be configured or operable to transmit and receive packets in the form of physical layer PPDUs and MPDUs conforming to one or more of the IEEE 802.11 family of wireless communication protocol standards. In some imple- mentations, the wireless communication device 900 also includes or can be coupled with an application processor which may be further coupled with another memory. In some implementations, the wireless communication device 900 further includes a user interface (UI) (such as a touch- screen or keypad) and a display, which may be integrated with the UI to form a touchscreen display. In some imple- mentations, the wireless communication device 900 may further include one or more sensors such as, for example, one or more inertial sensors, accelerometers, temperature sensors, pressure sensors, or altitude sensors.

The wireless communication device 900 includes a coor- dinated medium access component 925, a relay component 930, and a medium access negotiation component 935. Portions of the one or more of the coordinated medium access component 925, the relay component 930, and the medium access negotiation component 935 may be imple- mented at least in part in the hardware or firmware. For example, one or more of the coordinated medium access component 925, the relay component 930, and the medium access negotiation component 935 may be implemented at least in part by a modem. In some implementations, at least some of the coordinated medium access component 925, the relay component 930, and the medium access negotiation component 935 are implemented at least in part by a processor and as software stored in memory. For example, portions of one or more of the coordinated medium access component 925, the relay component 930, and the medium access negotiation component 935 can be implemented as non-transitory instructions (or "code") executable by the processor to perform the functions or operations of the respective module.

In some implementations, the processor may be a com- ponent of a processing system. A processing system may generally refer to a system or series of machines or com- ponents that receives inputs and processes the inputs to produce a set of outputs (which may be passed to other systems or components of, for example, the device 900). For example, a processing system of the device 900 may refer to a system including the various other components or sub- components of the device 900, such as the processor, or a transceiver, or a communications manager, or other compo- nents or combinations of components of the device 900. The processing system of the device 900 may interface with other components of the device 900, and may process information received from other components (such as inputs or signals) or output information to other components. For example, a chip or modem of the device 900 may include a processing system, a first interface to output information and a second interface to obtain information. In some imple- mentations, the first interface may refer to an interface between the processing system of the chip or modem and a transmitter, such that the device 900 may transmit informa- tion output from the chip or modem. In some implementa- tions, the second interface may refer to an interface between the processing system of the chip or modem and a receiver, such that the device 900 may obtain information or signal inputs, and the information may be passed to the processing system. A person having ordinary skill in the art will readily recognize that the first interface also may obtain information or signal inputs, and the second interface also may output information or signal outputs.

The STA 920 may support wireless communication per- formable at a first wireless communication device in accor- dance with examples as disclosed herein. The coordinated medium access component 925 is capable of, configured to, or operable to support a means for participating in commu- nication of information associated with a set of multiple time epochs, where the set of multiple time epochs is based on a data traffic at the first wireless communication device and a multi-hop link to the first wireless communication device via at least a second wireless communication device and a third wireless communication device. The relay component 930 is capable of, configured to, or operable to support a means for receiving, in accordance with the multi-hop link, a data frame associated with the data traffic at the first wireless communication device in accordance with at least a first time epoch of the set of multiple time epochs.

In some implementations, the coordinated medium access component 925 is capable of, configured to, or operable to support a means for participating in communication of medium access information associated with each of the set of multiple time epochs. In some implementations, the relay component 930 is capable of, configured to, or operable to support a means for receiving the data frame in accordance with the first time epoch based on the medium access information.

In some implementations, the coordinated medium access component 925 is capable of, configured to, or operable to support a means for refraining from accessing a wireless medium in accordance with at least a second time epoch of the set of multiple time epochs based on the medium access information.

In some implementations, an access priority of the first wireless communication device for the second time epoch is associated with a quieting duration for the first wireless communication device, a disabling of channel access for a time duration including the second time epoch, a restarting of a random backoff counter at a beginning of the second time epoch, a reception of a clear-to-send (CTS) frame, or any combination thereof.

In some implementations, the medium access information indicates different access priorities of the first wireless communication device for each of the set of multiple time epochs in accordance with a differentiated medium access scheme. In some implementations, the differentiated medium access scheme is associated with the multi-hop link to the first wireless communication device via at least the second wireless communication device and the third wire- less communication device.

In some implementations, the coordinated medium access component 925 is capable of, configured to, or operable to support a means for transmitting data traffic information associated with the first wireless communication device, where the information associated with the set of multiple time epochs is based on transmitting the data traffic information.

In some implementations, the data traffic information includes buffer status information or traffic flow information, or both.

In some implementations, the coordinated medium access component 925 is capable of, configured to, or operable to support a means for performing an enhanced distributed channel access (EDCA) scheme to obtain medium access during time periods outside of service periods associated with the set of multiple time epochs, where the information associated with the set of multiple time epochs indicates fully scheduled service periods associated with the data traffic at the second wireless communication device and EDCA time periods outside of the fully scheduled service periods.

In some implementations, the first time epoch is associated with a Trigger-enabled restricted target wake time (TWT).

In some implementations, the set of multiple time epochs is associated with a coordinated restricted target wake time (TWT)-based medium access scheme. In some implementations, a timing of the set of multiple time epochs is based on the data traffic at the first wireless communication device.

In some implementations, the data traffic at the first wireless communication device is associated with latency sensitive data traffic.

In some implementations, the first wireless communication device is a wireless STA, and the second wireless communication device and the third wireless communication device are upstream wireless communication devices associated with the multi-hop link.

Additionally, or alternatively, the STA 920 may support wireless communication performable at a first wireless communication device in accordance with examples as disclosed herein. The medium access negotiation component 935 is capable of, configured to, or operable to support a means for transmitting a first management frame including an indication of medium access information, where the medium access information is associated with a coordinated medium access scheme between the first wireless communication device and at least a second wireless communication device. In some implementations, the medium access negotiation component 935 is capable of, configured to, or operable to support a means for receiving a second management frame including a response to the indication of the medium access information, where the response is based on a capability of the second wireless communication device associated with the coordinated medium access scheme.

In some implementations, the medium access negotiation component 935 is capable of, configured to, or operable to support a means for transmitting the indication of the medium access information via an information element of the first management frame.

In some implementations, the information element is included in an action field of the first management frame.

In some implementations, the medium access information includes timing information associated with a synchronization time between the first wireless communication device and at least the second wireless communication device, a synchronization periodicity between the first wireless communication device and at least the second wireless communication device, a duration of a synchronization period between the first wireless communication device and at least the second wireless communication device, or any combination thereof.

In some implementations, the medium access information includes information pertaining to time-based medium access. In some implementations, the information pertaining to the time-based medium access indicates first parameters associated with a coordinated restricted target wake time (TWT)-based medium access scheme involving at least the first wireless communication device and the second wireless communication device or second parameters associated with transmission opportunity sharing between at least the first wireless communication device and the second wireless communication device, or indicates both the first parameters and the second parameters.

In some implementations, the medium access information includes information pertaining to frequency-based medium access. In some implementations, the information pertaining to the frequency-based medium access indicates parameters associated with frequency division multiple access involving at least the first wireless communication device and the second wireless communication device.

In some implementations, the medium access information includes information pertaining to spatial-based medium access. In some implementations, the information pertaining to the spatial-based medium access indicates parameters associated with spatial reuse involving at least the first wireless communication device and the second wireless communication device.

In some implementations, the response to the indication of the medium access information includes an indication of whether parameters associated with the medium access information can be accommodated by the second wireless communication device, whether the parameters associated with the medium access information exceed a capacity of the second wireless communication device, whether the indication of the medium access information is recognized by the second wireless communication device, or any combination thereof.

In some implementations, the second management frame indicates the response via a reason code field associated with the medium access information.

In some implementations, the first management frame is one of a coordinated access point medium access protocol setup frame, a coordinated access point medium access protocol teardown frame, a coordinated access point medium access protocol suspend frame, a coordinated access point medium access protocol resume frame, or a broadcast fame associated with coordinating access point medium access.

In some implementations, the medium access information indicates first medium access information for coordinated medium access between the first wireless communication device and the second wireless communication device and indicates second medium access information for coordinated medium access between the second wireless communication device and a third wireless communication device.

In some implementations, the first wireless communication device is an AP, the second wireless communication device is a first non-AP device, and the third wireless communication device is a second non-AP device.

In some implementations, the coordinated medium access scheme indicates coordination between first transmissions by the first wireless communication device or a third wireless communication device and second transmissions by the second wireless communication device. In some implementations, the first wireless communication device and the third wireless communication device are AP devices and the second wireless communication device is a non-AP device.

In some implementations, the coordinated medium access scheme indicates medium access coordination across a set of multiple hops of a multi-hop link involving at least the first wireless communication device, the second wireless communication device, and a third wireless communication device.

In some implementations, the first wireless communication device and the second wireless communication device are both satellite AP devices. In some implementations, one of the first wireless communication device or the second wireless communication device is a root AP device and one of the first wireless communication device or the second wireless communication device is a satellite AP device. In some implementations, the third wireless communication device is an AP device or a non-AP device.

In some implementations, an exchange of the first management frame and the second management frame is associated with a negotiation of the medium access information.

In some implementations, the first wireless communication device is a first AP device or a first non-AP device and the second wireless communication device is a second AP device or a second non-AP device.

Additionally, or alternatively, the STA 920 may support wireless communication performable at a first wireless communication device in accordance with examples as disclosed herein. In some implementations, the medium access negotiation component 935 is capable of, configured to, or operable to support a means for receiving a first management frame including an indication of medium access information, where the medium access information is associated with a coordinated medium access scheme between the first wireless communication device and at least a second wireless communication device. In some implementations, the medium access negotiation component 935 is capable of, configured to, or operable to support a means for transmitting a second management frame including a response to the indication of the medium access information, where the response is based on a capability of the first wireless communication device associated with the coordinated medium access scheme.

In some implementations, the medium access negotiation component 935 is capable of, configured to, or operable to support a means for receiving the indication of the medium access information via an information element of the first management frame.

In some implementations, the information element is included in an action field of the first management frame.

In some implementations, the medium access information includes timing information associated with a synchronization time between the first wireless communication device and at least the second wireless communication device, a synchronization periodicity between the first wireless communication device and at least the second wireless communication device, a duration of a synchronization period between the first wireless communication device and at least the second wireless communication device, or any combination thereof.

In some implementations, the medium access information includes information pertaining to time-based medium access. In some implementations, the information pertaining to the time-based medium access indicates first parameters associated with a coordinated restricted target wake time (TWT)-based medium access scheme involving at least the first wireless communication device and the second wireless communication device or second parameters associated with transmission opportunity sharing between at least the first wireless communication device and the second wireless communication device, or indicates both the first parameters and the second parameters.

In some implementations, the medium access information includes information pertaining to frequency-based medium access. In some implementations, the information pertaining to the frequency-based medium access indicates parameters associated with frequency division multiple access involving at least the first wireless communication device and the second wireless communication device.

In some implementations, the medium access information includes information pertaining to spatial-based medium access. In some implementations, the information pertaining to the spatial-based medium access indicates parameters associated with spatial reuse involving at least the first wireless communication device and the second wireless communication device.

In some implementations, the response to the indication of the medium access information includes an indication of whether parameters associated with the medium access information can be accommodated by the second wireless communication device, whether the parameters associated with the medium access information exceed a capacity of the second wireless communication device, whether the indication of the medium access information is recognized by the second wireless communication device, or any combination thereof.

In some implementations, the second management frame indicates the response via a reason code field associated with the medium access information.

In some implementations, the response indicates that information indicated in the first management frame is unrecognized by the second wireless communication device in accordance with setting a set of bits of the reason code field to dedicated values, the dedicated values associated with indicating that the indication of the medium access information is unrecognized.

In some implementations, the first management frame is one of a coordinated access point medium access protocol setup frame, a coordinated access point medium access protocol teardown frame, a coordinated access point medium access protocol suspend frame, a coordinated access point medium access protocol resume frame, or a broadcast fame associated with coordinating access point medium access.

In some implementations, the medium access information indicates first medium access information for coordinated medium access between the first wireless communication device and the second wireless communication device and indicates second medium access information for coordinated medium access between the first wireless communication device and a third wireless communication device.

In some implementations, the first wireless communication device is an AP, the second wireless communication device is a first non-AP device, and the third wireless communication device is a second non-AP device.

In some implementations, the coordinated medium access scheme indicates coordination between first transmissions by the first wireless communication device and second transmissions by the second wireless communication device or a third wireless communication device. In some implementations, the second wireless communication device and the third wireless communication device are AP devices and the first wireless communication device is a non-AP device.

In some implementations, the coordinated medium access scheme indicates medium access coordination across a set of multiple hops of a multi-hop link involving at least the first wireless communication device, the second wireless communication device, and a third wireless communication device.

In some implementations, the first wireless communication device and the second wireless communication device are both satellite AP devices. In some implementations, one of the first wireless communication device or the second wireless communication device is a root AP device and one of the first wireless communication device or the second wireless communication device is a satellite AP device. In some implementations, the third wireless communication device is an AP device or a non-AP device.

In some implementations, an exchange of the first management frame and the second management frame is associated with a negotiation of the medium access information.

In some implementations, the first wireless communication device is a first AP device or a first non-AP device and the second wireless communication device is a second AP device or a second non-AP device.

FIG. 10 shows a flowchart illustrating an example process 1000 performable at a wireless AP that supports channel access techniques in a multi-hop framework for ultra-high reliability according to some aspects of the present disclosure. The operations of the process 1000 may be an example of a method implemented by a wireless AP or its components as described herein. For example, the process 1000 may be performed by a wireless communication device, such as the wireless communication device 800 described with reference to FIG. 8, operating as or within a wireless AP. In some implementations, the process 1000 may be performed by a wireless AP, such as one of the APs 102 described with reference to FIG. 1.

In some implementations, in block 1005, the wireless AP may receive a first data frame for relaying to a second wireless communication device. The operations of block 1005 may be performed in accordance with examples as disclosed herein. In some implementations, aspects of the operations of block 1005 may be performed by a data frame component 825 as described with reference to FIG. 8.

In some implementations, in block 1010, the wireless AP may receive a frame associated with a sharing of a transmission opportunity with the first wireless communication device, where a duration of the transmission opportunity is associated with a data traffic at the second wireless communication device and a multi-hop link between the second wireless communication device and a third wireless communication device via at least the first wireless communication device. The operations of block 1010 may be performed in accordance with examples as disclosed herein. In some implementations, aspects of the operations of block 1010 may be performed by a TXOP sharing component 830 as described with reference to FIG. 8.

In some implementations, in block 1015, the wireless AP may transmit, in accordance with the multi-hop link, a second data frame toward the second wireless communication device during the transmission opportunity. The operations of block 1015 may be performed in accordance with examples as disclosed herein. In some implementations, aspects of the operations of block 1015 may be performed by a relay component 835 as described with reference to FIG. 8.

FIG. 11 shows a flowchart illustrating an example process 1100 performable at a wireless AP that supports channel access techniques in a multi-hop framework for ultra-high reliability according to some aspects of the present disclosure. The operations of the process 1100 may be an example of a method implemented by a wireless AP or its components as described herein. For example, the process 1100 may be performed by a wireless communication device, such as the wireless communication device 800 described with reference to FIG. 8, operating as or within a wireless AP. In some implementations, the process 1100 may be performed by a wireless AP, such as one of the APs 102 described with reference to FIG. 1.

In some implementations, in block 1105, the wireless AP may transmit a data frame toward a second wireless communication device during a transmission opportunity of the first wireless communication device, where the data frame is for relaying to the second wireless communication device. The operations of block 1105 may be performed in accordance with examples as disclosed herein. In some implementations, aspects of the operations of block 1105 may be performed by a data frame component 825 as described with reference to FIG. 8.

In some implementations, in block 1110, the wireless AP may transmit a frame associated with a sharing of the transmission opportunity of the first wireless communication device with a third wireless communication device, where a duration of the transmission opportunity is associated with a data traffic at the second wireless communication device and a multi-hop link to the second wireless communication device via at least the first wireless communication device and the third wireless communication device. The operations of block 1110 may be performed in accordance with examples as disclosed herein. In some implementations, aspects of the operations of block 1110 may be performed by a TXOP sharing component 830 as described with reference to FIG. 8.

FIG. 12 shows a flowchart illustrating an example process 1200 performable at a wireless AP that supports channel access techniques in a multi-hop framework for ultra-high reliability according to some aspects of the present disclosure. The operations of the process 1200 may be an example of a method implemented by a wireless AP or its components as described herein. For example, the process 1200 may be performed by a wireless communication device, such as the wireless communication device 800 described with reference to FIG. 8, operating as or within a wireless AP. In some implementations, the process 1200 may be performed by a wireless AP, such as one of the APs 102 described with reference to FIG. 1.

In some implementations, in block 1205, the wireless AP may participate in communication of information associated with a set of multiple time epochs, where the set of multiple time epochs is based on a data traffic at a second wireless communication device and a multi-hop link between the second wireless communication device and a third wireless communication device via at least the first wireless communication device. The operations of block 1205 may be performed in accordance with examples as disclosed herein. In some implementations, aspects of the operations of block 1205 may be performed by a coordinated medium access component 840 as described with reference to FIG. 8.

In some implementations, in block 1210, the wireless AP may relay, from the third wireless communication device toward the second wireless communication device in accordance with the multi-hop link, a data frame associate with the data traffic at the second wireless communication device in accordance with at least a first time epoch of the set of multiple time epochs. The operations of block 1210 may be performed in accordance with examples as disclosed herein. In some implementations, aspects of the operations of block 1210 may be performed by a relay component 835 as described with reference to FIG. 8.

FIG. 13 shows a flowchart illustrating an example process 1300 performable at a wireless STA that supports channel access techniques in a multi-hop framework for ultra-high reliability according to some aspects of the present disclosure. The operations of the process 1300 may be an example of a method implemented by a wireless STA or its components as described herein. For example, the process 1300 may be performed by a wireless communication device, such as the wireless communication device 900 described with reference to FIG. 9, operating as or within a wireless STA. In some implementations, the process 1300 may be performed by a wireless STA, such as one of the STAs 104 described with reference to FIG. 1.

In some implementations, in block 1305, the wireless STA may participate in communication of information associated with a set of multiple time epochs, where the set of multiple time epochs is based on a data traffic at the first wireless communication device and a multi-hop link to the first wireless communication device via at least a second wireless communication device and a third wireless communication device. The operations of block 1305 may be performed in accordance with examples as disclosed herein. In some implementations, aspects of the operations of block 1305 may be performed by a coordinated medium access component 925 as described with reference to FIG. 9.

In some implementations, in block 1310, the wireless STA may receive, in accordance with the multi-hop link, a data frame associated with the data traffic at the first wireless communication device in accordance with at least a first time epoch of the set of multiple time epochs. The operations of block 1310 may be performed in accordance with examples as disclosed herein. In some implementations, aspects of the operations of block 1310 may be performed by a relay component 930 as described with reference to FIG. 9.

FIG. 14 shows a flowchart illustrating an example process 1400 performable at a wireless AP that supports channel access techniques in a multi-hop framework for ultra-high reliability according to some aspects of the present disclosure. The operations of the process 1400 may be an example of a method implemented by a wireless AP or its components as described herein. For example, the process 1400 may be performed by a wireless communication device, such as the wireless communication device 800 described with reference to FIG. 8, operating as or within a wireless AP. In some implementations, the process 1400 may be performed by a wireless AP, such as one of the APs 102 described with reference to FIG. 1.

In some implementations, in block 1405, the wireless AP may participate in communication of data traffic information associated with a second wireless communication device. The operations of block 1405 may be performed in accordance with examples as disclosed herein. In some implementations, aspects of the operations of block 1405 may be performed by a data traffic component 845 as described with reference to FIG. 8.

In some implementations, in block 1410, the wireless AP may participate in communication of information associated with a set of multiple time epochs, where the set of multiple time epochs is based on the data traffic information and a multi-hop link between the first wireless communication device and the second wireless communication device via at least a third wireless communication device. The operations of block 1410 may be performed in accordance with examples as disclosed herein. In some implementations, aspects of the operations of block 1410 may be performed by a coordinated medium access component 840 as described with reference to FIG. 8.

In some implementations, in block 1415, the wireless AP may transmit, toward the second wireless communication device in accordance with the multi-hop link, a data frame in accordance with at least a first time epoch of the set of multiple time epochs. The operations of block 1415 may be performed in accordance with examples as disclosed herein. In some implementations, aspects of the operations of block 1415 may be performed by a relay component 835 as described with reference to FIG. 8.

FIG. 15 shows a flowchart illustrating a method 1500 that supports channel access techniques in a multi-hop framework for ultra-high reliability in accordance with one or more aspects of the present disclosure. The operations of the method 1500 may be implemented by an AP or a STA or its components as described herein. For example, the operations of the method 1500 may be performed by an AP as described with reference to FIGS. 1 through 8 or a STA as described with reference to FIGS. 1 through 9. In some implementations, an AP or a STA may execute a set of instructions to control the functional elements of the wireless AP or the wireless STA to perform the described functions. Additionally, or alternatively, the wireless AP or the wireless STA may perform aspects of the described functions using special-purpose hardware.

In some implementations, in block 1505, the wireless AP or the wireless STA may transmit a first management frame including an indication of medium access information, where the medium access information is associated with a coordinated medium access scheme between the first wireless communication device and at least a second wireless communication device. The operations of block 1505 may be performed in accordance with examples as disclosed herein. In some implementations, aspects of the operations of block 1505 may be performed by a medium access negotiation component 850 or a medium access negotiation component 935 as described with reference to FIGS. 8 and 9.

In some implementations, in block 1510, the wireless AP or the wireless STA may receive a second management frame including a response to the indication of the medium access information, where the response is based on a capability of the second wireless communication device associated with the coordinated medium access scheme. The operations of block 1510 may be performed in accordance with examples as disclosed herein. In some implementations, aspects of the operations of block 1510 may be performed by a medium access negotiation component 850 or a medium access negotiation component 935 as described with reference to FIGS. 8 and 9.

FIG. 16 shows a flowchart illustrating a method 1600 that supports channel access techniques in a multi-hop framework for ultra-high reliability in accordance with one or more aspects of the present disclosure. The operations of the method 1600 may be implemented by an AP or a STA or its components as described herein. For example, the operations of the method 1600 may be performed by an AP as described with reference to FIGS. 1 through 8 or a STA as described with reference to FIGS. 1 through 9. In some implementations, an AP or a STA may execute a set of instructions to control the functional elements of the wireless AP or the wireless STA to perform the described functions. Additionally, or alternatively, the wireless AP or the wireless STA may perform aspects of the described functions using special-purpose hardware.

In some implementations, in block 1605, the wireless AP or the wireless STA may receive a first management frame including an indication of medium access information, where the medium access information is associated with a coordinated medium access scheme between the first wireless communication device and at least a second wireless communication device. The operations of block 1605 may be performed in accordance with examples as disclosed herein. In some implementations, aspects of the operations of block 1605 may be performed by a medium access negotiation component 850 or a medium access negotiation component 935 as described with reference to FIGS. 8 and 9.

In some implementations, in block 1610, the wireless AP or the wireless STA may transmit a second management frame including a response to the indication of the medium access information, where the response is based on a capability of the first wireless communication device associated with the coordinated medium access scheme. The operations of block 1610 may be performed in accordance with examples as disclosed herein. In some implementations, aspects of the operations of block 1610 may be performed by a medium access negotiation component 850 or a medium access negotiation component 935 as described with reference to FIGS. 8 and 9.

Implementation examples are described in the following numbered clauses:

Aspect 1: A method for wireless communication performable at a first wireless communication device, comprising: receiving a first data frame for relaying to a second wireless communication device; receiving a frame associated with a sharing of a transmission opportunity with the first wireless communication device, wherein a duration of the transmission opportunity is associated with a data traffic at the second wireless communication device and a multi-hop link between the second wireless communication device and a third wireless communication device via at least the first wireless communication device; and transmitting, in accordance with the multi-hop link, a second data frame toward the second wireless communication device during the transmission opportunity.

Aspect 2: The method of aspect 1, further comprising: transmitting a dynamic resource request associated with the data traffic at the second wireless communication device, wherein receiving the frame associated with the sharing of the transmission opportunity with the first wireless communication device is based at least in part on the dynamic resource request.

Aspect 3: The method of aspect 2, wherein the dynamic resource request indicates delay bound information, medium time information, bandwidth information, or any combination thereof based at least in part on the data traffic at the second wireless communication device.

Aspect 4: The method of any of aspects 2 through 3, wherein the dynamic resource request indicates a flow identifier associated with the data traffic at the second wireless communication device, the flow identifier is indicated by a traffic identifier (TID) or a stream classification service (SCS) identifier (SCSID).

Aspect 5: The method of any of aspects 2 through 4, further comprising: transmitting the dynamic resource request to the third wireless communication device, wherein the transmission opportunity is initially obtained by the third wireless communication device; or transmitting the dynamic resource request to the second wireless communication device, wherein the transmission opportunity is initially obtained by the second wireless communication device.

Aspect 6: The method of any of aspects 1 through 5, further comprising: participating in communication of information associated with a plurality of time epochs, wherein the plurality of time epochs is based at least in part on the data traffic at the second wireless communication device and the multi-hop link between the second wireless communication device and the third wireless communication device via at least the first wireless communication device, and wherein the transmission opportunity comprises at least a portion of a first time epoch of the plurality of time epochs.

Aspect 7: The method of aspect 6, wherein each time epoch of the plurality of time epochs is a starting point of a respective service period.

Aspect 8: The method of any of aspects 6 through 7, further comprising: receiving the first data frame from the third wireless communication device in accordance with the first time epoch; and transmitting the second data frame toward the second wireless communication device in accordance with the first time epoch based at least in part on the sharing of the transmission opportunity with the first wireless communication device, wherein the second data frame is a relayed version of the first data frame.

Aspect 9: The method of any of aspects 6 through 8, further comprising: participating in communication of medium access information associated with each of the plurality of time epochs; and accessing a wireless medium in accordance with the first time epoch of the plurality of time epochs based at least in part on the medium access information and the sharing of the transmission opportunity, wherein the second data frame is transmitted in accordance with the first time epoch based at least in part on accessing the wireless medium in accordance with the first time epoch.

Aspect 10: The method of aspect 9, wherein the medium access information indicates a respective medium access priority of the first wireless communication device for each time epoch of the plurality of time epochs in accordance with a differentiated medium access scheme between at least the first wireless communication device and the third wireless communication device, and the differentiated medium access scheme is associated with the multi-hop link between the second wireless communication device and the third wireless communication device via at least the first wireless communication device.

Aspect 11: The method of aspect 10, wherein in accordance with the differentiated medium access scheme, the medium access information indicates different channel access parameters for different wireless communication devices at different times, the different channel access parameters for the different wireless communication devices indicating different medium access priorities for the different wireless communication devices, and the different channel access parameters at the different times indicating a pattern according to which a respective wireless communication device of the different wireless communication devices has relatively higher priority medium access at a respective time or a respective transmission opportunity.

Aspect 12: The method of aspect 11, wherein the pattern is based at least in part on an order of flow, an upstream wireless communication device has relatively higher priority medium access at an earlier time or an earlier transmission opportunity and a downstream wireless communication device has relatively higher priority medium access at a later time or a later transmission opportunity for a downlink flow, and the downstream wireless communication device has relatively higher priority medium access at the earlier time or the earlier transmission opportunity and the upstream wireless communication device has relatively higher priority medium access at the later time or the later transmission opportunity for an uplink flow.

Aspect 13: The method of any of aspects 9 through 12, wherein the medium access information indicates a quieting duration for the first wireless communication device, differentiated enhanced distributed channel access (EDCA) parameters for the first wireless communication device, multi-user (MU)-EDCA parameters for the first wireless communication device, whether a restarting of a random backoff counter at a beginning of a time epoch is to be performed by the first wireless communication device, power control information, or any combination thereof.

Aspect 14: The method of any of aspects 6 through 13, further comprising: receiving data traffic information associated with the second wireless communication device; and transmitting, to the third wireless communication device, the data traffic information, wherein the information associated with the plurality of time epochs is based at least in part on the data traffic information.

Aspect 15: The method of aspect 14, wherein the data traffic information includes buffer status information or traffic flow information, or both.

Aspect 16: The method of any of aspects 6 through 15, wherein the transmission opportunity terminates prior to a second time epoch of the plurality of time epochs subsequent to the first time epoch associated with a second service period if the first wireless communication device has low priority for the second service period, and the transmission opportunity continues past the second time epoch associated with the second service period if the first wireless communication device has high priority for the second service period.

Aspect 17: The method of aspect 16, wherein an ending point of a service period associated with the first time epoch is aligned with a starting point of the second time epoch based at least in part on data traffic characteristics at the second wireless communication device.

Aspect 18: The method of any of aspects 6 through 17, wherein the plurality of time epochs is associated with a coordinated restricted target wake time (TWT)-based medium access scheme, and a timing of the plurality of time epochs is based at least in part on the data traffic at the second wireless communication device.

Aspect 19: The method of any of aspects 6 through 18, further comprising: performing an enhanced distributed channel access (EDCA) scheme to obtain medium access during time periods outside of service periods associated with the plurality of time epochs, wherein the information associated with the plurality of time epochs indicates fully scheduled service periods associated with the data traffic at the second wireless communication device and EDCA time periods outside of the fully scheduled service periods.

Aspect 20: The method of any of aspects 1 through 19, further comprising: transmitting a second frame associated with a further sharing of the transmission opportunity with a fourth wireless communication device, wherein the further sharing of the transmission opportunity with the fourth wireless communication device indicates that the fourth wireless communication device is to use the transmission opportunity to relay the second data frame to the second wireless communication device during the transmission opportunity.

Aspect 21: The method of any of aspects 1 through 20, further comprising: receiving a third data packet for relaying to the third wireless communication device; and transmitting, in accordance with the multi-hop link, a fourth data packet toward the third wireless communication device during the transmission opportunity, wherein the fourth data packet is a relayed version of the third data packet.

Aspect 22: The method of aspect 21, wherein the frame associated with the sharing of the transmission opportunity is received from the third wireless communication device, and the third wireless communication device initiates the relaying to the third wireless communication device in accordance with the sharing of the transmission opportunity.

Aspect 23: The method of any of aspects 1 through 22, further comprising: receiving the first data frame during a time period prior to the transmission opportunity shared by the frame.

Aspect 24: The method of any of aspects 1 through 23, further comprising: transmitting a second frame during the transmission opportunity based at least in part on a processing of the first data frame, wherein transmitting the second data frame during the transmission opportunity is based at least in part on transmitting the second frame.

Aspect 25: The method of aspect 24, wherein transmitting the second frame further comprises: transmitting the second frame based at least in part on a determination that the processing of the first data frame will take greater than a threshold time duration, wherein the threshold time duration is associated with the duration of the transmission opportunity, and wherein the second frame is a clear-to-send (CTS) frame.

Aspect 26: The method of any of aspects 1 through 25, wherein transmitting the second data frame toward the second wireless communication device comprises: transmitting the second data frame directly to the second wireless communication device or indirectly to the second wireless communication device via a downstream wireless communication device in accordance with a multi-hop link topology involving at least the first wireless communication device, the second wireless communication device, and the third wireless communication device.

Aspect 27: The method of any of aspects 1 through 26, further comprising: receiving an indication of a priority associated with a delivery of the second data frame to the second wireless communication device, wherein the indication is included in one or more of a header of the first data frame, a control field of the first data frame, or the frame associated with the sharing of the transmission opportunity, and wherein transmitting the second data frame is based at least in part on the priority associated with the delivery of the second data frame to the second wireless communication device.

Aspect 28: The method of any of aspects 1 through 27, wherein the transmission opportunity is shared with the first wireless communication device and a fourth wireless communication device in accordance with the multi-hop link between the second wireless communication device and the third wireless communication device via at least the first wireless communication device, and medium access information indicates a prioritization schedule for the first wireless communication device and the fourth wireless communication device for medium access within the transmission opportunity.

Aspect 29: The method of any of aspects 1 through 28, wherein the data traffic at the second wireless communication device is associated with latency-sensitive data traffic.

Aspect 30: The method of any of aspects 1 through 29, wherein the first wireless communication device is a satellite access point, the second wireless communication device is a wireless station, and the third wireless communication device is a root access point.

Aspect 31: A method for wireless communication performable at a first wireless communication device, comprising: transmitting a data frame toward a second wireless communication device during a transmission opportunity of the first wireless communication device, wherein the data frame is for relaying to the second wireless communication device; and transmitting a frame associated with a sharing of the transmission opportunity of the first wireless communication device with a third wireless communication device, wherein a duration of the transmission opportunity is associated with a data traffic at the second wireless communication device and a multi-hop link to the second wireless communication device via at least the first wireless communication device and the third wireless communication device.

Aspect 32: The method of aspect 31, further comprising: receiving, from the third wireless communication device, a dynamic resource request associated with the data traffic at the second wireless communication device, wherein transmitting the frame associated with the sharing of the transmission opportunity with the third wireless communication device is based at least in part on the dynamic resource request.

Aspect 33: The method of aspect 32, wherein the dynamic resource request indicates delay bound information, medium time information, bandwidth information, or any combination thereof based at least in part on the data traffic at the second wireless communication device.

Aspect 34: The method of any of aspects 31 through 33, further comprising: participating in communication of information associated with a plurality of time epochs, wherein the plurality of time epochs is based at least in part on the data traffic at the second wireless communication device and the multi-hop link to the second wireless communication device via at least the first wireless communication device and the third wireless communication device, and wherein the transmission opportunity comprises at least a portion of a first time epoch of the plurality of time epochs.

Aspect 35: The method of aspect 34, further comprising: participating in communication of medium access information associated with each of the plurality of time epochs; and accessing a wireless medium in accordance with the first time epoch of the plurality of time epochs based at least in part on the medium access information, wherein the data frame and the frame are transmitted in accordance with the first time epoch based at least in part on accessing the wireless medium in accordance with the first time epoch.

Aspect 36: The method of any of aspects 34 through 35, further comprising: participating in communication of data traffic information associated with the second wireless communication device, wherein the plurality of time epochs is based at least in part on the data traffic information.

Aspect 37: The method of aspect 36, wherein the data traffic information includes buffer status information or traffic flow information, or both.

Aspect 38: The method of any of aspects 34 through 37, wherein the transmission opportunity terminates prior to a second time epoch of the plurality of time epochs subsequent to the first time epoch associated with a second service period if the first wireless communication device has low priority for the second service period, and the transmission opportunity continues past the second time epoch associated with the second service period if the first wireless communication device has high priority for the second service period.

Aspect 39: The method of aspect 38, wherein an ending point of a first service period associated with the first time epoch is aligned with a starting point of a second service period associated with the second time epoch based at least in part on data traffic characteristics at the second wireless communication device.

Aspect 40: The method of any of aspects 34 through 39, wherein the plurality of time epochs is associated with a coordinated restricted target wake time (TWT)-based medium access scheme, and a timing of the plurality of time epochs is based at least in part on the data traffic at the second wireless communication device.

Aspect 41: The method of any of aspects 31 through 40, further comprising: receiving a second data frame from the third wireless communication device in accordance with the sharing of the transmission opportunity, wherein the third wireless communication device is an upstream wireless communication device, wherein the data frame is a relayed version of the second data frame, and wherein the data frame is transmitted after the sharing of the transmission opportunity.

Aspect 42: The method of any of aspects 31 through 41, further comprising: sharing the transmission opportunity with the third wireless communication device to enable a relaying of the data frame from the third wireless communication device toward the second wireless communication device, wherein the third wireless communication device is a downstream wireless communication device, and wherein the data frame is transmitted prior to the sharing of the transmission opportunity.

Aspect 43: The method of any of aspects 31 through 42, wherein transmitting the data frame toward the second wireless communication device comprises: transmitting the data frame directly to the second wireless communication device or indirectly to the second wireless communication device via at least the third wireless communication device in accordance with a multi-hop link topology involving at least the first wireless communication device, the second wireless communication device, and the third wireless communication device.

Aspect 44: The method of any of aspects 31 through 43, further comprising: transmitting an indication of a priority associated with a delivery of the data frame to the second wireless communication device, wherein the indication is included in one or more of a header of the data frame, a control field of the data frame, or the frame associated with the sharing of the transmission opportunity.

Aspect 45: The method of any of aspects 31 through 44, wherein the transmission opportunity is shared with the third wireless communication device and a fourth wireless communication device in accordance with the multi-hop link between the first wireless communication device and the second wireless communication device via at least the third wireless communication device, and medium access information indicates a prioritization schedule for the first wireless communication device and the fourth wireless communication device for medium access within the transmission opportunity.

Aspect 46: The method of any of aspects 31 through 45, wherein the data traffic at the second wireless communication device is associated with latency-sensitive data traffic.

Aspect 47: The method of any of aspects 31 through 46, wherein the first wireless communication device is a satellite access point, the second wireless communication device is a wireless station, and the third wireless communication device is a root access point.

Aspect 48: The method of any of aspects 31 through 47, wherein the first wireless communication device is a root access point, the second wireless communication device is a wireless station, and the third wireless communication device is a satellite access point.

Aspect 49: A method for wireless communication performable at a first wireless communication device, comprising: participating in communication of information associated with a plurality of time epochs, wherein the plurality of time epochs is based at least in part on a data traffic at a second wireless communication device and a multi-hop link between the second wireless communication device and a third wireless communication device via at least the first wireless communication device; and relaying, from the third wireless communication device toward the second wireless communication device in accordance with the multi-hop link, a data frame associated with the data traffic at the second wireless communication device in accordance with at least a first time epoch of the plurality of time epochs.

Aspect 50: The method of aspect 49, further comprising: participating in communication of medium access information associated with each of the plurality of time epochs; and accessing a wireless medium in accordance with at least the first time epoch of the plurality of time epochs based at least in part on the medium access information, wherein relaying the data frame in accordance with at least the first time epoch is based at least in part on accessing the wireless medium in accordance with at least the first time epoch.

Aspect 51: The method of aspect 50, further comprising: refraining from accessing the wireless medium in accordance with at least a second time epoch of the plurality of time epochs based at least in part on the medium access information, wherein the medium access information indicates a first medium access priority of the first wireless communication device for the first time epoch and indicates a second medium access priority of the first wireless communication device for the second time epoch.

Aspect 52: The method of aspect 51, wherein the medium access information indicates the first medium access priority for the first time epoch and indicates the second medium access priority for the second time epoch in accordance with a differentiated medium access scheme between at least the first wireless communication device and the third wireless communication device, and the differentiated medium access scheme is associated with the multi-hop link between the second wireless communication device and the third wireless communication device via at least the first wireless communication device.

Aspect 53: The method of aspect 52, wherein in accordance with the differentiated medium access scheme, the medium access information indicates different channel access parameters for different wireless communication devices at different times, the different channel access parameters for the different wireless communication devices indicating different medium access priorities for the different wireless communication devices, and the different channel access parameters at the different times indicating a pattern according to which a respective wireless communication device of the different wireless communication devices has relatively higher priority medium access at a respective time or a respective transmission opportunity.

Aspect 54: The method of aspect 53, wherein the pattern is based at least in part on an order of flow, an upstream wireless communication device has relatively higher priority medium access at an earlier time or an earlier transmission opportunity and a downstream wireless communication device has relatively higher priority medium access at a later time or a later transmission opportunity for a downlink flow, and the downstream wireless communication device has relatively higher priority medium access at the earlier time or the earlier transmission opportunity and the upstream wireless communication device has relatively higher priority medium access at the later time or the later transmission opportunity for an uplink flow.

Aspect 55: The method of any of aspects 51 through 54, wherein the second medium access priority is associated with a quieting duration for the first wireless communication device, a disabling of channel access for a time duration including the second time epoch, a restarting of a random backoff counter at a beginning of the second time epoch, a reception of a clear-to-send (CTS) frame, or any combination thereof.

Aspect 56: The method of any of aspects 49 through 55, wherein relaying the data frame in accordance with at least the first time epoch comprises: receiving the data frame from an upstream wireless communication device during a first service period associated with the first time epoch; and transmitting the data frame to a downstream wireless communication device during a second service period associated with a second time epoch of the plurality of time epochs subsequent to the first time epoch.

Aspect 57: The method of aspect 56, wherein the second time epoch is associated with a Trigger-enabled restricted target wake time (TWT), and the downstream wireless communication device is the second wireless communication device.

Aspect 58: The method of any of aspects 56 through 57, wherein an ending point of a service period associated with the first time epoch is aligned with a starting point of the second time epoch based at least in part on data traffic characteristics at the second wireless communication device.

Aspect 59: The method of any of aspects 49 through 58, further comprising: participating in communication of data traffic information associated with the second wireless communication device, wherein the information associated with the plurality of time epochs is based at least in part on the data traffic information.

Aspect 60: The method of aspect 59, wherein the data traffic information includes buffer status information or traffic flow information, or both.

Aspect 61: The method of any of aspects 49 through 60, further comprising: transmitting a dynamic resource request associated with the data traffic at the second wireless communication device, wherein the dynamic resource request indicates delay bound information, medium time information, bandwidth information, or any combination thereof; and receiving a frame associated with a sharing of a transmission opportunity with the first wireless communication device based at least in part on the dynamic resource request.

Aspect 62: The method of aspect 61, wherein the transmission opportunity comprises at least a portion of a service period associated with the first time epoch, and relaying the data frame in accordance with at least the first time epoch is based at least in part on the sharing of the transmission opportunity.

Aspect 63: The method of any of aspects 61 through 62, wherein a duration of the transmission opportunity is associated with the multi-hop link between the second wireless communication device and the third wireless communication device via at least the first wireless communication device.

Aspect 64: The method of any of aspects 61 through 63, wherein the transmission opportunity terminates prior to a subsequent time epoch of the plurality of time epochs associated with a subsequent service period if the first wireless communication device has low priority for the subsequent service period, and the transmission opportunity continues past the subsequent time epoch associated with the subsequent service period if the first wireless communication device has high priority for the second service period.

Aspect 65: The method of any of aspects 49 through 64, further comprising: receiving a dynamic resource request associated with the data traffic at the second wireless communication device, wherein the dynamic resource request indicates delay bound information, medium time information, bandwidth information, or any combination thereof, and transmitting a frame associated with a sharing of a transmission opportunity based at least in part on the dynamic resource request.

Aspect 66: The method of aspect 65, wherein the transmission opportunity comprises at least a portion of the first time epoch, and the transmission opportunity is for a relay of the data frame from the first wireless communication device toward the second wireless communication device.

Aspect 67: The method of any of aspects 49 through 66, further comprising: receiving a request-to-send (RTS) frame from an upstream wireless communication device; and transmitting a clear-to-send (CTS) frame in accordance with the first time epoch based at least in part on receiving the RTS frame, wherein relaying the data frame in accordance with at least the first time epoch is based at least in part on transmitting the CTS frame in accordance with the first time epoch.

Aspect 68: The method of any of aspects 49 through 67, further comprising: performing an enhanced distributed channel access (EDCA) scheme to obtain medium access during time periods outside of service periods associated with the plurality of time epochs, wherein the information associated with the plurality of time epochs indicates fully scheduled service periods associated with the data traffic at the second wireless communication device and EDCA time periods outside of the fully scheduled service periods.

Aspect 69: The method of any of aspects 49 through 68, further comprising: participating in communication of an indication of a priority associated with a delivery of the data frame to the second wireless communication device, wherein the indication is included in one or more of a header of the data frame, a control field of the data frame, or a frame associated with a sharing of a transmission opportunity, and wherein relaying the data frame is based at least in part on the priority associated with the delivery of the data frame to the second wireless communication device.

Aspect 70: The method of any of aspects 49 through 69, further comprising: receiving link mapping information for one or more data frames associated with the data traffic at the second wireless communication device, the one or more data frames including the data frame, wherein the link mapping information indicates priority information associated with the one or more data frames in accordance with a mapping of the data traffic at the second wireless communication device to a first set of one or more links, and wherein the first wireless communication device is a multi-link device.

Aspect 71: The method of aspect 70, wherein the plurality of time epochs include a pair of overlapping time epochs, each time epoch of the pair of overlapping time epochs being associated with a different link of the first wireless communication device, and each time epoch of the pair of overlapping time epochs being associated with one of fronthaul communication toward the second wireless communication device or backhaul communication toward the third wireless communication device.

Aspect 72: The method of any of aspects 49 through 71, wherein the plurality of time epochs is associated with a coordinated restricted target wake time (TWT)-based medium access scheme, and a timing of the plurality of time epochs is based at least in part on the data traffic at the second wireless communication device.

Aspect 73: The method of any of aspects 49 through 72, wherein the data traffic at the second wireless communication device is associated with latency-sensitive data traffic.

Aspect 74: The method of any of aspects 49 through 73, wherein each time epoch of the plurality of time epochs is a starting point of a respective service period.

Aspect 75: The method of any of aspects 49 through 74, wherein the first wireless communication device is a satellite access point, the second wireless communication device is a wireless station, and the third wireless communication device is a root access point.

Aspect 76: A method for wireless communication performable at a first wireless communication device, comprising: participating in communication of information associated with a plurality of time epochs, wherein the plurality of time epochs is based at least in part on a data traffic at the first wireless communication device and a multi-hop link to the first wireless communication device via at least a second wireless communication device and a third wireless communication device; and receiving, in accordance with the multi-hop link, a data frame associated with the data traffic at the first wireless communication device in accordance with at least a first time epoch of the plurality of time epochs.

Aspect 77: The method of aspect 76, further comprising: participating in communication of medium access information associated with each of the plurality of time epochs; and receiving the data frame in accordance with the first time epoch based at least in part on the medium access information.

Aspect 78: The method of aspect 77, further comprising: refraining from accessing a wireless medium in accordance with at least a second time epoch of the plurality of time epochs based at least in part on the medium access information.

Aspect 79: The method of aspect 78, wherein an access priority of the first wireless communication device for the second time epoch is associated with a quieting duration for the first wireless communication device, a disabling of channel access for a time duration including the second time epoch, a restarting of a random backoff counter at a beginning of the second time epoch, a reception of a clear-to-send (CTS) frame, or any combination thereof.

Aspect 80: The method of any of aspects 77 through 79, wherein the medium access information indicates different access priorities of the first wireless communication device for each of the plurality of time epochs in accordance with a differentiated medium access scheme, the differentiated medium access scheme is associated with the multi-hop link to the first wireless communication device via at least the second wireless communication device and the third wireless communication device.

Aspect 81: The method of any of aspects 76 through 80, further comprising: transmitting data traffic information associated with the first wireless communication device, wherein the information associated with the plurality of time epochs is based at least in part on transmitting the data traffic information.

Aspect 82: The method of aspect 81, wherein the data traffic information includes buffer status information or traffic flow information, or both.

Aspect 83: The method of any of aspects 76 through 82, further comprising: performing an enhanced distributed channel access (EDCA) scheme to obtain medium access during time periods outside of service periods associated with the plurality of time epochs, wherein the information associated with the plurality of time epochs indicates fully scheduled service periods associated with the data traffic at the second wireless communication device and EDCA time periods outside of the fully scheduled service periods.

Aspect 84: The method of any of aspects 76 through 83, wherein the first time epoch is associated with a Trigger-enabled restricted target wake time (TWT).

Aspect 85: The method of any of aspects 76 through 84, wherein the plurality of time epochs is associated with a coordinated restricted target wake time (TWT)-based medium access scheme, and a timing of the plurality of time epochs is based at least in part on the data traffic at the first wireless communication device.

Aspect 86: The method of any of aspects 76 through 85, wherein the data traffic at the first wireless communication device is associated with latency-sensitive data traffic.

Aspect 87: The method of any of aspects 76 through 86, wherein the first wireless communication device is a wireless STA, and the second wireless communication device and the third wireless communication device are upstream wireless communication devices associated with the multi-hop link.

Aspect 88: A method for wireless communication performable at a first wireless communication device, comprising: participating in communication of data traffic information associated with a second wireless communication device; participating in communication of information associated with a plurality of time epochs, wherein the plurality of time epochs is based at least in part on the data traffic information and a multi-hop link between the first wireless communication device and the second wireless communication device via at least a third wireless communication device; and transmitting, toward the second wireless communication device in accordance with the multi-hop link, a data frame in accordance with at least a first time epoch of the plurality of time epochs.

Aspect 89: The method of aspect 88, further comprising: participating in communication of medium access information associated with each of the plurality of time epochs; and accessing a wireless medium in accordance with the first time epoch of the plurality of time epochs based at least in part on the medium access information, wherein transmitting the data frame in accordance with the first time epoch is based at least in part on accessing the wireless medium in accordance with the first time epoch.

Aspect 90: The method of aspect 89, further comprising: refraining from accessing the wireless medium in accordance with at least a second time epoch of the plurality of time epochs based at least in part on the medium access information, wherein the medium access information indicates a first medium access priority of the first wireless communication device for the first time epoch and indicates a second medium access priority of the first wireless communication device for the second time epoch.

Aspect 91: The method of aspect 90, wherein the medium access information indicates the first medium access priority for the first time epoch and indicates the second medium access priority for the second time epoch in accordance with a differentiated medium access scheme between at least the first wireless communication device and the third wireless communication device, and the differentiated medium access scheme is associated with the multi-hop link between the first wireless communication device and the second wireless communication device via at least the third wireless communication device.

Aspect 92: The method of any of aspects 88 through 91, further comprising: receiving a dynamic resource request associated with data traffic at the second wireless communication device, wherein the dynamic resource request indicates delay bound information, medium time information, bandwidth information, or any combination thereof; and transmitting a frame associated with a sharing of a transmission opportunity based at least in part on the dynamic resource request.

Aspect 93: The method of aspect 92, wherein the transmission opportunity comprises at least a portion of the first time epoch, and a duration of the transmission opportunity is associated with the multi-hop link between the first wireless communication device and the second wireless communication device via at least the third wireless communication device.

Aspect 94: The method of any of aspects 88 through 93, wherein the plurality of time epochs is associated with a coordinated restricted target wake time (TWT)-based medium access scheme, and a timing of the plurality of time epochs is based at least in part on the data traffic information.

Aspect 95: The method of any of aspects 88 through 94, wherein data traffic at the second wireless communication device is associated with latency-sensitive data traffic.

Aspect 96: The method of any of aspects 88 through 95, wherein the first wireless communication device is a root access point, the second wireless communication device is a wireless station, and the third wireless communication device is a satellite access point.

Aspect 97: A method for wireless communication performable at a first wireless communication device, comprising: transmitting a first management frame including an indication of medium access information, wherein the medium access information is associated with a coordinated medium access scheme between the first wireless communication device and at least a second wireless communication device; and receiving a second management frame including a response to the indication of the medium access information, wherein the response is based at least in part on a capability of the second wireless communication device associated with the coordinated medium access scheme.

Aspect 98: The method of aspect 97, further comprising: transmitting the indication of the medium access information via an information element of the first management frame.

Aspect 99: The method of aspect 98, wherein the information element is included in an action field of the first management frame.

Aspect 100: The method of any of aspects 97 through 99, wherein the medium access information includes timing information associated with a synchronization time between the first wireless communication device and at least the second wireless communication device, a synchronization periodicity between the first wireless communication device and at least the second wireless communication device, a duration of a synchronization period between the first wireless communication device and at least the second wireless communication device, or any combination thereof.

Aspect 101: The method of any of aspects 97 through 100, wherein the medium access information includes information pertaining to time-based medium access, and the information pertaining to the time-based medium access indicates first parameters associated with a coordinated restricted target wake time (TWT)-based medium access scheme involving at least the first wireless communication device and the second wireless communication device or second parameters associated with transmission opportunity sharing between at least the first wireless communication device and the second wireless communication device, or indicates both the first parameters and the second parameters.

Aspect 102: The method of any of aspects 97 through 101, wherein the medium access information includes information pertaining to frequency-based medium access, and the information pertaining to the frequency-based medium access indicates parameters associated with frequency division multiple access involving at least the first wireless communication device and the second wireless communication device.

Aspect 103: The method of any of aspects 97 through 102, wherein the medium access information includes information pertaining to spatial-based medium access, and the information pertaining to the spatial-based medium access indicates parameters associated with spatial reuse involving at least the first wireless communication device and the second wireless communication device.

Aspect 104: The method of any of aspects 97 through 103, wherein the response to the indication of the medium access information includes an indication of whether parameters associated with the medium access information can be accommodated by the second wireless communication device, whether the parameters associated with the medium access information exceed a capacity of the second wireless communication device, whether the indication of the medium access information is recognized by the second wireless communication device, or any combination thereof.

Aspect 105: The method of aspect 104, wherein the second management frame indicates the response via a reason code field associated with the medium access information.

Aspect 106: The method of any of aspects 97 through 105, wherein the first management frame is one of a coordinated access point medium access protocol setup frame, a coordinated access point medium access protocol teardown frame, a coordinated access point medium access protocol suspend frame, a coordinated access point medium access protocol resume frame, or a broadcast fame associated with coordinating access point medium access.

Aspect 107: The method of any of aspects 97 through 106, wherein the medium access information indicates first medium access information for coordinated medium access between the first wireless communication device and the second wireless communication device and indicates second medium access information for coordinated medium access between the second wireless communication device and a third wireless communication device.

Aspect 108: The method of aspect 107, wherein the first wireless communication device is an AP, the second wireless communication device is a first non-AP device, and the third wireless communication device is a second non-AP device.

Aspect 109: The method of any of aspects 97 through 108, wherein the coordinated medium access scheme indicates coordination between first transmissions by the first wireless communication device or a third wireless communication device and second transmissions by the second wireless communication device, the first wireless communication device and the third wireless communication device are AP devices and the second wireless communication device is a non-AP device.

Aspect 110: The method of any of aspects 97 through 109, wherein the coordinated medium access scheme indicates medium access coordination across a plurality of hops of a multi-hop link involving at least the first wireless communication device, the second wireless communication device, and a third wireless communication device.

Aspect 111: The method of aspect 110, wherein the first wireless communication device and the second wireless communication device are both satellite AP devices, or one of the first wireless communication device or the second wireless communication device is a root AP device and one of the first wireless communication device or the second wireless communication device is a satellite AP device, and the third wireless communication device is an AP device or a non-AP device.

Aspect 112: The method of any of aspects 97 through 111, wherein an exchange of the first management frame and the second management frame is associated with a negotiation of the medium access information.

Aspect 113: The method of any of aspects 97 through 112, wherein the first wireless communication device is a first AP device or a first non-AP device and the second wireless communication device is a second AP device or a second non-AP device.

Aspect 114: A method for wireless communication performable at a first wireless communication device, comprising: receiving a first management frame including an indication of medium access information, wherein the medium access information is associated with a coordinated medium access scheme between the first wireless communication device and at least a second wireless communication device; and transmitting a second management frame including a response to the indication of the medium access information, wherein the response is based at least in part on a capability of the first wireless communication device associated with the coordinated medium access scheme.

Aspect 115: The method of aspect 114, further comprising: receiving the indication of the medium access information via an information element of the first management frame.

Aspect 116: The method of aspect 115, wherein the information element is included in an action field of the first management frame.

Aspect 117: The method of any of aspects 114 through 116, wherein the medium access information includes timing information associated with a synchronization time between the first wireless communication device and at least the second wireless communication device, a synchronization periodicity between the first wireless communication device and at least the second wireless communication device, a duration of a synchronization period between the first wireless communication device and at least the second wireless communication device, or any combination thereof.

Aspect 118: The method of any of aspects 114 through 117, wherein the medium access information includes information pertaining to time-based medium access, and the information pertaining to the time-based medium access indicates first parameters associated with a coordinated restricted target wake time (TWT)-based medium access scheme involving at least the first wireless communication device and the second wireless communication device or second parameters associated with transmission opportunity sharing between at least the first wireless communication device and the second wireless communication device, or indicates both the first parameters and the second parameters.

Aspect 119: The method of any of aspects 114 through 118, wherein the medium access information includes information pertaining to frequency-based medium access, and the information pertaining to the frequency-based medium access indicates parameters associated with frequency division multiple access involving at least the first wireless communication device and the second wireless communication device.

Aspect 120: The method of any of aspects 114 through 119, wherein the medium access information includes information pertaining to spatial-based medium access, and the information pertaining to the spatial-based medium access indicates parameters associated with spatial reuse involving at least the first wireless communication device and the second wireless communication device.

Aspect 121: The method of any of aspects 114 through 120, wherein the response to the indication of the medium access information includes an indication of whether parameters associated with the medium access information can be accommodated by the second wireless communication device, whether the parameters associated with the medium access information exceed a capacity of the second wireless communication device, whether the indication of the medium access information is recognized by the second wireless communication device, or any combination thereof.

Aspect 122: The method of aspect 121, wherein the second management frame indicates the response via a reason code field associated with the medium access information.

Aspect 123: The method of aspect 122, wherein the response indicates that information indicated in the first management frame is unrecognized by the second wireless communication device in accordance with setting a set of bits of the reason code field to dedicated values, the dedicated values associated with indicating that the indication of the medium access information is unrecognized.

Aspect 124: The method of any of aspects 114 through 123, wherein the first management frame is one of a coordinated access point medium access protocol setup frame, a coordinated access point medium access protocol teardown frame, a coordinated access point medium access protocol suspend frame, a coordinated access point medium access protocol resume frame, or a broadcast fame associated with coordinating access point medium access.

Aspect 125: The method of any of aspects 114 through 124, wherein the medium access information indicates first medium access information for coordinated medium access between the first wireless communication device and the second wireless communication device and indicates second medium access information for coordinated medium access between the first wireless communication device and a third wireless communication device.

Aspect 126: The method of aspect 125, wherein the first wireless communication device is an AP, the second wireless communication device is a first non-AP device, and the third wireless communication device is a second non-AP device.

Aspect 127: The method of any of aspects 114 through 126, wherein the coordinated medium access scheme indicates coordination between first transmissions by the first wireless communication device and second transmissions by the second wireless communication device or a third wireless communication device, the second wireless communication device and the third wireless communication device are AP devices and the first wireless communication device is a non-AP device.

Aspect 128: The method of any of aspects 114 through 127, wherein the coordinated medium access scheme indicates medium access coordination across a plurality of hops of a multi-hop link involving at least the first wireless communication device, the second wireless communication device, and a third wireless communication device.

Aspect 129: The method of aspect 128, wherein the first wireless communication device and the second wireless communication device are both satellite AP devices, or one of the first wireless communication device or the second wireless communication device is a root AP device and one of the first wireless communication device or the second wireless communication device is a satellite AP device, and the third wireless communication device is an AP device or a non-AP device.

Aspect 130: The method of any of aspects 114 through 129, wherein an exchange of the first management frame and the second management frame is associated with a negotiation of the medium access information.

Aspect 131: The method of any of aspects 114 through 130, wherein the first wireless communication device is a first AP device or a first non-AP device and the second wireless communication device is a second AP device or a second non-AP device.

Aspect 132: A first wireless communication device, comprising at least one memory; and at least one processor communicatively coupled with the at least one memory, the at least one processor operable to cause the first wireless communication device to perform a method of any of aspects 1 through 30.

Aspect 133: A first wireless communication device, comprising at least one means for performing a method of any of aspects 1 through 30.

Aspect 134: A non-transitory computer-readable medium storing code for wireless communication performable at a first wireless communication device, the code comprising instructions executable by a processor to perform a method of any of aspects 1 through 30.

Aspect 135: A first wireless communication device, comprising at least one memory; and at least one processor communicatively coupled with the at least one memory, the at least one processor operable to cause the first wireless communication device to perform a method of any of aspects 31 through 48.

Aspect 136: A first wireless communication device, comprising at least one means for performing a method of any of aspects 31 through 48.

Aspect 137: A non-transitory computer-readable medium storing code for wireless communication performable at a first wireless communication device, the code comprising instructions executable by a processor to perform a method of any of aspects 31 through 48.

Aspect 138: A first wireless communication device, comprising at least one memory; and at least one processor communicatively coupled with the at least one memory, the at least one processor operable to cause the first wireless communication device to perform a method of any of aspects 49 through 75.

Aspect 139: A first wireless communication device, comprising at least one means for performing a method of any of aspects 49 through 75.

Aspect 140: A non-transitory computer-readable medium storing code for wireless communication performable at a first wireless communication device, the code comprising instructions executable by a processor to perform a method of any of aspects 49 through 75.

Aspect 141: A first wireless communication device, comprising at least one memory; and at least one processor communicatively coupled with the at least one memory, the at least one processor operable to cause the first wireless communication device to perform a method of any of aspects 76 through 87.

Aspect 142: A first wireless communication device, comprising at least one means for performing a method of any of aspects 76 through 87.

Aspect 143: A non-transitory computer-readable medium storing code for wireless communication performable at a first wireless communication device, the code comprising instructions executable by a processor to perform a method of any of aspects 76 through 87.

Aspect 144: A first wireless communication device, comprising at least one memory; and at least one processor communicatively coupled with the at least one memory, the at least one processor operable to cause the first wireless communication device to perform a method of any of aspects 88 through 96.

Aspect 145: A first wireless communication device, comprising at least one means for performing a method of any of aspects 88 through 96.

Aspect 146: A non-transitory computer-readable medium storing code for wireless communication performable at a first wireless communication device, the code comprising instructions executable by a processor to perform a method of any of aspects 88 through 96.

Aspect 147: A first wireless communication device, comprising at least one memory; and at least one processor communicatively coupled with the at least one memory, the at least one processor operable to cause the first wireless communication device to perform a method of any of aspects 97 through 113.

Aspect 148: A first wireless communication device, comprising at least one means for performing a method of any of aspects 97 through 113.

Aspect 149: A non-transitory computer-readable medium storing code for wireless communication performable at a first wireless communication device, the code comprising instructions executable by a processor to perform a method of any of aspects 97 through 113.

Aspect 150: A first wireless communication device, comprising at least one memory; and at least one processor communicatively coupled with the at least one memory, the at least one processor operable to cause the first wireless communication device to perform a method of any of aspects 114 through 131.

Aspect 151: A first wireless communication device, comprising at least one means for performing a method of any of aspects 114 through 131.

Aspect 152: A non-transitory computer-readable medium storing code for wireless communication performable at a first wireless communication device, the code comprising instructions executable by a processor to perform a method of any of aspects 114 through 131.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described herein. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described herein as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described herein should not be understood as requiring such separation in all examples, and it should be understood that the described program components and systems can generally be integrated together in a single software product or packaged into multiple software products.

What is claimed is:

1. A first wireless communication device, comprising:

at least one memory; and at least one processor communicatively coupled with the at least one memory, the at least one processor operable to cause the first wireless communication device to:

receive a first data frame for relaying to a second wireless communication device;

receive a frame associated with a sharing of a transmission opportunity with the first wireless communication device, wherein a duration of the transmission opportunity is associated with a data traffic at the second wireless communication device and a multi-hop link between the second wireless communication device and a third wireless communication device via at least the first wireless communication device; and transmit, in accordance with the multi-hop link, a second data frame toward the second wireless communication device during the transmission opportunity.

2. The first wireless communication device of claim 1, wherein the at least one processor is further operable to cause the first wireless communication device to:

transmit a dynamic resource request associated with the data traffic at the second wireless communication device, wherein receiving the frame associated with the sharing of the transmission opportunity with the first wireless communication device is based at least in part on the dynamic resource request.

3. The first wireless communication device of claim 2, wherein the dynamic resource request indicates delay bound information, medium time information, bandwidth information, or any combination thereof based at least in part on the data traffic at the second wireless communication device.

4. The first wireless communication device of claim 2, wherein the dynamic resource request indicates a flow identifier associated with the data traffic at the second wireless communication device, and wherein the flow identifier is indicated by a traffic identifier (TID) or a stream classification service (SCS) identifier (SCSID).

5. The first wireless communication device of claim 2, wherein the at least one processor is further operable to cause the first wireless communication device to:

transmit the dynamic resource request to the third wireless communication device, wherein the transmission opportunity is initially obtained by the third wireless communication device; or transmit the dynamic resource request to the second wireless communication device, wherein the transmission opportunity is initially obtained by the second wireless communication device.

6. The first wireless communication device of claim 1, wherein the at least one processor is further operable to cause the first wireless communication device to:

participate in communication of information associated with a plurality of time epochs, wherein the plurality of time epochs is based at least in part on the data traffic at the second wireless communication device and the multi-hop link between the second wireless communication device and the third wireless communication device via at least the first wireless communication device, and wherein the transmission opportunity comprises at least a portion of a first time epoch of the plurality of time epochs.

7. The first wireless communication device of claim 6, wherein each time epoch of the plurality of time epochs is a starting point of a respective service period.

8. The first wireless communication device of claim 6, wherein the at least one processor is further operable to cause the first wireless communication device to:

receive the first data frame from the third wireless communication device in accordance with the first time epoch; and transmit the second data frame toward the second wireless communication device in accordance with the first time epoch based at least in part on the sharing of the transmission opportunity with the first wireless communication device, wherein the second data frame is a relayed version of the first data frame.

9. The first wireless communication device of claim 6, wherein the at least one processor is further operable to cause the first wireless communication device to:

participate in communication of medium access information associated with each of the plurality of time epochs; and access a wireless medium in accordance with the first time epoch of the plurality of time epochs based at least in part on the medium access information and the sharing of the transmission opportunity, wherein the second data frame is transmitted in accordance with the first time epoch based at least in part on accessing the wireless medium in accordance with the first time epoch.

10. The first wireless communication device of claim 9, wherein the medium access information indicates a respective medium access priority of the first wireless communication device for each time epoch of the plurality of time epochs in accordance with a differentiated medium access scheme between at least the first wireless communication device and the third wireless communication device, and wherein the differentiated medium access scheme is associated with the multi-hop link between the second wireless communication device and the third wireless communication device via at least the first wireless communication device.

11. The first wireless communication device of claim 10, wherein in accordance with the differentiated medium access scheme, the medium access information indicates different channel access parameters for different wireless communication devices at different times, the different channel access parameters for the different wireless communication devices indicating different medium access priorities for the different wireless communication devices, and the different channel access parameters at the different times indicating a pattern according to which a respective wireless communication device of the different wireless communication devices has relatively higher priority medium access at a respective time or a respective transmission opportunity.

12. The first wireless communication device of claim 11, wherein the pattern is based at least in part on an order of flow, wherein an upstream wireless communication device has relatively higher priority medium access at an earlier time or an earlier transmission opportunity and a downstream wireless communication device has relatively higher priority medium access at a later time or a later transmission opportunity for a downlink flow, and wherein the downstream wireless communication device has relatively higher priority medium access at the earlier time or the earlier transmission opportunity and the upstream wireless communication device has relatively higher priority medium access at the later time or the later transmission opportunity for an uplink flow.

13. The first wireless communication device of claim 9, wherein the medium access information indicates a quieting duration for the first wireless communication device, differentiated enhanced distributed channel access (EDCA) parameters for the first wireless communication device, multi-user (MU)-EDCA parameters for the first wireless communication device, whether a restarting of a random backoff counter at a beginning of a time epoch is to be performed by the first wireless communication device, power control information, or any combination thereof.

14. The first wireless communication device of claim 6, wherein the at least one processor is further operable to cause the first wireless communication device to:
 receive data traffic information associated with the second wireless communication device; and
 transmit, to the third wireless communication device, the data traffic information, wherein the information associated with the plurality of time epochs is based at least in part on the data traffic information.

15. The first wireless communication device of claim 14, wherein the data traffic information includes buffer status information or traffic flow information, or both.

16. The first wireless communication device of claim 6, wherein the transmission opportunity terminates prior to a second time epoch of the plurality of time epochs subsequent to the first time epoch associated with a second service period if the first wireless communication device has low priority for the second service period, and wherein the transmission opportunity continues past the second time epoch associated with the second service period if the first wireless communication device has high priority for the second service period.

17. The first wireless communication device of claim 16, wherein an ending point of a service period associated with the first time epoch is aligned with a starting point of the second time epoch based at least in part on data traffic characteristics at the second wireless communication device.

18. The first wireless communication device of claim 6, wherein the plurality of time epochs is associated with a coordinated restricted target wake time (TWT)-based medium access scheme, and wherein a timing of the plurality of time epochs is based at least in part on the data traffic at the second wireless communication device.

19. The first wireless communication device of claim 6, wherein the at least one processor is further operable to cause the first wireless communication device to:
 perform an enhanced distributed channel access (EDCA) scheme to obtain medium access during time periods outside of service periods associated with the plurality of time epochs, wherein the information associated with the plurality of time epochs indicates fully scheduled service periods associated with the data traffic at the second wireless communication device and EDCA time periods outside of the fully scheduled service periods.

20. The first wireless communication device of claim 1, wherein the at least one processor is further operable to cause the first wireless communication device to:
 transmit a second frame associated with a further sharing of the transmission opportunity with a fourth wireless communication device, wherein the further sharing of the transmission opportunity with the fourth wireless communication device indicates that the fourth wireless communication device is to use the transmission opportunity to relay the second data frame to the second wireless communication device during the transmission opportunity.

21. The first wireless communication device of claim 1, wherein the at least one processor is further operable to cause the first wireless communication device to:
 receive a third data packet for relaying to the third wireless communication device; and
 transmit, in accordance with the multi-hop link, a fourth data packet toward the third wireless communication device during the transmission opportunity, wherein the fourth data packet is a relayed version of the third data packet.

22. The first wireless communication device of claim 21, wherein the frame associated with the sharing of the transmission opportunity is received from the third wireless communication device, and wherein the third wireless communication device initiates the relaying to the third wireless communication device in accordance with the sharing of the transmission opportunity.

23. The first wireless communication device of claim 1, wherein the at least one processor is further operable to cause the first wireless communication device to:
 receive the first data frame during a time period prior to the transmission opportunity shared by the frame.

24. The first wireless communication device of claim 1, wherein the at least one processor is further operable to cause the first wireless communication device to:
 transmit a second frame during the transmission opportunity based at least in part on a processing of the first data frame, wherein transmitting the second data frame during the transmission opportunity is based at least in part on transmitting the second frame.

25. The first wireless communication device of claim 24, wherein, to transmit the second frame, the at least one processor is operable to cause the first wireless communication device to:
 transmit the second frame based at least in part on a determination that the processing of the first data frame will take greater than a threshold time duration, wherein the threshold time duration is associated with the duration of the transmission opportunity, and wherein the second frame is a clear-to-send (CTS) frame.

26. The first wireless communication device of claim 1, wherein, to transmit the second data frame toward the second wireless communication device, the at least one processor is operable to cause the first wireless communication device to:
 transmit the second data frame directly to the second wireless communication device or indirectly to the second wireless communication device via a downstream wireless communication device in accordance with a multi-hop link topology involving at least the first wireless communication device, the second wireless communication device, and the third wireless communication device.

27. The first wireless communication device of claim 1, wherein the at least one processor is operable to cause the first wireless communication device to:
 receive an indication of a priority associated with a delivery of the second data frame to the second wireless communication device, wherein the indication is included in one or more of a header of the first data frame, a control field of the first data frame, or the frame associated with the sharing of the transmission opportunity, and wherein transmitting the second data frame is based at least in part on the priority associated with the delivery of the second data frame to the second wireless communication device.

28. The first wireless communication device of claim 1, wherein the transmission opportunity is shared with the first wireless communication device and a fourth wireless communication device in accordance with the multi-hop link between the second wireless communication device and the third wireless communication device via at least the first wireless communication device, and wherein medium access information indicates a prioritization schedule for the first wireless communication device and the fourth wireless communication device for medium access within the transmission opportunity.

29. A first wireless communication device, comprising:

at least one memory; and at least one processor communicatively coupled with the at least one memory, the at least one processor operable to cause the first wireless communication device to:

transmit a data frame toward a second wireless communication device during a transmission opportunity of the first wireless communication device, wherein the data frame is for relaying to the second wireless communication device; and transmit a frame associated with a sharing of the transmission opportunity of the first wireless communication device with a third wireless communication device, wherein a duration of the transmission opportunity is associated with a data traffic at the second wireless communication device and a multi-hop link to the second wireless communication device via at least the first wireless communication device and the third wireless communication device.

30. A method for wireless communication performable at a first wireless communication device, comprising:

receiving a first data frame for relaying to a second wireless communication device;

receiving a frame associated with a sharing of a transmission opportunity with the first wireless communication device, wherein a duration of the transmission opportunity is associated with a data traffic at the second wireless communication device and a multi-hop link between the second wireless communication device and a third wireless communication device via at least the first wireless communication device; and transmitting, in accordance with the multi-hop link, a second data frame toward the second wireless communication device during the transmission opportunity.

* * * * *